United States Patent
Rao

(10) Patent No.: US 11,466,125 B2
(45) Date of Patent: Oct. 11, 2022

(54) LOW NUCLEATION TEMPERATURE POLYTHIOETHER PREPOLYMERS AND USES THEREOF

(71) Applicant: PRC-DeSoto International, Inc., Sylmar, CA (US)

(72) Inventor: Chandra Rao, Valencia, CA (US)

(73) Assignee: PRC-DESOTO INTERNATIONAL, INC., Sylmar, CA (US)

( * ) Notice: Subject to any disclaimer, the term of this patent is extended or adjusted under 35 U.S.C. 154(b) by 269 days.

(21) Appl. No.: 16/721,349

(22) Filed: Dec. 19, 2019

(65) Prior Publication Data

US 2021/0189069 A1 Jun. 24, 2021

(51) Int. Cl.
C08G 75/045 (2016.01)
C09K 3/10 (2006.01)

(52) U.S. Cl.
CPC .......... *C08G 75/045* (2013.01); *C09K 3/1012* (2013.01); *C09K 2200/0682* (2013.01)

(58) Field of Classification Search
CPC ...... C08G 18/28; C08G 75/04; C08G 75/045; C09K 3/1012; C09K 2200/0682
See application file for complete search history.

(56) References Cited

U.S. PATENT DOCUMENTS

| | | | |
|---|---|---|---|
| 5,959,071 A | 9/1999 | DeMoss et al. | |
| 7,097,883 B2* | 8/2006 | Sawant | C08G 75/045 528/405 |
| 7,390,859 B2* | 6/2008 | Sawant | C08L 81/02 525/523 |
| 2004/0247792 A1 | 12/2004 | Sawant et al. | |
| 2006/0175005 A1 | 8/2006 | Sawant et al. | |
| 2010/0048852 A1* | 2/2010 | Bojkova | C08G 18/12 528/60 |
| 2014/0275474 A1 | 9/2014 | Rao et al. | |
| 2017/0369432 A1 | 12/2017 | Cui et al. | |

OTHER PUBLICATIONS

International Search Report for PCT Application No. PCT/US2020/065759, dated Apr. 14, 2021, 5 pages.

* cited by examiner

*Primary Examiner* — Shane Fang
(74) *Attorney, Agent, or Firm* — William R. Lambert

(57) ABSTRACT

Polythioether prepolymers that have a low nucleation temperature. The symmetry of the polythioether prepolymers is modified by including pendent groups extending from the backbone of the polythioether prepolymer chain and/or the symmetry is modified by including segments having a different number of —$C(R)_2$— groups between heteroatoms. The polythioether prepolymers are stable at low temperature storage conditions for an extended period of time. Compositions prepared using the low nucleation temperature polythioether prepolymers are useful as sealants.

27 Claims, No Drawings

LOW NUCLEATION TEMPERATURE POLYTHIOETHER PREPOLYMERS AND USES THEREOF

FIELD

The disclosure relates to polythioether prepolymers that have a low nucleation temperature. The polythioether prepolymers are stable at low temperature storage conditions for an extended period. Compositions prepared using the low nucleation temperature polythioether prepolymers are useful as sealants.

BACKGROUND

During storage and prior to use, sealants can be exposed to low temperatures such as temperatures less than 5° C. At these temperatures the sealants can begin to nucleate and can eventually crystallize. The presence of nucleation centers can degrade the performance of a cured sealant. Nucleation can be avoided by maintaining the sealants under controlled handling and storage conditions. However, this requirement places an additional burden on operators and can incur additional costs.

It is desirable that the sealants and the prepolymers used in such sealants exhibit low nucleation temperatures.

SUMMARY

According to the present invention, polythioether prepolymers comprise a moiety having the structure of Formula (3):

-[-A-D-]$_n$-A-     (3)

wherein,
(a) n is an integer from 1 to 60;
(b) each A is independently selected from a moiety of Formula (4), a moiety of Formula (5), and a moiety of Formula (6):

—S—R$^1$—S—     (4)

B(—R$^3$—S—)$_z$     (5)

—S—[—R$^1$—S—R$^{4a}$—R$^2$—R$^{4a}$—S—]$_c$—R$^1$—S—     (6)

(c) each D is independently selected from a moiety of Formula (7), a moiety of Formula (8), and a moiety of Formula (9):

—R$^{4a}$—R$^2$—R$^{4a}$—     (7)

B(—R$^3$—R$^{4a}$—)$_z$     (8)

—R$^{4a}$—[—R$^2$—R$^{4a}$—S—R$^1$—S—R$^{4a}$—]$_c$—R$^2$—R$^{4a}$—     (9)

(d) wherein,
(i) c is an integer from 1 to 3;
(ii) each R$^1$ is independently selected from C$_{2-10}$ heteroalkanediyl, substituted C$_{2-10}$ heteroalkanediyl, and —[(CR$_2$)$_p$—X—]$_q$—(CR$_2$)$_r$—, wherein,
p is an integer from 1 to 6;
q is an integer from 1 to 5;
r is an integer from 2 to 10;
each X is independently selected from O and S; and
each R is independently selected from hydrogen, C$_{1-16}$ alkyl, C$_{1-16}$ heteroalkyl, substituted C$_{1-16}$ alkyl, and substituted C$_{1-16}$ heteroalkyl;
(iii) each R$^2$ is independently selected from C$_{2-10}$ heteroalkanediyl, substituted C$_{2-10}$ heteroalkanediyl, and —[(CR$_2$)$_p$—X—]$_q$—(CR$_2$)$_r$—, wherein,
p is an integer from 1 to 6;
q is an integer from 1 to 5;
r is an integer from 2 to 10;
each X is independently selected from O and S; and
each R is independently selected from hydrogen, C$_{1-16}$ alkyl, C$_{1-16}$ heteroalkyl, substituted C$_{1-16}$ alkyl, and substituted C$_{1-16}$ heteroalkyl;
(iv) B represents a core of a z-valent, polythiol polyfunctionalizing agent B(—R$^3$—SH)$_z$ or a polyfunctional thiol-reactive polyfunctionalizing agent B(—R$^3$—R$^4$)$_z$, wherein,
z is an integer from 3 to 6; and
each R$^3$ is independently selected from C$_{1-10}$ alkanediyl, C$_{1-10}$ heteroalkanediyl, substituted C$_{1-10}$ alkanediyl, and substituted C$_{1-10}$ heteroalkanediyl; and
each R$^4$ is a thiol-reactive group; and
(v) each R$^{4a}$ independently comprises a group derived from a reaction of a thiol-reactive group R$^4$ with a thiol group; and
(e) wherein,
(i) at least one of R$^1$ and R$^2$ is selected from substituted C$_{20}$ alkanediyl, substituted C$_{2-10}$ heteroalkanediyl, and —[(CR$_2$)$_p$—X—]$_q$(CR$_2$)$_r$—, wherein,
p is an integer from 1 to 6;
q is an integer from 1 to 5;
r is an integer from 2 to 10;
each X is independently selected from O and S; and
at least one R is selected from C$_{1-16}$ alkyl, C$_{1-16}$ heteroalkyl, substituted C$_{1-16}$ alkyl, and substituted C$_{1-16}$ heteroalkyl;
(ii) the polythioether prepolymer comprises two or more moieties having the structure of Formula (10):

—X—(CH$_2$)$_a$—X—     (10)

wherein,
a is an integer from 1 to 6;
each X is independently selected from O and S; and
the value of a in a first moiety of Formula (10) is different than the value of a in a second moiety of Formula (10); or
(iii) a combination thereof.

According to the present invention, polythioether prepolymers comprise the reaction product of reactants comprising:
(a) a polythiol monomer, wherein the polythiol monomer comprises a dithiol monomer of Formula (4a), a polythiol polyfunctionalizing agent of Formula (5a), a dithiol adduct of Formula (6a), or a combination of any of the foregoing; and
(b) a polyfunctional thiol-reactive monomer, wherein the polyfunctional thiol-reactive monomer comprises a difunctional thiol-reactive monomer of Formula (7a), a polyfunctional thiol-reactive polyfunctionalizing agent of Formula (8a), a difunctional thiol-reactive adduct of Formula (9a), or a combination of any of the foregoing;
wherein,
(i) at least one of R$^1$ and R$^2$ is selected from substituted C$_{2-10}$ alkanediyl, substituted C$_{2-10}$ heteroalkanediyl, and —[(CR$_2$)$_p$—X—]$_q$—(CR$_2$)$_r$—, wherein at least one R is selected from C$_{1-16}$ alkyl, C$_{1-16}$ heteroalkyl, substituted C$_{1-16}$ alkyl, and substituted C$_{1-16}$ heteroalkyl;

(ii) the polythioether prepolymer comprises two or more moieties having the structure of Formula (10):

$$—X—(CH_2)_a—X— \quad (10)$$

wherein,
a is an integer from 1 to 6;
each X is independently selected from O and S; and
the value of a in a first moiety of Formula (10) is different than the value of a in a second moiety of Formula (10); or
(iii) a combination thereof.

According to the present invention, terminal-modified polythioether prepolymers comprise a terminal-modified polythioether of Formula (3d):

$$R^{12}—[-A-D-]_n-A-R^{12} \quad (3d)$$

wherein,
n, A, and D are defined as for Formula (3); and
each $R^{12}$ is independently a moiety comprising a terminal functional group.

According to the present invention, terminal-modified polythioether prepolymers comprise the reaction product of reactants comprising (a) the polythioether prepolymer of claim 1; and (b) a compound comprising a terminal functional group and a terminal group reactive with a polythioether prepolymer of according to the present invention.

According to the present invention, compositions comprise a polythioether prepolymer according to the present invention.

According to the present invention, cured compositions are prepared from a composition according to the present invention.

According to the present invention, parts comprise a cured composition according to the present invention.

According to the present invention, vehicles comprise a cured composition according to the present invention.

According to the present invention, methods of sealing a surface comprise applying a composition according to the present invention to a surface; and curing the applied composition to seal the surface.

According to the present invention, sealant systems comprise: a first part, wherein the first part comprises a polythioether prepolymer according to the present invention; and a second part, wherein the second part comprises a curing agent, wherein the curing agent is reactive with the polythioether prepolymer.

According to the present invention, sealant compositions are prepared by combining the first part of the sealant system according to the present invention and the second part of the sealant system according to the present invention.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_aCH_2CH_aCH_2$—), heptane-1,7-diyl, octane-1,8-diyl, nonane-1,9-diyl, decane-1,10-diyl, and dodecane-1,12-diyl. Alkanediyl groups can include single, double, and/or triple bonds between carbon atoms.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_416$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure —CR=C(R)$_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure —CH=CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, or $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzenediyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_6$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A "polyalkenyl prepolymer" refers to a polyalkenyl having at least one repeat unit in the polyalkenyl backbone. A polyalkenyl prepolymer can have a number average molecular weight in the range from 500 Da to 6,000 Da, such as from 500 Da to 4,000 Da or from 500 Da to 2,000 Da, where the number average molecular weight is determined using gel permeation chromatography with a polystyrene standard.

A "monomeric polyalkenyl" refers to a polyalkenyl that does not include repeat units in the polyalkenyl backbone. A monomeric polyalkenyl generally has a molecular weight that is less than that of a polyalkenyl prepolymer. Monomeric polyalkenyls can be difunctional or can have an alkenyl functionality greater than two.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" refers to a chemical reaction product(s) of at least the recited reactants and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

A compound having a thiol functionality, or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups or are bonded to the backbone.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—(R)$_n$—SH having thiol terminal groups is —(R)$_n$—.

A "core" of a polyfunctionalizing agent B(—V)$_z$ refers to the moiety B. A "core" of a compound or a prepolymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (21° C. to 25° C.) and pressure (760 torr; 101 kPa).

A prepolymer includes multiple repeating subunits bonded to each other that can be the same or different. The multiple repeating subunits make up the backbone of the prepolymer.

A "sulfur-containing prepolymer" refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure HS—R—R(—$CH_2$—SH)—[—R—($CH_2$)$_2$—S(O)$_2$—($CH_2$)—S(O)$_2$]n-CH=$CH_2$ where each R is a moiety that does not contain a sulfur atom, is not encompassed by a sulfur-containing prepolymer although the prepolymer includes terminal thiol groups and sulfone groups incorporated within the backbone. A prepolymer having the structure HS—R—R(—$CH_2$—SH)—[—R—($CH_2$)$_2$—S(O)$_2$—($CH_2$)—S(O)$_2$]—CH=$CH_2$ where at least one R is a moiety that contains a sulfur atom, such as a thioether group —S—, is encompassed by a sulfur-containing prepolymer. Examples of sulfur-containing prepolymers include polythioether prepolymers, polysulfide prepolymers, sulfur-containing polyformal prepolymers, and monosulfide prepolymers.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, fillers, pigments, and adhesion promoters. A curable composition may be curable at room temperature or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed, and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A, determined according to ISO 868. For coating applications, a curable composition can have a viscosity, for example, from 200 cps to 800 cps (0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Substituted" refers to a group in which one or more hydrogen atoms are each independently replaced with the same or different substituent(s). A substituent can comprise halogen, —S(O)$_2$OH, —S(O)$_2$, —SH, —SR where R is $C_{1-6}$ alkyl, —COOH, —NO$_2$, —NR$_2$ where each R independently comprises hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —COR where R is $C_{1-6}$ alkyl. A substituent can be —OH, —NH$_2$, or $C_{1-3}$ alkyl. Each of the one or more substituent groups can be selected from —OH, halogen, $C_{1-6}$ alkoxy, $C_{1-6}$ alkyl, $C_{1-6}$ heteroalkyl, and —NR$_2$ where each R is independently selected from hydrogen and $C_{1-3}$ alkyl. Each of the one or more heteroatoms can be selected from O, S, and Si.

"Derived from" as in "a moiety derived from a compound" refers to a moiety that is generated upon reaction of a parent compound with a reactant. For example, a bis (alkenyl) compound $CH_2$=CH—R—CH=$CH_2$ can react with another compound such as a compound having thiol groups to produce the moieties —($CH_2$)$_2$—R—($CH_2$)$_2$— and —S— derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—

OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise $CH_2$=CH—$CH_2$—O—, where the terminal alkenyl group $CH_2$=CH— is reactive with a thiol group —SH. Upon reaction with a thiol group, the moiety —V'— is —$CH_2$—$CH_2$—$CH_2$—O—.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

A polyfunctionalizing agent can have the structure of Formula (1):

$$B(-V)_z \quad (1)$$

where $B^1$ is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=$CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety —$V^1$— results and is said to be derived from the reaction with the other compound. For example, when V is —R—CH=$CH_2$ and is reacted, for example, with a thiol group, the moiety $V^1$ is —R—$CH_2$—$CH_2$— is derived from the reaction.

In polyfunctionalizing agents of Formula (1), B can be, for example $C_{2-8}$ alkane-triyl, $C_{2-8}$ heteroalkane-triyl, $C_{5-8}$cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable polythiol polyfunctionalizing agents include pentaerythritol tetra-acrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), 1,8-dimercapto-3,6-dioxaoctane, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra (3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate of Formula (2a):

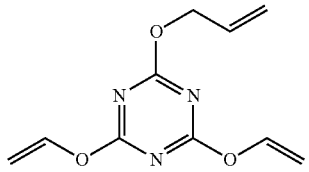
(2a)

results in a moiety having the structure of Formula (2b):

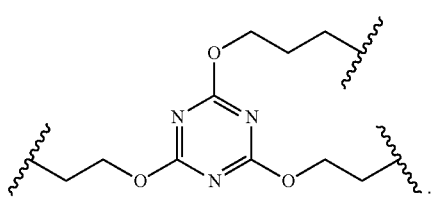
(2b)

where the segments are bonded to the other reactants.

"Polythiol polyfunctionalizing agent" refers to a polythiol having, for example, from 3 to 6 terminal thiol groups. A polythiol polyfunctionalizing agent can have a molecular weight, for example, less than 1,400 Da, less than 1,200 Da, less than 1,000 Da, less than 800 Da, less than 700 Da, less than 600 Da, less than 500 Da, less than 400 Da, less than 300 Da, less than 200 Da, or less than 100 Da. Polythiol polyfunctionalizing agents can be represented by the formula $B(-V)_z$, where $B^4$ represents a core of a z-valent polyfunctionalizing agent $B(-V)_z$, z is an integer from 3 to 6; and each —V is a moiety comprising a terminal thiol (—SH) group.

A polythiol or a polyalkenyl can comprise a polythiol polyfunctionalizing agent or a polyalkenyl polyfunctionalizing agent, respectively.

"Composition" refers to a product comprising the specified components in the specified amounts, as well as any product which results, directly or indirectly, from the combination of the specified ingredients in the specified amounts.

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards. For thiol terminated compounds the number average molecular weight is determined using iodine titration.

"Application time" refers to the duration during which a curable composition can be applied to a surface. The application time can be for example, at least 2 hours, at least 4 hours, at least 6 hours, at least 12 hours, at least 16 hours, at least 20 hours, or at least 24 hours. The application time can depend on the method of application such as, for example, by extrusion, rolling, brushing, or spreading. The application time of a curable composition can be determined by measuring the extrusion rate of a composition. For example, the application time of a curable composition provided by the present disclosure can be defined as the duration until the curable composition exhibits an extrusion rate, as determined by extrusion through a No. 440 nozzle (Semco®, 0.125-inch internal diameter and 4-inch length, available from PPG Aerospace) at a pressure of 90 psi (620 KPa), is greater than 15 g/min, greater than 30 g/min, or greater than 50 g/min. An appropriate application time can depend, for example, on the specific application method, temperature, humidity, thickness, surface area, and volume.

"Tack free time" refers to the duration from the time when co-reactive components are first combined and mixed to form a curable sealant until a coating prepared from the curable sealant exhibits is tack free as determined by applying a polyethylene sheet to the surface of the sealant with hand pressure and observing whether sealant adheres to the surface of the polyethylene sheet.

"Full cure" refers to the duration from the time when co-reactive components are first combined and mixed to form a curable sealant until a coating prepared from the curable sealant exhibits a hardness of at least Shore 40A at 25° C. and 50% RH. A time to full cure can be, for example, from 1 week to 2 weeks, from 1 week to 6 weeks, from 2 weeks to 5 weeks, or from 3 weeks to 5 weeks.

"Cure time" refers to the duration from the time when the co-reactive components are first combined and mixed to form a curable sealant until a coating prepared from the curable sealant exhibits a hardness of Shore 30A at conditions of 25° C. and 50% RH.

Specific gravity is determined according to ASTM D1475.

Shore A hardness is measured using a Type A durometer in accordance with ASTM D2240.

Tensile strength and elongation are measured according to AMS 3279.

"Nucleation temperature" refers to the temperature at which a solid begins to form in a clear solution as determined by visual observation. To observe the formation of a solid, a 15-gram sample of material is placed in a 20 mL vial and the temperature slowly decreased. Polythioether prepolymers provided by the present disclosure are visually clear at room temperature. As the temperature is reduced, nucleation becomes apparent as a cloudy solution. Nucleation can also be detected using light scattering methods.

"Polythioether prepolymers provided by the present disclosure" refer to, in part, prepolymers having a nucleation temperature less than 5° C.

"Thiol-reactive" as in thiol-reactive adduct and thiol-reactive monomer refers to a group that is capable of reacting with a thiol group and includes, for examples, alkenyl groups, alkynyl groups, epoxy groups, Michael acceptor groups, and isocyanate groups.

A "Michael acceptor" refers to an activated alkene, such as an alkenyl group proximate to an electron-withdrawing group such as, for example, a ketone, halo, carbonyl (—CO), nitro (—NO$_2$), nitrile (—CN), alkoxycarbonyl (—COOR), phosphonate (—PO(OR)$_2$), trifluoromethyl (—CF$_3$), sulfonyl (—SO$_2$—), trifluoromethanesulfonyl (—SO$_2$CF$_3$), or p-toluenesulfonyl (—SO$_2$—C$_6$H$_4$—CH$_3$). In certain embodiments, a Michael acceptor group is selected from a vinyl ketone, a vinyl sulfone, a quinone, an enamine, a ketimine, an aldimine, an oxazolidine, and an acrylate. In certain embodiments, a Michael acceptor or Michael acceptor group does not encompass acrylates. A "Michael acceptor compound" refers to a compound comprising at least one Michael acceptor group. In certain embodiments, a Michael acceptor compound is divinyl sulfone, and a Michael acceptor group is vinylsulfonyl, e.g., —S(O)$_2$—CH$_2$=CH$_2$. Other examples of Michael acceptors are disclosed in Mather et al., *Prog. Polym. Sci.*, 2006, 31, 487-531, and include acrylate esters, acrylonitrile, acrylamides, maleimides, alkyl methacrylates, and cyanoacrylates. Types of compounds that function as Michael acceptors include vinyl ketones, quinones, nitroalkenes, acrylonitriles, acrylates, methacrylates, cyanoacrylates, acrylamides, maleimides, dialkyl vinylphosphonate, and vinylsulfones. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor compound is divinyl sulfone, and a Michael acceptor group is vinylsulfonyl, i.e., —S(O)$_2$—CH=CH$_2$. A Michael acceptor compound can be a bis(vinylsulfonyl)alkanol, and a Michael acceptor group is 1-(ethylenesulfonyl)-n-(vinylsulfonyl)alkanol, i.e., —CH$_2$—CH$_2$—S(O)$_2$—R$^{10}$—CH(—OH)—R$^{10}$—S(O)$_2$—CH=CH$_2$, and in certain embodiments, 1-(ethylenesulfonyl)-3-(vinylsulfonyl)propan-2-ol (—CH$_2$—CH$_2$—S(O)$_2$—CH$_2$—CH(—OH)—CH$_2$—S(O)$_2$—CH=CH$_2$).

"Monomer" refers to a compound that does not include repeat unit. A monomer can have a molecular weight that is less than a prepolymer. For example, a monomer can have a molecular weight from 50 Da to 800 Da, from 100 Da to 700 Da, or from 150 Da to 600 Da. A monomer can have a molecular weight, for example less than 800 Da, less than 700 Da, less than 600 Da, or less than 500 Da.

"Adduct" such as in a dithiol adduct and a thiol-reactive adduct refers to a compound formed by reacting at least two monomers. An adduct generally has a molecular weight greater than that of a monomer and less than that of a prepolymer.

"Pendent group" refers to a group that is bonded to the backbone of an adduct or a prepolymer. A pendent group may not comprise a reactive functionality. A pendent group can comprise a reactive functionality that is different than the terminal functionality of the adduct or prepolymer. A pending group can comprise a reactive functionality that is not reactive with the curing agent used to cure the prepolymer. A pendent group is not oligomeric or polymeric.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Polythioether prepolymers provided by the present disclosure and compositions comprising the polythioether prepolymers provided by the present disclosure exhibit a nucleation temperature less than 5° C. (41° F.). The polythioether prepolymers comprise a chemical structure that disrupts the symmetry of the polythioether prepolymer chain. The symmetry of a polythioether prepolymer chain can be modified by including pendent groups extending from the backbone of the prepolymer chain and/or the symmetry of the prepolymer chain can be modified by including segments having a different number of —CR$_2$— groups between heteroatoms, where each R can independently be selected from hydrogen or an organic group. For example, a polythioether prepolymer chain can comprise segments having the structure —(—X—(CH$_2$)$_a$—)$_n$— where X is selected from O and S, a is an integer from 1 to 6, and the polythioether prepolymer comprises segments having different values of a. For example, a polythioether can have segments —X—CH$_2$—X—, —X—(CH$_2$)$_2$—X—, —X—(CH$_2$)$_3$—X—, and/or —X—(CH$_2$)$_4$—X—. Polythioether prepolymers provided by the present disclosure can comprise segments having both pendent groups and segments having a different number of —CR$^2$— groups between heteroatoms. A segment having pendent groups is referred to as a non-linear segment and can be derived from a non-linear monomer.

Polythioether prepolymers provided by the present disclosure can comprise a moiety having the structure of Formula (3):

-[-A-D-]$_n$A- (3)

wherein, (a) n is an integer from 1 to 60;

(b) each A is independently selected from a moiety of Formula (4), a moiety of Formula (5), and a moiety of Formula (6):

 (4)

 (5)

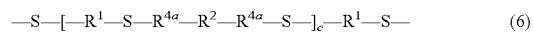 (6)

(c) each D is independently selected from a moiety of Formula (7), a moiety of Formula (8), and a moiety of Formula (9):

 (7)

 (8)

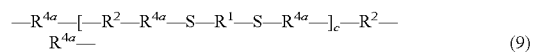 (9)

(d) wherein, (i) c is an integer from 1 to 4;

(ii) each R$^1$ is independently selected from C$_{2-10}$ heteroalkanediyl, substituted C$_{2-10}$ heteroalkanediyl, and —[(CR$_2$)$_p$—X—]$_q$—(CR$_2$)$_r$—, wherein, p is an integer from 1 to 6;

q is an integer from 1 to 5;

r is an integer from 2 to 10;

each X is independently selected from O and S; and each R is independently selected from hydrogen, C$_{1-16}$ alkyl, C$_{1-16}$ heteroalkyl, substituted C$_{1-16}$ alkyl, and substituted C$_{1-16}$ heteroalkyl;

(iii) each R$^2$ is independently selected from C$_{2-10}$ heteroalkanediyl, substituted C$_{2-10}$ heteroalkanediyl, —[(CR$_2$)$_p$—X—]$_q$—(CR$_2$)$_r$—, C$_{5-16}$ cycloalkanediyl, substituted C$_{5-16}$ cycloalkane-diyl, C$_{5-12}$ alkanecycloalkane-diyl, and substituted C$_{5-12}$ alkanecycloalkane-diyl, wherein, p is an integer from 1 to 6;

q is an integer from 1 to 5;

r is an integer from 2 to 10;

each X is independently selected from O and S; and each R is independently selected from hydrogen, C$_{1-16}$ alkyl, C$_{1-16}$ heteroalkyl, substituted C$_{1-16}$ alkyl, and substituted C$_{1-16}$ heteroalkyl;

(iv) B represents a core of a z-valent, polythiol polyfunctionalizing agent B(—R$^3$—SH)$_z$ or a thiol-reactive polyfunctionalizing agent B(—R$^3$—R$^4$)$_z$ wherein, z is an integer from 3 to 6;

each R$^3$ is independently selected from C$_{1-10}$ alkanediyl, C$_{1-10}$ heteroalkanediyl, substituted C$_{1-10}$ alkanediyl, and substituted C$_{1-10}$ heteroalkanediyl; and R$^4$ is a thiol-reactive group; and (v) each R$^4$ independently comprises a group derived from a reaction of a thiol-reactive group R$^4$ with a thiol group; and (e) wherein,
(i) at least one of $R^1$ and $R^2$ is selected from substituted $C_{2-10}$ heteroalkanediyl, and —[$(CR_2)_p$—X—]$_q$ $(CR_2)_r$, wherein,
p is an integer from 1 to 6;
q is an integer from 1 to 5;
r is an integer from 2 to 10;
each X is independently selected from O and S; and
at least one R is selected from $C_{1-16}$ alkyl, $C_{1-16}$ heteroalkyl, substituted $C_{1-16}$ alkyl, and substituted $C_{1-16}$ heteroalkyl;
(ii) the polythioether prepolymer comprises at least one moiety of Formula (10a) and at least one moiety of Formula (10b):

—X—$(CH_2)_{a1}$—X— (10a)

—X—$(CH_2)_{a2}$—X— (10b)

wherein,
a1 is an integer from 1 to 6;
a2 is an integer from 1 to 6, and is not the same as a1;
each X is independently selected from O and S; or
(iii) a combination thereof.

In moieties of Formula (3), n can be, for example, an integer from 1 to 50, from 1 to 40, from 1 to 30, from 1 to 20, from 5 to 20, or from 5 to 10.

A moiety of Formula (4) can be derived from a dithiol monomer of Formula (4a):

HS—$R^1$—SH (4a)

where $R^1$ is defined as for Formula (4).

In moieties of Formula (4) and dithiol monomers of Formula (4a), $R^1$ can be —[$(CH_2)_p$—X—]$_q(CH_2)_r$—.

In moieties of Formula (4) and dithiol monomers of Formula (4a), X can be selected from O and S, and thus —[$(CH_2)_p$—X—]$_q(CH_2)_r$— can be —[$(CH_2)_p$—O—]$_q$$(CH_2)_r$— or —[$(CH_2)_p$—S—]$_q(CH_2)_r$—. P and r can be equal, such as where p and r can be both two.

In moieties of Formula (4) and dithiol monomers of Formula (4a), $R^1$ can be selected from $C_{2-6}$ alkanediyl and —[$(CH_2)_p$—X—]$_q(CH_2)_r$—.

In moieties of Formula (4) and dithiol monomers of Formula (4a), $R^1$ can be —[$(CH_2)_p$—X—]$_q(CH_2)_r$, and X can be O, or X can be S.

In moieties of Formula (4) and dithiol monomers of Formula (4a), where $R^1$ can be —[$(CH_2)_p$—X—]$_q(CH_2)_r$, p can be 2, r can be 2, q can be 1, and X can be S; or p can be 2, q can be 2, r can be 2, and X can be O; or p can be 2, r can be 2, q can be 1, and X can be O.

In moieties of Formula (4) and dithiol monomers of Formula (4a), each $R^1$ can be derived from 1,8-dimercapto-3,6-dioxaoctane (DMDO; 2,2-(ethane-1,2-diylbis(sulfanyl)) bis(ethan-1-thiol)), or each $R^1$ can be derived from dimercaptodiethylsulfide (DMDS; 2,2'-thiobis(ethan-1-thiol)), and combinations thereof.

In moieties of Formula (4) and dithiol monomers of Formula (4a), each p can independently be selected from 1, 2, 3, 4, 5, and 6. Each p can be the same and can be 1, 2, 3, 4, 5, or 6.

In moieties of Formula (4) and dithiol monomers of Formula (4a), each q can independently be 1, 2, 3, 4, or 5. Each q can be the same and can be 1, 2, 3, 4, or 5.

In moieties of Formula (4) and dithiol monomers of Formula (4a), each r can independently be 2, 3, 4, 5, 6, 7, 8, 9, or 10. Each r can be the same and can be 2, 3, 4, 5, 6, 7, 8, 9, or 10.

In moieties of Formula (4) and dithiol monomers of Formula (4a), each r can independently be an integer from 2 to 4, from 2 to 6, or from 2 to 8.

In moieties of Formula (4) and dithiol monomers of Formula (4a), $R^1$ can be —[$(CH_2)_p$—X—]$_q(CH_2)_r$—, wherein each X is independently selected from O and S; p is an integer from 1 to 3; q is an integer from 1 to 3; and r is an integer from 2 to 6.

In moieties of Formula (4) and dithiol monomers of Formula (4a), $R^1$ can be selected from —[$(CR_2)_p$—X—]$_q$ $(CR_2)_r$—, —[$(CHR)_p$—X—]$_q(CR_2)_r$—, —[$(CH_2)_p$—X—]$_q$ $(CR_2)_r$—, —[$(CH_2)_p$—X—]$_q(CHR)_r$—, —[$(CR_2)_p$—X—]$_q$ $(CHR)_r$—, —[$(CR_2)_p$—X—]$_q(CH_2)_r$—, and —[$(CHR)_p$—X—]$_q(CH_2)_r$—.

In moieties of Formula (4) and dithiol monomers of Formula (4a), at least one R can be selected from $C_{1-6}$ alkyl, $C_{1-6}$ heteroalkyl, substituted $C_{1-6}$ alkyl, and substituted $C_{1-6}$ heteroalkyl.

In moieties of Formula (4) and dithiol monomers of Formula (4a), $R^1$ can be selected from $C_{2-10}$ heteroalkanediyl and substituted $C_{2-10}$ heteroalkanediyl.

In moieties of Formula (4) and dithiol monomers of Formula (4a), $R^1$ can be selected from $C_{2-10}$ heteroalkanediyl such as $C_{2-8}$ heteroalkanediyl, $C_{2-6}$ heteroalkanediyl, or $C_{2-4}$ heteroalkanediyl. Each of the one or more heteroatoms can be independently selected from, for example, O and S.

In moieties of Formula (4) and dithiol monomers of Formula (4a), $R^1$ can be selected from substituted $C_{2-10}$ heteroalkanediyl such as substituted $C_{2-8}$ heteroalkanediyl, substituted $C_{2-6}$ heteroalkanediyl, or substituted $C_{2-4}$ heteroalkanediyl. Each of the one or more heteroatoms can be independently selected from, for example, O and S. Each of the one or more substituent groups can be selected from $C_{1-6}$ alkyl, $C_{1-6}$ heteroalkyl, substituted $C_{1-6}$ alkyl, and substituted $C_{1-6}$ heteroalkyl.

Examples of suitable dithiol monomers include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol monomer having pendent groups can be selected from HS—$(CH_2)_2$—S—$CH_2$—CH(—$CH_3$)—SH and HS—$(CH_2)_2$—S—CH(—$CH_3$)—$CH_2$—SH, and a combination thereof.

In moieties of Formula (3), A can be a moiety of Formula (5), which can be derived from a polythiol polyfunctionalizing agent of Formula (5a):

B(—$R^3$—SH)$_z$ (5a)

wherein z, B, and $R^3$ are defined as for Formula (5).

In moieties of Formula (5) and polythiol polyfunctionalizing agents of Formula (5a), z can bean integer from 3 to 5, an integer from 3 to 4, or can be 3, 4, 5, or 6.

In moieties of Formula (5) and polythiol polyfunctionalizing agents of Formula (5a), $R^3$ can be selected from $C_{1-10}$ alkanediyl, $C_{1-10}$ heteroalkanediyl, substituted $C_{1-10}$ alkanediyl, and substituted $C_{1-10}$ heteroalkanediyl, where each of the one or more heteroatoms can be selected from O and S, and each of the one or more substituent groups can be selected from $C_{1-6}$ alkyl, $C_{1-6}$ heteroalkyl, substituted $C_{1-6}$ alkyl, and substituted $C_{1-6}$ heteroalkyl.

In moieties of Formula (5) and polythiol polyfunctionalizing agents of Formula (5a), each $R^3$ can independently be selected from $C_{1-10}$ alkanediyl such as $C_{1-8}$ alkanediyl, $C_{2-6}$ alkanediyl, and $C_{2-4}$ alkanediyl.

In moieties of Formula (5) and polythiol polyfunctionalizing agents of Formula (5a), each $R^3$ can independently be selected from $C_{1-10}$ heteroalkanediyl such as $C_{1-8}$ heteroalkanediyl, $C_{2-6}$ heteroalkanediyl, and $C_{2-4}$ heteroalkanediyl, where each of the one or more heteroatoms is independently selected from O and S.

Examples of suitable polythiol polyfunctionalizing agents include 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations of any of the foregoing.

Other examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable polyfunctionalizing agents also include mercapto-acetate polythiols such as pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylate polythiol polyfunctionalizing agents include pentaerythritol tetraacrylate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol), 1,8-dimercapto-3,6-dioxaoctane, and combinations of any of the foregoing.

Other examples of suitable polyfunctionalizing agents include isocyanurate-containing trithiols as disclosed in U.S. Application Publication No. 2010/0010133, and the polythiols disclosed in U.S. Pat. Nos. 4,366,307; 4,609,762; and 5,225,472.

Suitable polyfunctionalizing agents are commercially available, for example, from Bruno Bock Thiochemicals under the Thiocure® tradename.

A moiety of Formula (6) can be derived from a dithiol adduct of Formula (6a):

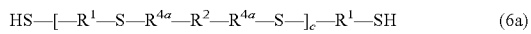

$$HS-[-R^1-S-R^{4a}-R^2-R^{4a}-S-]_c-R^1-SH \quad (6a)$$

where c, $R^2$, and $R^{4a}$ are defined as for Formula (6) and $R^1$ is defined as for Formula (4).

For example, a moiety of Formula (6) can result from the reaction of a dithiol adduct of Formula (6a) with thiol-reactive groups.

In moieties of Formula (6) and dithiol adducts of Formula (6a), c can be 1, 2, 3, or 4.

In moieties of Formula (6) and dithiol adducts of Formula (6a), each $R^1$ can be defined as for a moiety of Formula (4) or a dithiol monomer of Formula (4a). $R^1$ in moieties of Formula (6) and dithiol adducts of Formula (6a) can be different than in moieties of Formula (4) and in dithiol monomers of Formula (4a).

In moieties of Formula (6) and dithiol adducts of Formula (6a), each $R^2$ can be defined as for a moiety of Formula (5) or a dithiol monomer of Formula (5a). $R^2$ in moieties of Formula (6) and dithiol adducts of Formula (6a) can be different than in moieties of Formula (5) and in dithiol monomers of Formula (5a).

In moieties of Formula (6) and dithiol adducts of Formula (6a), each $R^{4a}$ can be the same and can be, for example, $-CH_2-CH_2-$.

A dithiol adduct of Formula (6a) can comprise the reaction product of reactants comprising:

(a) a dithiol monomer of Formula (4a):

$$HS-R^1-SH \quad (4a); \text{ and}$$

(b) a difunctional thiol-reactive monomer of Formula (7a):

$$R^4-R^2-R^4 \quad (7a)$$

wherein $R^1$ and $R^2$, are defined for Formula (4) and Formula (7), respectively, and $R^4$ is a thiol-reactive group. Examples of suitable thiol-reactive groups include epoxy groups, alkenyl groups, alkynyl groups, Michael acceptor groups, and isocyanate groups.

The molar ratio of the dithiol monomer (a) to the difunctional thiol-reactive monomer (b) in the reactants can be, for example, from 2 to 1.1, from 1.8 to 1.3, from 1.7 to 1.4, or from 1.6 to 1.4, such as 1.5. When an excess molar ratio of a dithiol monomer is used, the adduct will be thiol-terminated.

A dithiol adduct can be, for example, a 2:1 adduct of a compound of Formula (4a) to Formula (7a); a 3:2 adduct, or a 4:3 adduct.

In moieties of Formula (3), a moiety of a moiety of Formula (7) can be derived from a difunctional thiol-reactive monomer of Formula (7a):

$$R^4-R^2R^4 \quad (7a)$$

wherein $R^2$ is defined as for Formula (7); and each $R^4$ is independently a thiol-reactive group. Examples of thiol-reactive groups include alkenyl groups, alkynyl groups, epoxy groups, Michael acceptor groups, and isocyanate groups.

In moieties of Formula (7) and difunctional thiol-reactive monomers of Formula (7a), $R^2$ can be $-[(CH_2)_p-X-]_q(CH_2)_r-$.

In moieties of Formula (7) and difunctional thiol-reactive monomers of Formula (7a), X can be selected from O and S, and thus $-[(CH_2)_p-X-]_q(CH_2)_r-$ can be $-[(CH_2)_p-O-]_q(CH_2)_r-$ or $-[(CH_2)_p-S-]_q(CH_2)_r-$. P and r can be equal, such as where p and r can be both two.

In moieties of Formula (7) and difunctional thiol-reactive monomers of Formula (7a), $R^2$ can be selected from $C_{2-6}$ alkanediyl and $-[(CH_2)_p-X-]_q(CH_2)_r-$.

In moieties of Formula (7) and difunctional thiol-reactive monomers of Formula (7a), $R^2$ can be $-[(CH_2)_p-X-]_q(CH_2)_r-$, and X can be O, or X can be S.

In moieties of Formula (7) and difunctional thiol-reactive monomers of Formula (7a), where $R^2$ can be $-[(CH_2)_p-X-]_q(CH_2)_r-$, p can be 2, r can be 2, q can be 1, and X can be S; or p can be 2, q can be 2, r can be 2, and X can be O; or p can be 2, r can be 2, q can be 1, and X can be O.

In moieties of Formula (7) and difunctional thiol-reactive monomers of Formula (7a), each p can independently be selected from 1, 2, 3, 4, 5, and 6. Each p can be the same and can be 1, 2, 3, 4, 5, or 6.

In moieties of Formula (7) and difunctional thiol-reactive monomers of Formula (7a), each q can independently be 1, 2, 3, 4, or 5. Each q can be the same and can be 1, 2, 3, 4, or 5.

In moieties of Formula (7) and difunctional thiol-reactive monomers of Formula (7a), each r can independently be 2, 3, 4, 5, 6, 7, 8, 9, or 10. Each r can be the same and can be 2, 3, 4, 5, 6, 7, 8, 9, or 10. In moieties of Formula (7) and difunctional thiol-reactive monomers of Formula (7a), each r can independently be an integer from 2 to 4, from 2 to 6, or from 2 to 8.

In moieties of Formula (7) and difunctional thiol-reactive monomers of Formula (7a), $R^2$ can be —[(CH$_2$)$_p$—X—]$_q$(CH$_2$)$_r$—, wherein each X can be independently selected from O and S; p can be an integer from 1 to 3; q can be an integer from 1 to 3; and r can be an integer from 2 to 6.

In moieties of Formula (7) and difunctional thiol-reactive monomers of Formula (7a), $R^2$ can be selected from —[(CR$_2$)$_p$—X—]$_q$(CR$_2$)$_r$—, —[(CHR)$_p$—X—]$_q$(CR$_2$)$_r$—, —[(CH$_2$)$_p$—X—]$_q$(CR$_2$)$_r$—, —[(CH$_2$)$_p$—X—]$_q$(CHR)$_r$—, —[(CR$_2$)$_p$—X—]$_q$(CHR)$_r$—, —[(CR$_2$)$_p$—X—]$_q$(CH$_2$)$_r$—, and —[(CHR)$_p$—X—]$_q$(CH$_2$)$_r$—.

In moieties of Formula (7) and difunctional thiol-reactive monomers of Formula (7a), at least one R can be selected from $C_{1-6}$ alkyl, $C_{1-6}$ heteroalkyl, substituted $C_{1-6}$ alkyl, and substituted $C_{1-6}$ heteroalkyl.

In moieties of Formula (7) and difunctional thiol-reactive monomers of Formula (7a), $R^2$ can be selected from $C_{2-10}$ heteroalkanediyl and substituted $C_{2-10}$ heteroalkanediyl.

In moieties of Formula (7) and difunctional thiol-reactive monomers of Formula (7a), $R^2$ can be selected from $C_{2-10}$ heteroalkanediyl such as $C_{2-8}$ heteroalkanediyl, $C_{2-6}$ heteroalkanediyl, or $C_{2-4}$ heteroalkanediyl. Each of the one or more heteroatoms can be independently selected from, for example, O and S.

In moieties of Formula (7) and difunctional thiol-reactive monomers of Formula (7a), $R^2$ can be selected from substituted $C_{2-10}$ heteroalkanediyl such as substituted $C_{2-8}$ heteroalkanediyl, substituted $C_{2-6}$ heteroalkanediyl, and substituted $C_{2-4}$ heteroalkanediyl. Each of the one or more heteroatoms can be independently selected from, for example, O, S, or Si. Each of the one or more substituent groups can be selected from $C_{1-6}$ alkyl, $C_{1-6}$ heteroalkyl, substituted $C_{1-6}$ alkyl, and substituted $C_{1-6}$ heteroalkyl.

In moieties of Formula (7), $R^2$ can be selected from $C_{1-6}$ cycloalkane-diyl or substituted $C_{1-6}$ cycloalkane-diyl; and in thiol-reactive monomers of Formula (7a), the thiol-reactive monomer can be a $C_{5-16}$ cycloalkadiene or a substituted $C_{5-16}$ cycloalkadiene.

In moieties of Formula (7), $R^2$ can be selected from $C_{5-16}$ alkanecycloalkane-diyl or substituted alkanecycloalkane-diyl; and in thiol-reactive monomers of Formula (7a), the thiol-reactive monomer can be a $C_{5-16}$ alkenecycloalkene or a substituted $C_{5-16}$ alkenecycloalkene.

In difunctional thiol-reactive monomers of Formula (7a), each $R^4$ can be independently selected from an alkenyl group, an alkynyl group, an epoxy group, an isocyanate group, or a Michael acceptor group.

In difunctional thiol-reactive monomers of Formula (7), each $R^4$ can be the same or different.

In difunctional thiol-reactive monomers of Formula (7), each $R^{4a}$ can be derived from the reaction of an alkenyl group, an alkynyl group, an epoxy group, an isocyanate group, or a Michael acceptor group; with a thiol group.

In moieties of Formula (7), each $R^{4a}$ can be independently selected from —CH$_2$—CH$_2$—, —CH=CH—, —C(=O)—NH—, —CH$_2$—CH(—OH)—, and —(CH$_2$)$_2$-EW-, where EW is an electron withdrawing group.

In moieties of Formula (7), each $R^{4a}$ can be the same or different.

In moieties of Formula (7), each $R^{4a}$ can be alkenyl —CH=CH$_2$, and in moieties of Formula (7), each $R^{4a}$ can be —CH$_2$—CH$_2$—.

A thiol-reactive monomer of Formula (7a) can comprise CH$_2$=CH—Si(—CH$_3$)$_2$—O—Si(—CH$_3$)$_2$—CH=CH$_2$, CH$_2$=CH—O—CH$_2$—CH(—CH$_3$)—O—CH=CH$_2$, CH$_2$=CH—CH$_2$—O—CH$_2$—C(—CH$_2$—OH)(—CH$_2$—CH$_3$)—CH$_2$—O—CH$_2$—CH=CH$_2$, (2-(2-ethyl-4-(vinyloxy)-3-((vinyloxy)methyl)butoxy)ethyl)(3,3,4,4,5,5,6,6,6-nonafluorohexyl)sulfane (fluorinated diolefin), or a combination of any of the foregoing; and a moiety of Formula (7) can have the structure —(CH$_2$)$_2$—Si(—CH$_3$)$_2$—O—Si(—CH$_3$)$_2$—(CH$_2$)$_2$—, —(CH$_2$)$_2$O—CH$_2$—CH(—CH$_3$)—O—(CH$_2$)$_2$—, —(CH$_2$)$_2$—CH$_2$—O—CH$_2$—C(—CH$_2$—OH)(—CH$_2$—CH$_3$)—CH$_2$—O—CH$_2$—(CH$_2$)$_2$—, 2-(2-ethyl-4-(yl-methoxy)-3-((yl-methoxy)methyl)butoxy)ethyl)(3,3,4,4,5,5,6,6,6-nonafluorohexyl) sulfane, or a combination of any of the foregoing.

A difunctional thiol-reactive monomer of Formula (7a) can comprise a dialkenyl ether having the structure of Formula (11a) and a moiety of Formula (7) can have the structure of Formula (11):

(11)

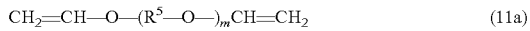

(11a)

wherein, each $R^5$ is independently selected from $C_{1-10}$ alkanediyl, $C_{6-8}$ cycloalkanediyl, $C_{6-14}$ alkanecycloalkanediyl, substituted $C_{1-10}$ alkanediyl, substituted $C_{6-8}$ cycloalkanediyl, $C_{6-14}$ alkanecycloalkanediyl, and —[(CR$_2$)$_p$—X—]$_q$(CR$_2$)$_r$—, wherein p, q, r, R, and X are as for Formula (7); and m is an integer from 1 to 50.

In moieties of Formula (11) and dialkenyl ethers of Formula (11a), m can be an integer from 1 to 50, such as from 1 to 40, from 1 to 20, from 1 to 10, from 2 to 50, from 2 to 40, from 2 to 20, from 2 to 10, from 3 to 50, from 3 to 40, from 3 to 20, or from 3 to 10.

In moieties of Formula (11) and dialkenyl ethers of Formula (11a), each $R^5$ can independently be selected from a $C_{2-10}$ n-alkanediyl group, a $C_{3-6}$ branched alkanediyl group, and a —[(CR$_2$)$_p$—X—]$_q$(CR$_2$)$_r$— group.

In moieties of Formula (11) and dialkenyl ethers of Formula (11a), each $R^5$ can independently be a $C_{2-10}$ n-alkanediyl group, such as methanediyl, ethanediyl, n-propanediyl, or n-butanediyl.

In moieties of Formula (11) and dialkenyl ethers of Formula (11a), each $R^5$ can independently comprise a —[(CH$_2$)$_p$—X—]$_q$(CH$_2$)$_r$— group, where each X can be O or S.

In moieties of Formula (11) and dialkenyl ethers of Formula (11a), each $R^5$ can independently comprise a —[(CH$_2$)$_p$—X—]$_q$(CH$_2$)$_r$— group.

In moieties of Formula (11) and dialkenyl ethers of Formula (11a), each m can be independently an integer from 1 to 3. Each m can be the same and can be 1, 2, or 3.

In moieties of Formula (11) and dialkenyl ethers of Formula (11a), each $R^5$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In moieties of Formula (11) and dialkenyl ethers of Formula (11a), each $R^5$ can independently be a $C_{2-10}$ n-alkanediyl group.

In moieties of Formula (11) and dialkenyl ethers of Formula (11a), each $R^5$ can independently be a $—[(CH_2)_p—X—]_q(CH_2)_r—$ group, where each X can be O or S.

In moieties of Formula (11) and dialkenyl ethers of Formula (11a), each $R^5$ can independently be a $—[(CH_2)_p—X—]_q(CH_2)_r—$ group, where each X can be O or S, and each p can independently be 2, 3, 4, 5, and 6.

In moieties of Formula (11) and dialkenyl ethers of Formula (11a), each p can be the same and can be 2, 3, 4, 5, or 6.

In moieties of Formula (11) and dialkenyl ethers of Formula (11a), each $R^5$ can independently be a $—[(CH_2)_p—X—]_q(CH_2)_r—$ group, where each X can be O or S, and each q can independently be 1, 2, 3, 4, or 5.

In moieties of Formula (11) and dialkenyl ethers of Formula (11a), each q can be the same and can be 1, 2, 3, 4, or 5.

In moieties of Formula (11) and dialkenyl ethers of Formula (11a), each $R^5$ can independently be a $—[(CH_2)_p—X—]_q(CH_2)_r—$ group, where each X can be O or S, and each r can independently be 2, 3, 4, 5, 6, 7, 8, 9, or 10.

In moieties of Formula (11) and dialkenyl ethers of Formula (11a), each r can be the same and can be 2, 3, 4, 5, 6, 7, 8, 9, or 10. In moieties of Formula (11) and dialkenyl ethers of Formula (11a), each r can independently be an integer from 2 to 4, from 2 to 6, or from 2 to 8.

Examples of suitable dialkenyl ethers include ethylene glycol divinyl ether (EG-DVE butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A dialkenyl ether can comprise a sulfur-containing dialkenyl ether. Examples of suitable sulfur-containing dialkenyl ethers are disclosed, for example, in PCT Publication No. WO 2018/085650, which is incorporated by reference in its entirety.

A sulfur-containing dialkenyl ether can have the structure of Formula (12a) and a moiety of Formula (7) can have the structure of Formula (12):

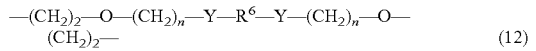

(12)

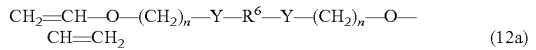

(12a)

wherein, each n can independently be an integer from 1 to 4;

each Y can independently be selected from —O— and —S—; and $R^6$ can be selected from $C_{2-6}$ n-alkanediyl, $C_{3-6}$ branched alkanediyl, $C_{6-8}$ cycloalkanediyl, $C_{6-10}$ alkanecycloalkanediyl, and $—[(—CH_2—)_p—X—]_q(—CH_2—)_r—$, wherein, each X can independently be selected from —O—, —S—, and —S—S—;

p can be an integer from 2 to 6;

q can be an integer from 1 to 5; and r can be an integer from 2 to 6; and at least one Y' is —S—, or $R^6$ is $—[(—CH_2—)_p—X—]_q(—CH_2—)_r—$ and at least one X is —S— or —S—S—.

In moieties of Formula (12) and sulfur-containing dialkenyl ethers of Formula (12a), each n can be 1, 2, 3, or 4.

In moieties of Formula (12) and sulfur-containing dialkenyl ethers of Formula (a), each Y can be —O— or each Y' can be —S—.

In moieties of Formula (12) and sulfur-containing dialkenyl ethers of Formula (12a), $R^6$ can be $C_{2-6}$ n-alkanediyl, such as ethane-diyl, n-propane-diyl, n-butane-diyl, n-pentane-diyl, or n-hexane-diyl.

In moieties of Formula (12) and sulfur-containing dialkenyl ethers of Formula (12a), $R^6$ can be $C_{2-6}$ n-alkanediyl; both Y can be —S— or one Y can be —S— and the other Y can be —O—.

In moieties of Formula (12) and sulfur-containing dialkenyl ethers of Formula (12a), $R^6$ can be $—[(—CH_2—)_p—X—]_q(—CH_2—)_r—$.

In moieties of Formula (12) and sulfur-containing dialkenyl ethers of Formula (12a), $R^6$ can be $—[(—CH_2—)_p—X—]_q(—CH_2—)_r—$, where each X can be —O— or each X can be —S—S— or at least one X can be —O— or at least one X can be —S—S—.

In moieties of Formula (12) and sulfur-containing dialkenyl ethers of Formula (12a), $R^6$ can be $—[(—CH_2—)_p—X—]_q(—CH_2—)_r—$, where each X can be —S— or at least one X can be —S—.

In moieties of Formula (12) and sulfur-containing dialkenyl ethers of Formula (12a), $R^6$ can be $—[(—CH_2—)_p—X—]_q(—CH_2—)_r—$, where each p can be 2 and r can be 2.

In moieties of Formula (12) and sulfur-containing dialkenyl ethers of Formula (12a), $R^6$ can be $—[(—CH_2—)_p—X—]_q(—CH_2—)_r—$, where q can be 1, 2, 3, 4, or 5.

In moieties of Formula (12) and sulfur-containing dialkenyl ethers of Formula (12a), $R^6$ can be $—[(—CH_2—)_p—X—]_q(—CH_2—)_r—$, where each p can be 2, r can be 2, and q can be 1, 2, 3, 4, or 5.

In moieties of Formula (12) and sulfur-containing dialkenyl ethers of Formula (12a), $R^6$ can be $—[(—CH_2—)_p—X—]_q(—CH_2—)_r—$, where each X can be —S—; each p can be 2, r can be 2, and q can be 1, 2, 3, 4, or 5.

In moieties of Formula (12) and sulfur-containing dialkenyl ethers of Formula (12a), $R^6$ can be $—[(—CH_2—)_p—X—]_q(—CH_2—)_r—$, where each X can be —O—; each p can be 2, r can be 2, and q can be 1, 2, 3, 4, or 5.

In moieties of Formula (12) and sulfur-containing dialkenyl ethers of Formula (12a), $R^6$ can be $—[(—CH_2—)_p—X—]_q(—CH_2—)_r—$, where each X can be —O—; and each Y' can be —S—.

In moieties of Formula (12) and sulfur-containing dialkenyl ethers of Formula (12a), $R^6$ can be $—[(—CH_2—)_p—X—]_q(—CH_2—)_r—$, where each X can be —S—; and each Y' can be —O—.

In moieties of Formula (12) and sulfur-containing bis (alkenyl) ethers of Formula (12a), each n can be 2, each Y' can be independently selected from —O— and —S—, and $R^4$ can be $—[(—CH_2—)_p—X—]_q(—CH_2—)_r—$, where each X can independently be selected from —O—, —S—, and —S—S—, p can be 2, q can be selected from 1 and 2, and r can be 2.

In moieties of Formula (12) and sulfur-containing dialkenyl ethers of Formula (12a), each n can be 2, each Y' can be independently selected from —O— and —S—, and $R^4$ can be $C_{2-4}$ alkanediyl, such as ethanediyl, n-propanediyl, or n-butanediyl.

A sulfur-containing dialkenyl ether can comprise, for example, a sulfur-containing bis(alkenyl) ether of Formula (12b), Formula (12c), Formula (12d), Formula (12e), Formula (12f), Formula (12g), Formula (12h), Formula (12i), or a combination of any of the foregoing:

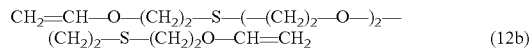

(12b)

$$CH_2=CH-O-(CH_2)_2-S-(CH_2)_2-S-(CH_2)_2-S-(CH_2)_2O-CH=CH_2 \quad (12d)$$

$$CH_2=CH-O-(CH_2)_2-S-(CH_2)_2-O-(CH_2)_2-S-(CH_2)_2O-CH=CH_2 \quad (12d)$$

$$CH_2=CH-O-(CH_2)_2-S-(CH_2)_2-S-(CH_2)_2O-CH=CH_2 \quad (12e)$$

$$CH_2=CH-O-(CH_2)_2-S-(CH_2)_2-O-(CH_2)_2O-CH=CH_2 \quad (12f)$$

$$CH_2=CH-O-(CH_2)_2-O-(CH_2)_2-S-(CH_2)_2-O-(CH_2)_2O-CH=CH_2 \quad (12g)$$

$$CH_2=CH-O-(CH_2)_2-O-(CH_2)_2-S-(CH_2)_2-S-(CH_2)_2-O-(CH_2)_2O-CH=CH_2 \quad (12h)$$

$$CH_2=CH-O-(CH_2)_2-O-(CH_2)_2-S-S-(CH_2)_2-O-(CH_2)_2O-CH=CH_2 \quad (12i)$$

Examples of suitable sulfur-containing dialkenyl ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithia-heptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

The synthesis of sulfur-containing dialkenyl ethers is disclosed, for example, in PCT International Publication No. WO 2018/085650.

A difunctional thiol-reactive monomer of Formula (7a) can comprise a dialkenyl ether monomer having the structure of Formula (13), a dialkenyl monomer having the structure of Formula (14), or a combination thereof:

$$CH_2=CH-O-R^7-O-CH=CH_2 \quad (13)$$

$$CH_2=CH-CH_2-O-R^7-O-CH_2-CH=CH_2 \quad (14)$$

wherein, $R^7$ is selected from $C_{1-10}$ alkanediyl, $C_{1-10}$ heteroalkanediyl, substituted $C_{1-10}$ alkanediyl, and substituted $C_{1-10}$ heteroalkanediyl; and each of the one or more substituent groups is independently selected from $C_{1-6}$ alkyl, $C_{1-6}$ heteroalkyl, substituted $C_{1-6}$ alkyl, and substituted $C_{1-6}$ heteroalkyl.

In difunctional dialkenyl ether monomers of Formula (13) and dialkenyl monomers of Formula (14), $R^7$ can be selected from $C_{1-10}$ heteroalkanediyl, $C_{1-8}$ heteroalkanediyl, $C_{1-6}$ heteroalkanediyl, and $C_{1-4}$ heteroalkanediyl.

In difunctional dialkenyl ether monomers of Formula (13) and dialkenyl monomers of Formula (14), each of the one or more heteroatoms can independently be selected from O, S and Si.

In difunctional dialkenyl ether monomers of Formula (13) and dialkenyl monomers of Formula (14), each of the one or more heteroatoms can independently be selected from O and S.

A difunctional thiol-reactive monomer of Formula (7a) can comprise a dialkenyl monomer of Formula (15):

$$CH_2=CH-R^8-CH=CH_2 \quad (15)$$

wherein $R^8$ is selected from $C_{1-10}$ alkanediyl, $C_{1-10}$ heteroalkanediyl, substituted $C_{1-10}$ alkanediyl, and substituted $C_{1-10}$ heteroalkanediyl.

In dialkenyl ether monomers of Formula (15), $R^8$ can be selected from $C_{1-10}$ heteroalkanediyl, $C_{1-8}$ heteroalkanediyl, $C_{1-6}$ heteroalkanediyl, and $C_{1-4}$ heteroalkanediyl.

In difunctional dialkenyl ether monomers of Formula (15), each of the one or more heteroatoms can be independently selected from O and S.

A thiol-reactive monomer of Formula (7a) can be selected from, for example, $CH_2=CH-O-(CH_2)_2-O-(CH_2)_2O-CH=CH_2$, $CH_2=CH-CH_2-O-CH_2$-epoxy, $CH_2=CH-(-CH_2-O-(CH_2)_2-O-)_2-CH_2-CH=CH_2$, and a combination of any of the foregoing; and a moiety of Formula (7) can have the structure of $-(CH_2)_2-O-(CH_2)_2-O-(CH_2)_2-O-(CH_2)_2-$, $-(CH_2)_2-CH_2-O-CH_2-CH(-OH)-CH_2-$, or $-(CH_2)_2-(-CH_2-O-(CH_2)_2-O-)_2-CH_2-(CH_2)_2-$.

A thiol-reactive monomer of Formula (7a) can have an alkenyl group and an epoxy group. Suitable allyl glycidyl ethers can have the structure of Formula (16):

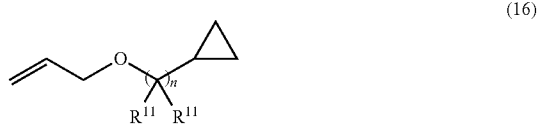

(16)

where n is an integer from 1 to 10 and each $R^{11}$ is independently selected from hydrogen and $C_{1-6}$ alkyl.

For example, a thiol-reactive monomer of Formula (7a) can comprise allyl diglycidyl ether.

A thiol-reactive monomer of Formula (7a) can be a $C_{5-16}$ cycloalkadiene having one or more rings structures with two double bonds. Examples include cyclopenta-1,3-diene, cyclohexa-1,3-diene, cyclohexa-1,4-diene, 3a,4,5,7a-tetrahydro-1H-indene, 1,2,4a,5,8,8a-hexahydronaphthalene, and 1,4,4a,5,8,8a-hexahydronaphthalene. A thiol-reactive monomer of Formula (7a) can be a $C_{5-16}$ heterocycloalkadiene in which one or more of the carbon atoms is replaced with a heteroatom such as O or S.

A thiol-reactive monomer of Formula (7a) can be a $C_{5-16}$ alkenecyclolkene in which the ring has one double bond. Examples include 3-vinylcyclopent-1-ene, 4-vinylcyclopent-1-ene, 4-allylcyclopent-1-ene, 4-vinylcyclohex-1-ene, vinyl norbornaene, vinylcyclohexene, and limonene. A thiol-reactive monomer of Formula (7a) can be a $C_{1-16}$ heteroalkenecyclolkene in which one or more of the carbon atoms is replaced with a heteroatom such as O or S.

A thiol-reactive monomer of Formula (7a) can be a dialkenyl formal and can have, for example, the structure of Formula (17):

$$CH_2=CH-CH_2-O-R^{12}-O-CH_2-O-R^{12}-O-CH_2-CH=CH_2 \quad (17)$$

where each $R^{12}$ is selected from $C_{2-10}$ alkanediyl, $C_{2-10}$ heteroalkanediyl, substituted $C_{2-10}$ alkanediyl, and substituted $C_{2-10}$ heteroalkanediyl.

Thiol-reactive monomers of Formula (XX) can be prepared, for example, by reacting an allyloxyethanol with paraformaldehyde.

A moiety of Formula (8) can be derived from a thiol-reactive polyfunctionalizing agent of Formula (8a):

$$B(-R^3-R^4)_z \quad (8a)$$

wherein z, B, and $R^3$ are defined as for Formula (8 and $R^4$ is a thiol reactive group. Examples of thiol-reactive groups include thiol groups, epoxy groups, alkenyl groups, alkynyl groups, Michael acceptor groups, and isocyanate groups.

In moieties of Formula (8) and thiol-reactive polyfunctionalizing agents of Formula (8a), z can be an integer from 3 to 5, an integer from 3 to 4, or can be 3, 4, 5, or 6.

In moieties of Formula (8) and thiol-reactive polyfunctionalizing agents of Formula (8a), $R^3$ can be selected from $C_{1-10}$ alkanediyl, $C_{1-10}$ heteroalkanediyl, substituted $C_{1-10}$ alkanediyl, and substituted $C_{1-10}$ heteroalkanediyl, where each of the one or more heteroatoms is selected from O and S, and each of the one or more substituent groups is selected from $C_{1-6}$ alkyl, $C_{1-6}$ heteroalkyl, substituted $C_{1-6}$alkyl, and substituted $C_{1-6}$ heteroalkyl.

In moieties of Formula (8) and thiol-reactive polyfunctionalizing agents of Formula (8a), each $R^3$ can independently be selected from $C_{1-10}$ alkanediyl, such as $C_{1-8}$ alkanediyl, $C_{2-6}$ alkanediyl, or $C_{2-4}$ alkanediyl.

In moieties of Formula (8) and thiol-reactive polyfunctionalizing agents of Formula (8a), each $R^3$ can independently be selected from $C_{1-10}$ heteroalkanediyl such as $C_{1-8}$ heteroalkanediyl, $C_{2-6}$ heteroalkanediyl, or $C_{2-4}$ heteroalkanediyl, where each of the one or more heteroatoms is independently selected from O and S.

In moieties of Formula (8) and polyalkenyl polyfunctionalizing agents of Formula (8a), B can have the structure:

[triazine structure]

In moieties of Formula (8) and polythiol polyfunctionalizing agents of Formula (8a), z can be 3; each $R^3$ can be selected from $C_{1-4}$ alkyl and $C_{1-4}$ heteroalkyl, such as —O—$(CH_2)_3$—.

In thiol-reactive polyfunctionalizing agents of Formula (8a), each $R^4$ can independently be selected from an alkenyl group, an alkynyl group, an epoxy group, an isocyanate group, or a Michael acceptor group.

In thiol-reactive polyfunctionalizing agents of Formula (8a), each $R^4$ can be the same or different.

In moieties of Formula (8), each $R^{4a}$ can be derived from the reaction of an alkenyl group, an alkynyl group, an epoxy group, an isocyanate group, or a Michael acceptor group; with a thiol group.

In moieties of Formula (8), each $R^{4a}$ can independently be selected from —$CH_2$—$CH_2$—, —CH=CH—, —C(=O)—NH—, and —$CH_2$—CH(—OH)—.

In moieties of Formula (8) each $R^{4a}$ can be the same or different.

In thiol-reactive polyfunctionalizing agents of Formula (8a), each $R^4$ can be alkenyl —CH=$CH_2$, and in moieties of Formula (8) each $R^{4a}$ can be —$CH_2$—$CH_2$—.

Examples of suitable thiol-reactive polyfunctionalizing agents include polyalkenyls such as triallyl cyanurate (TAC), triallyl isocyanurate (TAIC), trivinylcyclohexane, trimethylolpropane trivinyl ether, glycerol trivinylether, trimethylolpropane triallyl ether, and glycerol triallyl ether; polyalkynyls such as tris-(4-ethynyl-phenyl)-amine, 1,3,5-tricyano-2,4,6-tris(ethynyl)benzene, tripropargyl cyanurate, tripropargyl isocyanurate, trimethylolpropane tripropargyl ether, glycerol tripropargyl ether, trimethylolpropane tripropargyl ether, glycerol tripropargyl ether; and polyepoxides such as 1,3,5-triglycidyl isocyanurate and phloroglucinol triglycidyl ether, or combinations of any of the foregoing.

A moiety of Formula (9) can be derived from a difunctional thiol-reactive adduct of Formula (9a):

$$R^4—R^2—[—R^{4a}—S—R^1—S—R^{4a}—R^2-]_c—R^4 \quad (9a)$$

where c, $R^1$, $R^2$, and $R^{4a}$ are defined as for Formula (9) and $R^4$ is a thiol-reactive group. Examples of thiol-reactive groups include epoxy groups, alkenyl groups, alkynyl groups, Michael acceptor groups, and isocyanate groups.

For example, a moiety of Formula (9) can result from the reaction of a difunctional thiol-reactive adduct of Formula (9a) with a compound having thiol groups.

In moieties of Formula (9) and difunctional thiol-reactive adducts of Formula (9a), c can be 1, 2, 3, or 4.

In moieties of Formula (9) and difunctional thiol-reactive adducts of Formula (9a), each $R^1$ can be defined as in a moiety of Formula (4) or as in a dithiol monomer of Formula (4a). $R^1$ in moieties of Formula (9) and difunctional thiol-reactive adducts of Formula (9a) can be different than in moieties of Formula (4) and dithiol monomers of Formula (4a).

In moieties of Formula (9) and difunctional thiol-reactive adducts of Formula (9a), each $R^2$ can be defined as in a moiety of Formula (6) or as in a dithiol monomer of Formula (6a). $R^2$ in moieties of Formula (9) and difunctional thiol-reactive adducts of Formula (9a) can be different than in moieties of Formula (6) and dithiol monomers of Formula (6a).

In moieties of Formula (9) and difunctional thiol-reactive adducts of Formula (9a), each $R^{4a}$ can be the same and can be —$CH_2$—$CH_2$—.

In thiol-reactive adducts of Formula (9a), each $R^{4a}$ can be the same and can be alkenyl, —CH=$CH_2$.

A thiol-reactive adduct of Formula (9a) can comprise the reaction product of reactants comprising:

(a) a dithiol monomer of Formula (4a):

$$HS—R^1—SH \quad (4a); \text{ and}$$

(b) a difunctional thiol-reactive monomer of Formula (7a):

$$R^4—R^2R^4 \quad (7a)$$

wherein $R^1$ is defined as for Formula (4), $R^2$ is defined as for Formula (7) and $R^4$ is a thiol-reactive group.

The ratio of the difunctional thiol-reactive monomer (7b) to the dithiol monomer (4a) in the reactants can be, for example, from 2 to 1.1, from 1.8 to 1.3, from 1.7 to 1.4, or from 1.6 to 1.4, such as 1.5

A thiol-reactive adduct of Formula (9a) can be a 2:1 adduct of a compound of Formula (4a) to Formula (7a); a 3:2 adduct, or a 4:3 adduct.

Polythioether prepolymers provided by the present disclosure can have segments comprising pendent groups, segments having different numbers of carbon atoms between heteroatoms, or a combination thereof.

For example, in polythioether prepolymers of Formula (3a) and moieties of Formula (3):

(i) at least one of $R^1$ and $R^2$ is selected from substituted $C_{2-10}$ alkanediyl, substituted $C_{2-10}$ heteroalkanediyl, and —$[(CR_2)_p—X—]_q—(CR_2)_r—$, wherein, p is an integer from 1 to 6;
q is an integer from 1 to 5;
r is an integer from 2 to 10;
each X is independently selected from O and S; and
at least one R is selected from $C_{1-16}$ alkyl, $C_{1-16}$ heteroalkyl, substituted $C_{1-16}$ alkyl, and substituted $C_{1-16}$ heteroalkyl;

(ii) the polythioether prepolymer comprises two or more moieties having the structure of Formula (10):

$$—X—(CH_2)_a—X—\qquad(10)$$

wherein, a is an integer from 1 to 6;

each X is independently selected from O and S; and the value of a in a first moiety of Formula (10) is different than the value of a in a second moiety of Formula (10); or (iii) a combination thereof.

Polythioether prepolymers provided by the present disclosure can comprise pendent groups.

Pendent groups do not include terminal reactive functional groups that chemically react to form covalent bonds. For example, the polythioethers provided by the present disclosure can be used with curing agents to provide a cured polymer such as a cured sealant. For use with thiol-terminated polythioether prepolymers a curing agent can comprise thiol-reactive groups capable of reacting with the thiol-terminated prepolymer to form the cured polymer. For use with terminal-modified polythioether prepolymers such as Michael acceptor-terminated polythioether prepolymers, the curing agent can comprise groups reactive with Michael acceptors such as thiol groups.

Pendent groups can be reactive functional groups, but do not necessarily participate in the curing reaction. For example, a pendent group can be a hydroxyl group and the curing the curing chemistry can be, for example, a thiol/ene chemistry, a thiol/epoxy or a thiol/Michael acceptor chemistry such that the hydroxyl group does not participate in the curing reaction.

Pendent groups are bonded to the backbone of the prepolymer such as to a repeating segment of the prepolymer backbone.

The pendent groups can be derived, for example, from substituted dithiol monomers, substituted dithiol adducts, substituted difunctional thiol-reactive monomers, substituted difunctional thiol-reactive adducts, and combinations of any of the foregoing. The pendent groups can be derived from substituted dithiol monomers of Formula (4a), substituted dithiol adducts of Formula (6a), substituted difunctional thiol-reactive monomers of Formula (7a), substituted difunctional thiol-reactive adducts of Formula (9a), or combinations of any of the foregoing. The segments comprising substituent groups can be incorporated into the polythioether prepolymer backbone. The covalently-bonded substituted segments can be randomly dispersed throughout the polythioether prepolymer backbone or can be disposed at regular intervals along the polythioether prepolymer backbone.

Prepolymer segments having pendent groups can be derived from monomers and adducts having substituent groups. For example, a polythioether prepolymer comprising a moiety derived from a substituted dithiol monomer, such as a dithiol monomer of Formula (4a) where $R^1$ is a substituted $C_{1-10}$ heteroalkanediyl, comprises at least one pendent group.

Examples of dithiol monomers having pendent groups are methyl-substituted dimercaptodiethylsulfide (M-DMDS) as provided in Example 3, divinyltetramethyldisiloxane (DVTMDS) as disclosed in Examples 6 and 7 includes pendent methyl group; 2,2-bis(allyloxy)methyl)butan-1-ol (TMP-DAE) has pendent ethyl and hydroxymethyl groups; and the TMP-TVE/NFHT divinyl ether disclosed in Example 15 includes a large fluorine-containing pendent group.

The thiol-reactive monomer, allyl glycidyl ether (AGE) as disclosed in Examples 1 and 2 generates a hydroxyl pendent group upon reaction with a thiol group.

Polythioether prepolymers provided by the present disclosure can comprise the following components or can comprise the reaction product of the following components: (a) a polyfunctionalizing agent such as a polythiol and/or a polyalkenyl polyfunctionalizing agent; (b) a dithiol without pendent groups; (c) a dialkenyl compound without pendent groups; and (d) a dithiol comprising one or more pendent groups, dialkenyl compound comprising one or more pendent groups, and/or a compound having terminal groups capable of generating pendent groups. A dithiol or dialkenyl having pendent groups can comprise a dithiol adduct or a dialkenyl adduct having pendent groups.

In polythioether prepolymers, for example, from 1 mol % to 60 mol % of the moieties can have one or more pendent groups (i.e. moieties (d)), such as, from 1 mol % to 50 mol %, from 2 mol % to 40 mol %, from 5 mol % to 35 mol %, from 10 mol % to 30 mol %, or from 15 mol % to 25 mol % can have one or more pendent groups, where mol % is based on the total number of components (a)-(d) in the polythioether prepolymer. For example, less than 60 mol % of the moieties can have one or more pendent groups, such as less than 50 mol %, less than 40 mol %, less than 35 mol %, less than 30 mol %, less than 25 mol %, less than 20 mol %, less than 15 mol %, less than 10 mol %, or less than 5 mol % can have one or more pendent groups, where mol % is based on the total number of the moieties of components (a)-(d) in the polythioether prepolymer.

Polythioether prepolymers provided by the present disclosure can have segments having different numbers of carbon atoms between heteroatoms, or a combination thereof.

For example, a polythioether prepolymer provided by the present disclosure can comprise two or more moieties having the structure of Formula (10):

$$—X—(CH_2)_a—X—\qquad(10)$$

where n is an integer from 1 to 6; each X is independently selected from a heteroatom; and at least one of the moieties of Formula (10) is different than at least one of the other moieties of Formula (10).

For example, in a polythioether prepolymer $R^1$ can comprise at least one moiety having the structure of Formula (10a) and at least one moiety having the structure of Formula (10b):

$$—X—(CH_2)_{a1}—X—\qquad(10a)$$

$$—X—(CH_2)_{a2}—X—\qquad(10b)$$

where each of a1 and a2 is independently an integer from 1 to 6; and a1 is not the same as a2.

In moieties of Formula (10a) and Formula (10b), n can be 1, 2, 3, 4, 5, or 6.

In moieties of Formula (10a) and Formula (10b), each X can be independently selected from O and S.

For example, some of the segments of a polythioether prepolymer can comprise a moiety of Formula (10a) in which a1 is 2, and other segments can comprise a moiety of Formula (10b) in which a2 is 1 or in which a2 is 3.

Example 18 shows the adduct bis([2-allyloxy)ethyl]formal (BAEF) which is the reaction product of paraformaldehyde and 1-allyloxyethanol. The adduct is linear and without pendent groups but when reacted, for example, with a thiol provides a segment having one, two, and three carbons between heteroatoms. Often, other moieties forming a polythioether prepolymer will be derived from dithiols such as DMDO and DMDS, and dialkenyls such as DEG-DVE having two carbon atoms between heteroatoms. Thus, when a compound such as BAEF is used the symmetry of two carbons between each heteroatom is interrupted by segments having one or three carbons between nearest heteroatoms.

In polythioether prepolymers, for example, from 1 mol % to 25 mol % of the components can have a different number of carbon atoms between heteroatoms than the other moieties, such as, from 5 mol % to 20 mol %, or from 10 mol % to 20 mol %, where mol % is based on the total number of components making up the polythioether prepolymer. For example, less than 30 mol % of the components can have a different number of carbon atoms between heteroatoms than the other components, such as less than 25 mol %, less than 20 mol %, less than 15 mol %, or less than 10 mol %, where mol % is based on the total number of the components in the polythioether prepolymer.

Components that make up a polythioether prepolymer provided by the present disclosure can include both pendent groups and groups having a different number of carbon atoms between nearest heteroatoms in the prepolymer backbone. For example, referring to the Examples, segments derived from a 3:2 adduct of DMDO/TMP-DAE having pendent ethyl and formyl pendent groups and either two or three carbon atoms separating nearest heteroatoms. Segments derived from NFHT such as in Example 15 have a large fluoro-containing pendent group and 2 or 3 carbon atoms separating nearest heteroatoms.

Polythioether prepolymers provided by the present disclosure such as prepolymers having a polythioether moiety of Formula (3) can be thiol-terminated.

A polythioether prepolymer provided by the present disclosure can be a thiol-terminated polythioether prepolymer of Formula (3a):

$$H\text{—}[\text{-}A\text{-}D\text{-}]_n A\text{-}H \tag{3a}$$

where n, A, and D are defined as for Formula (3), H is hydrogen, and each —$R^3$—$R^{4a}$— moiety is terminated in a -A-[-D-A-]$_{n1}$-H moiety, where n1 is an integer from 0 to 10.

Thiol-terminated polythioether prepolymers of Formula (3a) can be prepared, for example, by reacting a thiol-reactive monomer and/or adduct or combination of thiol-reactive monomers and/or adduct, such as the thiol-reactive monomers of Formula (7a)-(9a), with a equivalents excess of a polythiol monomer and/or adducts or combination of polythiol monomers and/or adducts, such as the polythiol monomers of Formula (4a)-(6a). The reaction can take place in the presence of a suitable catalyst as appropriate for the reaction chemistry. For example, an amine catalyst can be used for thiol/ene reactions.

Thiol-terminated polythioether prepolymers of Formula (3a) can be prepared by reacting a thiol-reactive monomer or combination of thiol-reactive monomers, such as the thiol-reactive monomers of Formula (7a)-(9a), with an equivalents excess of a polythiol monomer or combination of polythiol monomers, such as the polythiol monomers of Formula (4a)-(6a).

Polythioether prepolymers provided by the present disclosure can comprise the reaction product of reactants comprising:

(a) a dithiol monomer of Formula (4a), a thiol-terminated polyfunctionalizing agent of Formula (5a), a dithiol adduct of Formula (6a), or a combination of any of the foregoing; and (b) a difunctional thiol-reactive monomer of Formula (7a), a thiol-reactive polyfunctionalizing agent of Formula (8a), a difunctional thiol-reactive adduct of Formula (9a), or a combination of any of the foregoing.

wherein at least some of the reactants have pendent groups and/or groups having a different number of carbon atoms between nearest heteroatoms.

A polythioether prepolymer can be prepared by reacting the thiol component with the thiol-reactive component at a suitable temperature in the presence of an amine catalyst for a suitable time to provide a thiol-terminated polythioether prepolymer provided by the present disclosure.

Polythioether prepolymers provided by the present disclosure such as prepolymers having a polythioether moiety of Formula (3) can be terminated in a thiol-reactive group.

For example, polythioether prepolymers provided by the present disclosure can comprise a thiol-reactive terminated polythioether prepolymer of Formula (3b):

$$D^1\text{-}[\text{-}A\text{-}D\text{-}]_n\text{-}A\text{-}D^1 \tag{3b}$$

wherein, n, A and D are defined as for Formula (3);

each $D^1$ is independently selected from a moiety of Formula (7b), a moiety of Formula (8b), and a moiety of Formula (9b):

$$R^4\text{—}R^1\text{—}R^{4a}\text{—} \tag{7b}$$

$$B(\text{—}R^3\text{—}R^{4a}\text{—})(\text{—}R^3\text{—}R^4)_{z\text{-}1} \tag{8b}$$

$$R^4\text{—}[\text{—}R^2\text{—}R^{4a}\text{—}S\text{—}R^1\text{—}S\text{—}R^{4a}\text{—}]_c\text{—}R^2\text{—}R^{4a}\text{—} \tag{9b}$$

wherein, z, R, $R^2$, $R^3$, and $R^{4a}$ are defined as in Formula (3); and each $R^4$ is independently a thiol-reactive group; and each branch of the thiol-reactive polythioether prepolymer is terminated in a moiety -[-D-A-]$_{n1}$-$D^1$.

Thiol-reactive terminated polythioether prepolymers of Formula (3b) can be prepared by reacting a polythiol monomer or combination of polythiol monomer, such as the polythiol monomers of Formula (4a)-(6a), with a molar excess of a thiol-reactive monomer or combination of a thiol-reactive monomer, such as the thiol-reactive monomers of Formula (7a)-(9a).

Thiol-reactive terminated polythioether prepolymers of Formula (3b) can be prepared by reacting a polythiol monomer or combination of polythiol monomer, such as the polythiol monomers of Formula (4a)-(6a), with an equivalents excess of a thiol-reactive monomer or combination of a thiol-reactive monomer, such as the thiol-reactive monomers of Formula (7a)-(9a).

A thiol-reactive terminated polythioether prepolymer of Formula (3b) can be terminated, for example, in alkenyl groups, alkyne groups, epoxy groups, Michael acceptor groups, or isocyanate groups.

Polythioether prepolymers provided by the present disclosure can comprise the reaction product of reactants comprising:

(a) a dithiol monomer of Formula (4a), a thiol-terminated polyfunctionalizing agent of Formula (5a), a dithiol adduct of Formula (6a), or a combination of any of the foregoing; and (b) a difunctional thiol-reactive monomer of Formula (7a), a thiol-reactive polyfunctionalizing agent of Formula (8a), a difunctional thiol-reactive adduct of Formula (9a), or a combination of any of the foregoing, wherein there is an equivalent excess of thiol-reactive groups, such as an equivalents excess of alkenyl groups.

A polythioether prepolymer can be prepared by reacting the thiol component with the thiol-reactive component at a suitable temperature in the presence of an amine catalyst for a suitable time to provide a thiol-reactive terminated polythioether prepolymer provided by the present disclosure.

A polythioether prepolymer provided by the present disclosure can be terminated in a functional group other than a thiol group and can have the structure of Formula (3c):

$$R^{10}-R^{9}-R^{4a}-[\text{-A-D-}]_n\text{A-}R^{4a}-R^{9}-R^{10} \quad (3c)$$

where n, A and D are defined as for Formula (3), and the moiety of $-R^{4a}-R^{9}-R^{10}$ can be derived from the reaction of a compound having functional group and a group reactive with thiol group having the structure of Formula (16):

$$R^{4}-R^{9}-R^{30} \quad (16)$$

where, $R^4$ can be a group reactive with a thiol group;

$R^9$ can be selected from $C_{1-10}$ alkanediyl, $C_{5-12}$ cycloalkanediyl, $C_{6-12}$ arenediyl, $C_{6-22}$ alkanecycloalkanediyl, $C_{7-22}$ alkanearenediyl, $C_{1-10}$ heteroalkanediyl, $C_{5-12}$ heterocycloalkanediyl, $C_{6-12}$ heteroarenediyl, $C_{6-22}$ heteroalkanecycloalkanediyl, $C_{7-22}$ heteroalkanearenediyl, substituted $C_{1-10}$ alkanediyl, substituted $C_{5-12}$ cycloalkanediyl, substituted $C_{6-12}$ arenediyl, substituted $C_{6-22}$ alkanecycloalkanediyl, substituted $C_{7-22}$ alkanearenediyl, substituted $C_{1-10}$ heteroalkanediyl, substituted $C_{5-12}$ heterocycloalkanediyl, substituted $C_{6-12}$ heteroarenediyl, substituted $C_{6-22}$ heteroalkanecycloalkanediyl, and substituted $C_{7-22}$ heteroalkanearenediyl; and $R^{10}$ is a functional group.

In polythioether prepolymers of Formula (3c), $R^{4a}$ can be derived from the reaction of a thiol group with an alkenyl group, an alkynyl group, an epoxy group, an isocyanate group, or a Michael acceptor group.

In polythioether prepolymers of Formula (3c), $R^{4a}$ can be $-(CH_2)_2-$, $-CH_2-CH(-OH)-$, $-C(=O)-NH-$, $-(CH_2)_2$-EW- (where EW refers to an electron-withdrawing group), or $-CH=CH-$.

In compounds of Formula (16), $R^4$ can be an alkenyl group, an alkynyl group, an epoxy group, an isocyanate group, or a Michael acceptor group.

In polythioether prepolymers of Formula (3c) and compounds of Formula (16), $R^{30}$ can be selected from an alkenyl group, an alkynyl group, an epoxy group, an isocyanate group, or a Michael acceptor group; and $R^9$ can be selected from $C_{1-10}$ alkanediyl, $C_{5-12}$ cycloalkanediyl, $C_{6-12}$ arenediyl, $C_{6-22}$ alkanecycloalkanediyl, $C_{7-22}$ alkanearenediyl, $C_{1-10}$ heteroalkanediyl, $C_{5-12}$ heterocycloalkanediyl, $C_{6-12}$ heteroarenediyl, $C_{6-22}$ heteroalkanecycloalkanediyl, and $C_{7-22}$ heteroalkanearenediyl.

Polythioether prepolymers of Formula (3a) and Formula (3b) can be used with thiol-curing chemistries, such as in thiol polymerization reactions with alkenyls, alkynyls, epoxides, isocyanates, and Michael acceptors.

Polythioether prepolymers of Formula (3b) can be used as appropriate in other curing chemistries such as Michael addition, polyurethane, and polyurea curing chemistries.

Polythioether prepolymers of Formula (3a) and Formula (3b) can also be adapted for other curing chemistries by modifying the terminal group to include, for example, hydroxyl groups, amine groups, epoxy groups, isocyanate groups, or Michael acceptor groups.

Terminal-modified polythioether prepolymers provided by the present disclosure can have the structure of Formula (3d) or Formula (3e):

$$R^{11}-[\text{-A-D-}]_n\text{A-}R^{11} \quad (3d)$$

$$R^{12}\text{-D-}[\text{-A-D-}]_n\text{A-D-}R^{12} \quad (3e)$$

wherein, n, A, and D are defined as in Formula (3);

each $R^{11}$ can independently be derived from a compound comprising a terminal functional group and a group reactive with a thiol group; and each $R^{12}$ can independently be derived from a compound comprising a terminal functional group and a group reactive with a thiol-reactive group.

A compound comprising a terminal functional group and a group reactive with a thiol group can have the structure of Formula (17):

$$(R^{13}\text{-})_v\text{E-}R^4 \quad (17)$$

wherein, v is an integer from 1 to 6;

$R^4$ is a thiol-reactive group each $R^{13}$ is a functional group; and

E is a core of the compound.

A compound comprising a terminal functional group and a group reactive with a thiol-reactive group can have the structure of Formula (18):

$$(R^{13}\text{-})_v\text{E-}R^{14} \quad (18)$$

wherein, v is an integer from 1 to 6;

each $R^{13}$ is a functional group;

$R^4$ is a group reactive with a thiol-reactive group; and

E is a core of the compound.

In compounds of Formula (17) and Formula (18), v can be an integer from 1 to 4, from 1 to 3, from 1 to 2, or can be 1, 2, 3, 4, 5, or 6.

In compounds of Formula (17), $R^4$ can be, for example, an alkenyl group, an alkyne group, an epoxy group, a Michael acceptor group, or an isocyanate group.

In compounds of Formula (18), $R^{14}$ can be, for example, a thiol group, an alkenyl group, a Michael donor group, or a hydroxyl group.

In compounds of Formula (17) and Formula (18,) each $R^{13}$ can independently be selected from, for example, an alkenyl group, an alkyne group, an epoxy group, a Michael acceptor group, an isocyanate group, a hydroxyl group, an amine group, a Michael donor group, and an alkoxysilyl group.

E can be difunctional and v can be 1.

E can be selected from, for example, $C_{1-10}$ alkanediyl, $C_{5-12}$ cycloalkanediyl, $C_{6-12}$ arenediyl, $C_{6-22}$ alkanecycloalkanediyl, $C_{7-22}$ alkanearenediyl, $C_{1-10}$ heteroalkanediyl, $C_{5-12}$ heterocycloalkanediyl, $C_{6-12}$ heteroarenediyl, $C_{6-22}$ heteroalkanecycloalkanediyl, $C_{7-22}$ heteroalkanearenediyl, substituted $C_{1-10}$ alkanediyl, substituted $C_{5-12}$ cycloalkanediyl, substituted $C_{6-12}$ arenediyl, substituted $C_{6-22}$ alkanecycloalkanediyl, substituted $C_{7-22}$ alkanearenediyl, substituted $C_{1-10}$ heteroalkanediyl, substituted $C_{5-12}$ heterocycloalkanediyl, substituted $C_{6-12}$ heteroarenediyl, substituted $C_{6-22}$ heteroalkanecycloalkanediyl, and substituted $C_{7-22}$ heteroalkanearenediyl.

Terminal-modified polythioethers of Formula (3c) can be derived from a thiol-terminated polythioether prepolymer of Formula (3b).

A terminal-modified polythioether prepolymer can comprise the reaction product of reactants comprising:

(a) a thiol-terminated polythioether prepolymer of Formula (3b); and (b) a compound comprising a terminal functional group and a terminal group reactive with a thiol group.

A terminal-modified polythioether prepolymer can comprise the reaction product of reactants comprising:

(a) a thiol-reactive-terminated polythioether prepolymer of Formula (3c); and (b) a compound comprising a terminal functional group and a terminal group reactive with the terminal thiol-reactive group.

A terminal-modified polythioether prepolymer can comprise the reaction product of reactants comprising:

(a) a polythioether prepolymer comprising a moiety of Formula (3); and (b) a compound comprising a terminal functional group and a terminal group reactive with a terminal group of the polythioether prepolymer.

Polythioether prepolymers provided by the present disclosure including polythioether prepolymers comprising a moiety of Formula (3), thiol-terminated polythioether prepolymers of Formula (3b), thiol-reactive-terminated polythioether prepolymers of Formula (3c), and terminal-modified polythioether prepolymers of Formula (3d) and Formula (3e) can be characterized by certain properties.

For example, polythioether prepolymers may or may not have pendent hydroxyl groups.

Polythioether prepolymers can have a number average molecular weight, for example, from 1,000 Da to 20,000 Da, from 1,000 Da to 15,000 Da, from 1,000 Da to 10,000 Da, from 1,000 Da to 8,000 Da, from 1,000 Da to 6,000 Da, or from 2,000 Da to 5,000 Da.

Polythioether prepolymers can have a number average mercaptan equivalent weight, for example, from 1,000 to 8,000, from 2,000 to 7,500, from 2,500 to 7,000, from 3,000 to 6,500, or from 3,500 to 6,000.

Polythioether prepolymers can have a terminal functionality, for example, from 2 to 20, from 2 to 15, from 2 to 10, from 2 to 8, from 2 to 6, from 2 to 4, from 2 to 3, from 2.05 to 2.9, from 2.1 to 2.8, or from 2.2 to 2.8.

Polythioether prepolymers can have a viscosity, for example, from 20 poise to 500 poise, from 25 poise to 400 poise, from 30 poise to 400 poise, or from 35 poise to 350 poise, at 25° C. as determined using CAP 2000 viscometer, with a No. 6 spindle, at speed of 50-300 rpm.

Polythioether prepolymers provided by the present disclosure can have a sulfur content, for example, greater than 10 wt %, greater than 15 wt %, greater than 17.5 wt %, greater than 20 wt %, greater than 25 wt %, or greater than 30 wt %, where wt % is based on the total weight of the polythioether prepolymer.

Polythioether prepolymers provided by the present disclosure can have a sulfur content, for example, from 10 wt % to 35 wt %, from 10 wt % to 30 wt %, from 10 wt % to 25 wt %, from 10 wt % to 20 wt %, from 12 wt % to 20 wt %, or from 14 wt % to 20 wt %, where wt % is based on the total weight of the polythioether prepolymer.

Polythioether prepolymers provided by the present disclosure can have an oxygen content, for example, greater than 10 wt %, greater than 15 wt %, greater than 20 wt %, greater than 25 wt %, or greater than 30 wt %, where wt % is based on the total weight of oxygen in the polythioether prepolymer.

Polythioether prepolymers provided by the present disclosure can comprise the reaction product of a polyfunctionalizing agent such a triallyl cyanurate, a linear dithiol such as DMDO, a linear dialkenyl compound such as diethylene glycol divinyl ether, and a non-linear or symmetry-breaking monomer or adduct. The non-linear and/or symmetry-breaking monomer and/or adduct can have pendent groups, can comprise pendent groups or can produce pendent groups when reacted with the other monomers such as allyl glycidyl ether.

A linear dithiol can comprise a linear dithiol monomer and/or a linear dithiol adduct.

A linear dialkenyl can comprise a linear dialkenyl monomer and/or a linear dialkenyl adduct.

A non-linear and/or symmetry-breaking compound can comprise a monomer and/or an adduct.

The reactants can comprise, for example, from 0.1 mol % to 12 mol %, from 0.5 mol % to 10 mol %, from 1 mol % to 5 mol % of a polyfunctionalizing agent, where mol % is based on the total moles of the monomers and adducts used to form the polythioether prepolymer.

The reactants can comprise, for example, less than 15 mol %, less than 12 mol %, less than 10 mol %, less than 8 mol %, less than 6 mol %, less than 4 mol %, or less than 2 mol % of a polyfunctionalizing agent, where mol % is based on the total moles of the monomers and adducts used to form the polythioether prepolymer.

The reactants can comprise, for example, from 15 mol % to 55 mol %, from 20 mol %, to 50 mol %, from 25 mol % to 45 mol %, or from 30 mol % to 40 mol % of a linear dialkenyl, where mol % is based on the total moles of the monomers and adducts used to form the polythioether prepolymer.

The reactants can comprise, for example, less than 55 mol %, less than 50 mol %, less than 45 mol %, less than 40 mol %, less than 35 mol %, less than 30 mol %, less than 25 mol %, or less than 20 mol % of a linear dialkenyl, where mol % is based on the total moles of the monomers and adducts used to form the polythioether prepolymer.

The reactants can comprise, for example, from 15 mol % to 65 mol %, from 20 mol % to 60 mol %, from 25 mol % to 55 mol %, from 30 mol % to 50 mol %, or from 35 mol % to 45 mol %, of a linear dithiol where mol % is based on the total moles of the monomers and adducts used to form the polythioether prepolymer.

The reactants can comprise, for example, less than 65 mol %, less than 60 mol %, less than 55 mol %, less than 50 mol %, less than 45 mol %, less than 40 mol %, less than 35 mol %, or less than 30 mol % of a linear dithiol, where mol % is based on the total moles of the monomers and adducts used to form the polythioether prepolymer.

The reactants can comprise, for example, from 1 mol % to 60 mol %, from 5 mol % to 50 mol %, from 10 mol % to 45 mol %, or from 12 mol % to 40 mol % of non-linear and/or symmetry-breaking monomers and/or adducts, where mol % is based on the total moles of the monomers and adducts used to form the polythioether prepolymer.

The reactants can comprise, for example, less than 60 mol %, less than 50 mol %, less than 40 mol %, less than 30 mol %, less than 20 mol %, or less than 10 mol % of non-linear and/or symmetry-breaking monomers and/or adducts, where mol % is based on the total moles of the monomers and adducts used to form the polythioether prepolymer.

The reactants can comprise, for example, from 40 mol % to 95 mol %, from 45 mol % to 90 mol %, from 50 mol % to 85 mol %, or from 60 mol % to 80 mol %, of linear dithiol and linear dialkenyl monomers and/or adducts, where mol % is based on the total moles of the monomers and adducts used to form the polythioether prepolymer.

The reactants can comprise, for example, less than 95 mol %, less than 90 mol %, less than 85 mol %, less than 80 mol %, less than 75 mol %, less than 70 mol %, less than 65 mol %, less than 60 mol %, less than 55 mol %, or less than 50 mol %, of linear dithiol and linear dialkenyl monomers and/or adducts, where mol % is based on the total moles of the monomers and adducts used to form the polythioether prepolymer.

The reactants can comprise, for example, from 0.1 mol % to 12 mol % of a polyfunctionalizing agent, from 40 mol % to 95 mol % of linear dithiol and linear dialkenyl monomers, and from 1 mol % to 60 mol % of non-linear and/or symmetry-breaking monomers and/or adducts, where mol % is based on the total moles of the monomers and adducts used to form the polythioether prepolymer.

The reactants can comprise, for example, from 0.5 mol % to 10 mol % of a polyfunctionalizing agent, from 45 mol % to 90 mol % of linear dithiol and linear dialkenyl monomers, and from 5 mol % to 50 mol % of non-linear and/or symmetry-breaking monomers and/or adducts, where mol % is based on the total moles of the monomers and adducts used to form the polythioether prepolymer.

The reactants can comprise, for example, from 1 mol % to 5 mol % of a polyfunctionalizing agent, from 50 mol % to 85 mol % of linear dithiol and linear dialkenyl monomers, and from 10 mol % to 45 mol % of non-linear and/or symmetry-breaking monomers and/or adducts, where mol % is based on the total moles of the monomers and adducts used to form the polythioether prepolymer.

The reactants can comprise, for example, less than 15 mol % of a polyfunctionalizing agent, less than 95 mol % of linear dithiol and linear dialkenyl monomers, and less than 60 mol % of non-linear and/or symmetry-breaking monomers and/or adducts, where mol % is based on the total moles of the monomers and adducts used to form the polythioether prepolymer.

The reactants can comprise, for example, less than 12 mol % of a polyfunctionalizing agent, less than 90 mol % of linear dithiol and linear dialkenyl monomers, and less than 50 mol % of non-linear and/or symmetry-breaking monomers and/or adducts, where mol % is based on the total moles of the monomers and adducts used to form the polythioether prepolymer.

The reactants can comprise, for example, less than 10 mol % of a polyfunctionalizing agent, less than 85 mol % of linear dithiol and linear dialkenyl monomers, and less than 40 mol % of non-linear and/or symmetry-breaking monomers and/or adducts, where mol % is based on the total moles of the monomers and adducts used to form the polythioether prepolymer.

The molar ratio of non-linear and/or symmetry-breaking monomers and/or adducts to linear dithiol and/or dialkenyl monomers and/or adducts in a polythioether prepolymer provided by the present disclosure can be, for example, from 0.05 to 1.2, from 0.1 to 0.8, from 0.15 to 0.6, or from 0.2 to 0.5.

The molar ratio of non-linear and/or symmetry-breaking monomers and/or adducts to linear dithiol and/or dialkenyl monomers and/or adducts in a polythioether prepolymer provided by the present disclosure can be, for example, less than 1.2, less than 1.0, less than 0.8, less than 0.6, less than 0.5, less than 0.4, less than 0.3, or less than 0.2.

The molar ratio of non-linear and/or symmetry-breaking monomers and/or adducts to linear dithiol and/or dialkenyl monomers and/or adducts in a polythioether prepolymer provided by the present disclosure can be, for example, greater than 0.2, greater than 0.3, greater than 0.4, greater than 0.5, greater than 0.6, greater than 0.8, or greater than 1.0.

Polythioether prepolymers provided by the present disclosure can have from 1 mol % to 60 mol % of segments derived from monomers having pendent groups, such as, for example from 1 mol % to 55 mol %, from 2 mol % to 40 mol %, or from 3 mol % to 30 mol %, where mol % is based on the total moles of the segments of the polythioether prepolymer.

Polythioether prepolymers provided by the present disclosure can have, for example, greater than 1 mol % of the segments derived from monomers having pendent groups, greater than 2 mol %, greater than 3 mol % greater than 5 mol %, greater than 10 mol %, greater than 15 mol %, greater than 20 mol %, or greater than 30 mol %, where mol % is based on the total number of segments of the polythioether prepolymer.

Polythioether prepolymers can have from 1 mol % to 60 mol % of segments derived from monomers having a different heteroatom spacing than in other segments, such as, for example from 1 mol % to 55 mol %, from 2 mol % to 40 mol %, or from 3 mol % to 30 mol %, where mol % is based on the total moles of the segments of the polythioether prepolymer.

Polythioether prepolymers provided by the present disclosure can have, for example, greater than 1 mol % of the segments having a different heteroatom spacing than in other segments, greater than 2 mol %, greater than 3 mol % greater than 5 mol %, greater than 10 mol %, greater than 15 mol %, greater than 20 mol %, or greater than 30 mol %, where mol % is based on the total number of segments of the polythioether prepolymer.

Polythioether prepolymers provided by the present disclosure can be liquid at a temperature less than 5° C.

Polythioether prepolymers provided by the present disclosure can have a nucleation temperature less than 5° C., wherein the nucleation temperature is determined by visual observation. A liquid polythioether prepolymer becomes visually cloudy during nucleation. For example, the nucleation temperature can be less than 2.5° C., less than 0° C., less than −2.5° C., or less than −5° C. For example, the nucleation temperature can be from −5° C. to 5° C., from −2.5° C. to 5° C., or from 0° C. to 5° C.

Polythioether prepolymers can have a viscosity less than 200 poise after exposure to a temperature of 5° C. for at least 2 days, wherein viscosity is measured using a Brookfield CAP 2000 viscometer, with a No. 6 spindle, at speed of 300 rpm, and a temperature of 25° C. For example, the viscosity can be less than 200 poise after exposure to a temperature less than 2.5° C., less than 0° C., less than −2.5° C., or less than −5° C., for at least 2 days. For example, the viscosity can be less than 200 poise after exposure to a temperature from −5° C. to 5° C., from −2.5° C. to 5° C., or from 0° C. to 5° C., for at least 2 days.

Polythioether prepolymers provided by the present disclosure can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Polythioether prepolymers provided by the present disclosure can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

The backbone of a polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing), each of which is incorporated by reference in its entirety. Thiol-terminated polythioether prepolymers include prepolymers described in U.S. Application Publication Nos. 2017/0369737 and 2016/0090507.

Compositions provided by the present disclosure can comprise one or more polythioether prepolymers provided by the present disclosure. The one or more polythioether prepolymers can be characterized, for example, by different chemical structures, different molecular weights, different functionalities, or a combination of any of the foregoing. For example, a composition can comprise a combination of polythioether prepolymers having different functionalities. For example, compositions can comprise a polythioether prepolymer having a functionality from 2.1 to 2.5 and a polythioether prepolymer having a functionality from 2.6 to 2.9. The combination of polythioether prepolymers having different functionalities can be combined in a ratio such that the average functionality is, for example, from 2.2 to 2.8.

Compositions provided by the present disclosure can comprise a polythioether prepolymer provided by the present disclosure including polythioether prepolymers comprising a moiety of Formula (3), thiol-terminated polythioether prepolymers of Formula (3b), thiol-reactive-terminated polythioether prepolymers of Formula (3c), terminal-modified polythioether prepolymers of Formula (3d) and Formula (3e), and combinations of any of the foregoing.

A composition can comprise one or more additional components based on factors such as the product requirements, curing chemistry, application method, and storage conditions.

Such additional components can include prepolymers such as prepolymers other than a polythioether prepolymer provided by the present disclosure, cross-linking agents, curing agents, catalysts, fillers, colorants, adhesion promoters, reactive diluents, stabilizers, rheology modifiers, thixotropic agents, solvents, flame retardants, corrosion inhibitors, and combinations of any of the foregoing.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include specific gravity, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in sealants such as vehicle sealants and aerospace sealants and depend at least in part on the desired performance characteristics of the cured sealant under conditions of use.

Compositions provided by the present disclosure can comprise a sulfur-containing prepolymer in addition to a polythioether prepolymer provided by the present disclosure.

An additional sulfur-containing prepolymer can comprise a second polythioether prepolymer, a polysulfide prepolymer, a sulfur-containing polyformal prepolymer, a monosulfide prepolymer, or a combination of any of the foregoing.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3a)-(3e). Thiol-terminated polythioethers include prepolymers described in U.S. Pat. No. 7,390,859 and urethane-containing polythiols described in U.S. Application Publication Nos. 2017/0369757 and 2016/0090507.

A sulfur-containing prepolymer can comprise a polythioether prepolymer having a moiety of Formula (19):

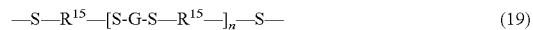

$$—S—R^{15}—[S-G-S—R^{15}—]_n—S—  \qquad (19)$$

where, n is an integer from 1 to 60;

each $R^{15}$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, where, p is an integer from 2 to 6;

q is an integer from 1 to 5;

r is an integer from 2 to 10;

each $R^3$ is independently selected from hydrogen and methyl;

each X is independently selected from O, S, S—S, and NR, wherein R is selected from hydrogen and methyl; and each G is independently a moiety derived from a polyvinyl ether of Formula (20) and a polyalkenyl polyfunctionalizing agent of Formula (21):

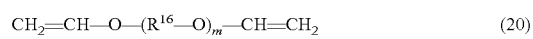

$$CH_2=CH—O—(R^{16}—O)_m—CH=CH_2 \qquad (20)$$

$$B(—R^{17}—CH=CH_2)_z \qquad (21)$$

wherein, m is an integer from 1 to 50;

each $R^{16}$ is independently selected from $C_{1-10}$ alkanediyl, $C_{6-8}$ cycloalkanediyl, $C_{6-14}$ alkanecycloalkanediyl, and $—[(CHR)_p—X—]_q(CHR)_r—$, wherein p, q, r, R, and X are as defined as for $R^{15}$;

B represents a core of a z-valent, polyalkenyl polyfunctionalizing agent $B(—R^{18}—CH=CH_2)_z$ wherein, z is an integer from 3 to 6; and each $R^{18}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (19), each D can independently be selected from a moiety of Formula (20a) and a moiety of Formula (21a):

$$—(CH_2)_2—O—(R^{16}—O)_m—(CH_2)_2— \quad (20a)$$

$$B\{—R^{17}—(CH_2)_2—\}_2\{—R^{17}—(CH_2)_2—S—[—R^{15}—S\text{-}G\text{-}S—R^{15}—SH\}_{z-2} \quad (21a)$$

where m, $R^{15}$, $R^{16}$, $R^{17}$, G, and z are defined as in Formula (20) and Formula (21).

A sulfur-containing prepolymer can comprise a thiol-terminated sulfur-containing prepolymer.

For example, a thiol-terminated sulfur-containing prepolymer can comprise a thiol-terminated polythioether prepolymer of Formula (19a):

$$HS—R^{15}—[S\text{-}G\text{-}S—R^{15}—]_n—SH \quad (19a)$$

where A and $R^1$ are defined as for Formula (19).

A thiol-terminated sulfur-containing prepolymer can comprise a thiol-terminated polysulfide prepolymer or a combination of thiol-terminated polysulfide prepolymers.

A polysulfide prepolymer refers to a prepolymer that contains one or more polysulfide linkages, i.e., —$S_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide prepolymers that are blends of di- and tri-functional molecules where the difunctional polysulfide prepolymers have the structure of Formula (22a) or can comprise a moiety of Formula (22):

$$HS—(—R—S—S—)_n—R—SH \quad (22a)$$

$$—(—R—S—S—)_n—R— \quad (22)$$

and the trifunctional polysulfide polymers can have the structure of Formula (23a) or can comprise a moiety of Formula (23):

$$HS—(—R—S—S—)_a—CH_2—CH\{—CH_2—(—S—S—R—)_b—SH\}\{—(—S—S—R—)_c—SH\} \quad (23a)$$

$$—S—(—R—S—S—)_aCH_2—CH\{—CH_2—(—S—S—R—)_b—S—\}\{—(—S—S—R—)_c—S—\} \quad (23)$$

where each R is —$(CH_2)_2O—CH_2—O—(CH_2)_2$—, and n=a+b+c, where the value for n may be from 7 to 38 depending on the amount of the trifunctional cross-linking agent (1,2,3-trichloropropane; TCP) used during synthesis of the polysulfide prepolymer. Thioplast™ G polysulfides can have a number average molecular weight from less than 1,000 Da to 6,500 Da, an SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, an —SH content from 0.8% to 7.7%, and a cross-linking density from 0% to 2%. Thiokol™ LP polysulfide prepolymers have the general structure of Formula (24a) or can comprise a moiety of Formula (24):

$$HS—[(CH_2)_2O—CH_2—O—(CH_2)_2—S—S—]_n—(CH_2)_2—O—CH_2—O—(CH_2)_2—SH \quad (24a)$$

$$—S—[(CH_2)_2O—CH_2—O—(CH_2)_2—S—S—]_n—(CH_2)_2—O—CH_2—O—(CH_2)_2—S— \quad (24)$$

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (25a) or can comprise a moiety of Formula (25):

$$HS—R—(S_y—R)_t—SH \quad (25a)$$

$$—R—(S_y—R)_t— \quad (25)$$

where, t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure —$(CH_2)_p—O—(CH_2)_q—O—(CH_2)_r$—.

Examples of thiol-terminated polysulfide prepolymers of Formula (25) and (25a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (26a) or can comprise a moiety of Formula (26):

$$HS—(R—O—CH_2—O—R—S_m)_{n-1}—R—CH_2—O—R—SH \quad (26a)$$

$$—(R—O—CH_2—O—R—S_m—)_{n-1}—R—O—CH_2—O—R— \quad (26)$$

where R is $C_{2-4}$ alkanediyl, m is an integer from 1 to 8, and n is an integer from 2 to 370.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (27):

$$—S—R^2—[—S—(R—X)_p—(R^1—X)_qR^2-]_n—S— \quad (27)$$

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;

p can be an integer from 1 to 5;

q can be an integer from 0 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (27a), a thiol-terminated monosulfide prepolymer of Formula (27b), a thiol-terminated monosulfide prepolymer of Formula (27c), or a combination of any of the foregoing:

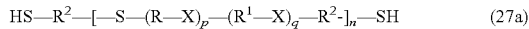

HS—$R^2$—[—S—(R—X)$_p$—($R^1$—X)$_q$—$R^2$—]$_n$—SH    (27a)

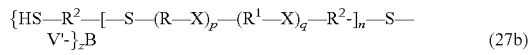

{HS—$R^2$—[—S—(R—X)$_p$—($R^1$—X)$_q$—$R^2$—]$_n$—S—V'—}$_z$B    (27b)

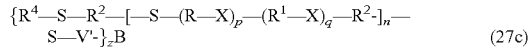

{$R^4$—S—$R^2$—[—S—(R—X)$_p$—($R^1$—X)$_q$—$R^2$—]$_n$—S—V'—}$_z$B    (27c)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35 and B represents a core of a z-valent polyfunctionalizing agent B(—V)$_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent B(—V)$_z$ through a moiety of Formula (27).

A thiol-terminated monosulfide prepolymer can comprise a thiol-terminated monosulfide prepolymer comprising a moiety of Formula (28a) or can comprise a moiety of Formula (28):

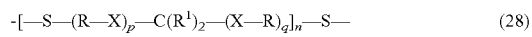

-[—S—(R—X)$_p$—C($R^1$)$_2$—(X—R)$_q$]$_n$—S—    (28)

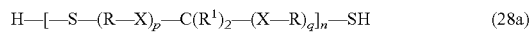

H—[—S—(R—X)$_p$—C($R^1$)$_2$—(X—R)$_q$]$_n$—SH    (28a)

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;

each X can independently be selected from O and S;

p can be an integer from 1 to 5;

q can be an integer from 1 to 5; and n can be an integer from 1 to 60, such as from 2 to 60, from 3 to 60, or from 25 to 35.

Compositions provided by the present disclosure can comprise a filler or combination of fillers. Suitable fillers can comprise, inorganic fillers, organic fillers, low-density fillers, and combinations of any of the foregoing.

Compositions can comprise, for example, from 1 wt % to 70 wt %, from 15 wt % to 35 wt % filler, from 17 wt % to 33 wt %, from 20 wt % to 30 wt % filler, or from 22 wt % to 28 wt %, where wt % is based on the total weight of the composition. Compositions provide by the present disclosure can comprise silica gel/amorphous silica, precipitated silica, fumed silica, precipitated calcium carbonate, calcium carbonate, micronized oxidized polyethylene homopolymer, and low-density microcapsules.

Fillers can be selected to enhance UV transmissibility of the sealant. Generally, silica fillers are more UV transparent than fillers such as calcium carbonate.

A composition can comprise a sufficient amount of an acidic filler such that the pH of the sealant composition is sufficiently acidic as to deblock the organoborane complex. Silica fillers such as fumed silica, silica gel/amorphous silica, precipitated silica can produce an acidic solution with a pH from 4 to 5.

Compositions and sealants provided by the present disclosure can comprise an inorganic filler or combination of inorganic fillers. An inorganic filler can be included to provide mechanical reinforcement and to control the rheological properties of the composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for sealant applications such as aviation and aerospace sealant applications, include carbon black, calcium carbonate, precipitated calcium carbonate, calcium hydroxide, hydrated alumina (aluminum hydroxide), fumed silica, silica, precipitated silica, silica gel, micronized silica and combinations of any of the foregoing. For example, an inorganic filler can include a combination calcium carbonate and fumed silica, and the calcium carbonate and fumed silica can be treated and/or untreated.

An inorganic filler can be coated or uncoated. For example, an inorganic filler can be coated with a hydrophobic coating, such as a coating of polydimethylsiloxane.

Compositions provided by the present disclosure can comprise form 10 wt % to 30 wt %, from 15 wt % to 25 wt %, or from 17 wt % to 23 wt % or a silica filler such as a silica gel, precipitated silica, fumed silica or a combination of any of the foregoing, where wt % is based on the total weight of the composition.

Compositions provided by the present disclosure can comprise silica gel or combination of silica gel. Suitable silica gel includes Gasil® silica gel available from PQ Corporation, and Sylysia®, CariAct® and Sylomask® silica gel available from Fuji Silysia Chemical Ltd. Compositions provided by the present disclosure can comprise, for example, from 5 wt % to 25 wt %, from 10 wt % to 20 wt %, or from 12 wt % to 18, of silica gel, where wt % is based on the total weight of the curable composition.

Compositions and sealants provided by the present disclosure can comprise an organic filler or a combination of organic fillers. Organic fillers can be selected to have a low specific gravity and to be resistant to solvents such as JRF Type I. Suitable organic fillers can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic fillers can have a specific gravity, for example, within a range from 0.85 to 1.15, within a range from 0.9 to 1.1, within a range from 0.9 to 1.05, or from 0.85 to 1.05.

Organic fillers can comprise thermoplastics, thermosets, or a combination thereof. Examples of suitable thermoplastics and thermosets include epoxies, epoxy-amides, ETFE copolymers, nylons, polyethylenes, polypropylenes, polyethylene oxides, polypropylene oxides, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic fillers include polyamides, polyimides, polyethylenes, polyphenylene sulfides, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

Examples of suitable polyimide powders are available from Evonik Industries under the tradename P84@.

An organic filler can include a polyethylene powder, such as an oxidized polyethylene powder. Suitable polyethylene powders are available from Honeywell International, Inc. under the tradename ACumist®, from INEOS under the tradename Eltrex®, and Mitsui Chemicals America, Inc. under the tradename Mipelon™.

The use of organic fillers such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray), Polyphenylene sulfide resins are generally characterized by a specific gravity from about 1.3 to about 1.4.

An organic filler can have any suitable shape. For example, an organic filler can comprise fractions of crushed polymer that has been filtered to select a desired size range. An organic filler can comprise substantially spherical particles. Particles can be solid or can be porous.

An organic filler can have an average particle size, for example, within a range from 1 µm to 100 µm, 2 µm to 40 µm, from 2 µm to 30 µm, from 4 µm to 25 µm, from 4 µm to 20 µm, from 2 µm to 12 µm, or from 5 µm to 15 µm. An organic filler can have an average particle size, for example, less than 100 µm, less than 75 µm, less than 50 µm, less than 40 µm, or less than 20 µm. Particle size distribution can be determined using a Fischer Sub-Sieve Sizer or by optical inspection.

An organic filler can include a low density such as a modified, expanded thermoplastic microcapsules. Suitable modified expanded thermoplastic microcapsules can include an exterior coating of a melamine or urea/formaldehyde resin.

Compositions provided by the present disclosure can comprise low density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules include methyl chloride, methyl bromide, trichloroethane, dichloroethane, n-butane, n-heptane, n-propane, n-hexane, n-pentane, isobutane, isopentane, isooctane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Suitable low-density filler such as low-density microcapsules can have a mean diameter (d0.5), for example, from 1 µm to 100 µm, from 10 µm to 80 µm, or from 10 µm to 50 µm, as determined according to ASTM D1475.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low density filler such as low microcapsules can be characterized by a mean particle diameter from 1 µm to 100 µm and can have a substantially spherical shape. Low density filler such as low-density microcapsules can be characterized, for example, by a mean particle diameter from 10 µm to 100 µm, from 10 µm to 60 µm, from 10 µm to 40 µm, or from 10 µm to 30 m, as determined according to ASTM D1475.

Low density filler can comprise uncoated microcapsules, coated microcapsules, or combinations thereof.

Low density filler such as low-density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 µm, less than 1 µm, or less than 0.5 µm. The melamine coating on the light weight microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 µm, less than 20 µm, less than 15 µm, or less than 5 µm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90.

A suitable aminoplast resin can comprise a urea-formaldehyde resin.

Aminoplast resin-coated particles are distinct from uncoated particles that are merely incorporated into a polymer network, such as is the case when uncoated low-density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low-density particle such as a thermally expanded microcapsule. The coating of an aminoplast resin can form a substantially continuous covering on the exterior surface of a low-density particle.

Low density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added, and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added, and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™ 920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Compositions provided by the present disclose can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

Compositions provided by the present disclosure can comprise micronized oxidized polyethylene homopolymer, fumed silica, silica gel/amorphous silica, light with filler, precipitated calcium carbonate, or a combination of any of the foregoing.

Compositions and sealants provided by the present disclosure can include an adhesion promoter or combination of adhesion promoters.

Compositions provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

The use of aminosilane adhesion promoters can be used to control the acidity of a sealant composition.

Compositions and sealants provided by the present disclosure can comprise a phenolic adhesion promoter, an organosilane, or a combination thereof. A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes.

Phenolic adhesion promoters can comprise the reaction product of a condensation reaction of a phenolic resin with one or more thiol-terminated polysulfides. Phenolic adhesion promoters can be thiol-terminated.

Examples of phenolic resins include 2-(hydroxymethyl)phenol, (4-hydroxy-1,3-phenylene)dimethanol, (2-hydroxy-benzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene) dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Compositions provided by the present disclosure can comprise an organo-functional adhesion promoter such as an organo-functional silane. An organo-functional silane can comprise hydrolysable groups bonded to a silicon atom and at least one organofunctional group. An organo-functional silane can have the structure $R^{12}$—$(CH_2)_n$—$Si(—OR)_{3-n}R_n$, where $R^{13}$ is an organofunctional group, n is 0, 1, or 2, and R is alkyl such as methyl or ethyl. Examples of organofunctional groups include epoxy, amino, methacryloxy, or sulfide groups. An organofunctional silane can be a dipodal silane having two or more silane groups, a functional dipodal silane, a non-functional dipodal silane or a combination of any of the foregoing. An organofunctional silane can be a combination of a monosilane and a dipodal silane. For amino functional silanes, $R^{13}$ can be —$NH_2$.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group. An amine-functional silane can comprise, for example, from 40 wt % to 60 wt % of a primary amine-functional silane; and from 40 wt % to 60 wt % of a secondary amine-functional silane; from 45 wt % to 55 wt % of a primary amine-functional silane and from 45 wt % to 55 wt % of a secondary amine-functional silane; or from 47 wt % to 53 wt % of a primary amine-functional silane and from 47 wt % to 53 wt % of a secondary amine-functional silane; where wt % is based on the total weight of the amine-functional silane in a composition.

A secondary amine-functional silane can be a sterically hindered amine-functional silane. In a sterically hindered amine-functional silane the secondary amine can be adjacent to a large group or moiety that limits or restricts the degrees of freedom of the secondary amine compared to the degrees of freedom for a non-sterically hindered secondary amine. For example, in a sterically hindered secondary amine, the secondary amine can be adjacent to a phenyl group, a cyclohexyl group, or a branched alkyl group.

Amine-functional silanes can be monomeric amine-functional silanes having a molecular weight, for example, from 100 Da to 1000 Da, from 100 Da to 800 Da, from 100 Da to 600 Da, or from 200 Da to 500 Da.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl) pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane N-(2-aminoethyl)-3-aminopropyltrimethoxysilane, and n-(β-aminoethyl) γ-aminopropyltrimethoxy silane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino) isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Examples of suitable amino-functional silanes under the Silquest® tradename include Silquest® A-1100 (γ-aminopropyltriethoxysilane), Silquest® A-1108 (γ-aminopropylsilsesquioxane), Silquest® A-1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy based polyazamide), and Silquest® A-2120 (N-β-(aminoethyl)-γ-aminopropylmethyldimethoxysilane).

Suitable amine-functional silanes are commercially available, for example, from Gelest Inc, from Dow Corning Corporation, and Momentive.

An organo-functional silane can be a mercapto-functional silane including, for example 3-mercaptopropyltriethoxysilane, 3-mercaptopropyltriemthoxysilane, 11-mercaptoundecyltrimethoxysilane, 3-mercaptopropylmethyldimethoxysilane, and combinations of any of the foregoing.

Curable compositions provided by the present disclosure can comprise, for example, less than 1 wt % of an adhesion promoter, less than 2 wt %, less than 3 wt % or less than 4 wt % of an adhesion promoter, where wt % is based on the total weight of the curable composition. A curable composition provided by the present disclosure can comprise, for example from 0.1 wt % to 5 wt %, from 0.5 wt % to 4 wt %, from 1 wt % to 3 wt % of an adhesion promoter, where wt % is based on the total weight of the composition.

Compositions provided by the present disclosure can comprise a photochromic agent sensitive to the degree of cure or the extent of exposure to actinic radiation. A cure indictor can change color upon exposure to actinic radiation, which can be permanent or reversible. A cure indicator can be initially transparent and become colored upon exposure to actinic radiation or can be initially colored and become transparent upon exposure to actinic radiation.

Compositions and sealants provided by the present disclosure can comprise, for example, from 40 wt % to 80 wt %, from 40 wt % to 75 wt %, from 45 wt % to 70 wt %, or from 50 wt % to 70 wt % of a polythioether prepolymer provided by the present disclosure, where wt % is based on the total weight of the composition. Compositions and sealants provided by the present disclosure can comprise, for example, greater than 40 wt %, greater than 50 wt %, greater than 60 wt %, greater than 70 wt %, or greater than 80 wt % of a polythioether prepolymer provided by the present disclosure, where wt % is based on the total weight of the composition.

Compositions provided by the present disclosure can be provided, for example, as one-part or two-part systems.

In a one-part system, each of the components be combined, stored, and applied to a surface. An example of one-part systems are UV-curable systems.

In a two-part system the reactive components can be maintained in separate containers and combined at the time of use. In addition to one of the reactive components, each of the parts can comprise one or more of additives. The composition of each of the parts can be formulated to provide a similar viscosity to facilitate mixing.

Curable compositions provided by the present disclosure can be used as sealants or coatings such as vehicle and aerospace, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process.

Furthermore, methods are provided for sealing an aperture utilizing a composition provided by the present disclosure. These methods comprise, for example, applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Apertures, surfaces, joints, fillets, fay surfaces including apertures, surfaces, fillets, joints, and fay surfaces of vehicles including automotive vehicles, recreation vehicles, freight transport vehicles, and aerospace vehicles, sealed with compositions provided by the present disclosure are also disclosed. The compositions and sealants can also be used to seal fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed up to 7 days following mixing and application of a curable composition to a surface.

A cured composition can have a thickness, for example, from 5 mils to 25 mils (127 μm to 635 μm) such as from 10 mils to 20 mils (254 μm to 508 μm).

The free radical photopolymerization reaction can be initiated by exposing a composition provided by the present disclosure to actinic radiation such as UV radiation, for example, for less than 120 seconds, less than 90 seconds, less than 60 seconds, or less than 30 seconds.

The free radical photopolymerization reaction can be initiated by exposing a composition provided by the present disclosure to actinic radiation such as UV radiation, for example, for from 15 seconds to 120 seconds, from 15 seconds to 90 seconds, for rom 15 seconds to 60 seconds.

The UV radiation can include irradiation at a wavelength at 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

Compositions provided by the present disclosure are curable without exposure to actinic radiation such as UV radiation. Composition can be at least partly curable upon exposure to actinic radiation and such compositions can include a photoionization. The actinic radiation such as UV radiation can be applied to at least a portion of an applied sealant. The sealant can be accessible to the actinic radiation and the portion of sealant exposed to the UV radiation can be cured to a certain depth below the surface. For example, the actinic radiation can be initiated the photopolymerization reaction to a depth, for example, of at least 4 mm, at least 6 mm, at least 8 mm, or at least 10 mm. A portion of the sealant may not be accessible to actinic radiation either because of absorption or scattering of the actinic radiation of the sealant which prevents the actinic radiant from interacting with the full thickness of the sealant. A portion of the sealant may be obscured by the geometry of the part being sealed or may be obscured by an overlying structure.

Cured compositions provided by the present disclosure, such as cured sealants, exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B, which is incorporated by reference in its entirety. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Compositions provide a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure meets or exceeds the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed.

Compositions provided by the present disclosure can be used to seal a part including a surface of a vehicle.

The term "vehicle" is used in its broadest sense and includes all types of aircraft, spacecraft, watercraft, automotive vehicles, freight vehicles, marine vehicles, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

ASPECTS OF THE INVENTION

The invention can be further defined by one or more of the following aspects.

Aspect 1. A polythioether prepolymer comprising a moiety having the structure of Formula (3):

-[-A-D-]$_n$A-       (3)

wherein,
(a) n is an integer from 1 to 60;
(b) each A is independently selected from a moiety of Formula (4), a moiety of Formula (5), and a moiety of Formula (6):

—S—R$^1$—S—       (4)

B(—R$^3$—S—)$_z$       (5)

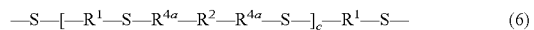
—S—[—R$^1$—S—R$^{4a}$—R$^2$—R$^{4a}$—S—]$_c$—R$^1$—S—       (6)

(c) each D is independently selected from a moiety of Formula (7), a moiety of Formula (8), and a moiety of Formula (9):

—R$^{4a}$—R$^2$—R$^{4a}$—       (7)

B(—R$^3$—R$^{4a}$—)$_z$       (8)

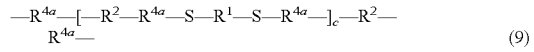
—R$^{4a}$—[—R$^2$—R$^{4a}$—S—R$^1$—S—R$^{4a}$—]$_c$—R$^2$—R$^{4a}$—       (9)

(d) wherein,
(i) c is an integer from 1 to 3;
(ii) each R$^1$ is independently selected from C$_{2-10}$ heteroalkanediyl, substituted C$_{2-10}$ alkanediyl, substituted C$_{2-10}$ heteroalkanediyl, and —[(CR$_2$)$_p$—X—]$_q$—(CR$_2$)$_r$—, wherein,
  p is an integer from 1 to 6;
  q is an integer from 1 to 5;
  r is an integer from 2 to 10;
  each X is independently selected from O and S; and
  each R is independently selected from hydrogen, C$_{1-16}$ alkyl, C$_{1-16}$ heteroalkyl, substituted C$_{1-16}$ alkyl, and substituted C$_{1-16}$ heteroalkyl;
(iii) each R$^2$ is independently selected from C$_{2-10}$ heteroalkanediyl, substituted C$_{2-10}$ alkanediyl, substituted C$_{2-10}$ heteroalkanediyl, and —[(CR$_2$)$_p$—X—]$_q$(CR$_2$)$_r$—, wherein, p is an integer from 1 to 6;
q is an integer from 1 to 5;
r is an integer from 2 to 10;
each X is independently selected from O and S; and
each R is independently selected from hydrogen, $C_{1-16}$ alkyl, $C_{1-16}$ heteroalkyl, substituted $C_{1-16}$ alkyl, and substituted $C_{1-16}$ heteroalkyl;

(iv) B represents a core of a z-valent, polythiol polyfunctionalizing agent $B(-R^3-SH)_z$ or a polyfunctional thiol-reactive polyfunctionalizing agent $B(-R^3-R^4)_z$, wherein,
z is an integer from 3 to 6; and
each $R^3$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
each $R^4$ is a thiol-reactive group; and (v) each $R^4$ is independently a divalent moiety comprising a group derived from a reaction of a thiol-reactive group $R^4$ with a thiol group; and (e) wherein,
(i) at least one of $R^1$ and $R^2$ is selected from substituted $C_{2-100}$ alkanediyl, substituted $C_{2-10}$ heteroalkanediyl, and $-[(CR_2)_p-X-]_q(CR_2)_r$-, wherein,
p is an integer from 1 to 6;
q is an integer from 1 to 5;
r is an integer from 2 to 10;
each X is independently selected from O and S; and
at least one R is selected from $C_{1-16}$ alkyl, $C_{1-16}$ heteroalkyl, substituted $C_{1-16}$ alkyl, and substituted $C_{1-16}$ heteroalkyl;

(ii) the polythioether prepolymer comprises two or more moieties having the structure of Formula (10):

$$-X-(CH_2)_a-X- \qquad (10)$$

wherein,
a is an integer from 1 to 6;
each X is independently selected from O and S; and
the value of a in a first moiety of Formula (10) is different than the value of a in a second moiety of Formula (10); or (iii) a combination thereof.

Aspect 2. The polythioether prepolymer of aspect 1, wherein (i) at least one of $R^1$ and $R^2$ is selected from substituted $C_{20}$ heteroalkanediyl, and $-[(CR_2)_p-X-]_q-(CR_2)_r$-, wherein,
p is an integer from 1 to 6;
q is an integer from 1 to 5;
r is an integer from 2 to 10;
each X is independently selected from O and S; and
at least one R is selected from $C_{1-16}$ alkyl, $C_{1-16}$ heteroalkyl, substituted $C_{1-16}$ alkyl, and substituted $C_{1-16}$ heteroalkyl.

Aspect 3. The polythioether prepolymer of any one of aspects 1 to 2, wherein (ii) A comprises two or more moieties having the structure of Formula (10):

$$-X-(CH_2)_a-X- \qquad (10)$$

wherein,
a is an integer from 1 to 6;
X is selected from O and S; and
at least one of the moieties of Formula (10) is different than at least one of the other moieties of Formula (10).

Aspect 4. The polythioether prepolymer of any one of aspects 1 to 3, wherein the thiol-reactive group $R^4$ is selected from an alkenyl group, an alkynyl group, an epoxy group, an isocyanate group, or a Michael acceptor group.

Aspect 5. The polythioether prepolymer of any one of aspects 1 to 4, wherein $R^{4a}$ is selected from $-CH_2-CH_2-$, $-CH=CH-$, $-C(=O)-NH-$, $-CH_2-CH(-OH)-$, and $-(CH_2)_2-EW-$, where EW is an electron withdrawing group.

Aspect 6. The polythioether prepolymer of any one of aspects 1 to 5, wherein the thiol-reactive group $R^4$ is an alkenyl group; and $R^{4a}$ is $-CH_2-CH_2-$.

Aspect 7. The polythioether prepolymer of any one of aspects 1 to 6, wherein each of the one or more substituent groups in the substituted alkanediyl, substituted heteroalkanediyl, substituted alkyl and substituted heteroalkyl is independently selected from $-OH$, halogen, $C_{1-6}$ alkoxy, $C_{1-6}$ alkyl, $C_{1-6}$ heteroalkyl, and $-NR_2$ where each R is independently selected from hydrogen and $C_{1-3}$ alkyl.

Aspect 8. The polythioether prepolymer of any one of aspects 1 to 7, wherein each of the one or more heteroatoms of the heteroalkanediyl and heteroalkyl is independently selected from O, S, and Si.

Aspect 9. The polythioether prepolymer of any one of aspects 1 to 8, wherein each moiety of Formula (4) is derived from a dithiol monomer of Formula (4a):

$$HS-R^1-SH \qquad (4a)$$

wherein $R^1$ is defined as for Formula (4).

Aspect 10. The polythioether prepolymer of aspect 9, wherein, $R^1$ is $-[(CR_2)_p-X-]_q-(CR_2)_r$-; wherein p, X, q and r are as defined above for aspect 1, and each R is hydrogen.

Aspect 11. The polythioether prepolymer of aspect 9, wherein the dithiol monomer of Formula (4a) is selected from $HS-(CH_2)_2-O-(CH_2)_2-O-(CH_2)_2-SH$ $HS-(CH_2)_2-S-(CH_2)_2-SH$, $HS-(CH_2)_2-S-(CH_2)_2-S-(CH_2)_2-SH$, and a combination of any of the foregoing.

Aspect 12. The polythioether prepolymer of aspect 9, wherein $R^1$ is selected from $C_{2-10}$ heteroalkanediyl and $-[(CR_2)_p-X-]_q-(CR_2)_r$-, wherein p, X, q and r are as defined above for aspect 1, and each R is hydrogen.

Aspect 13. The polythioether prepolymer of aspect 9, wherein $R^1$ is selected from substituted $C_{2-10}$ heteroalkanediyl and $-[(CR_2)_p-X-]_q-(CR_2)_r$-, wherein p, X, q and r are as defined above for aspect 1, and at least one R is selected from $C_{1-16}$ alkyl, $C_{1-16}$ heteroalkyl, substituted $C_{1-16}$ alkyl, and substituted $C_{1-16}$ heteroalkyl.

Aspect 14. The polythioether prepolymer of aspect 9, wherein the dithiol monomer of Formula (4a) is selected from $HS-(CH_2)_2-S-CH_2-CH(-CH_3)-SH$ (M-DMDS), $HS-(CH_2)_2-S-CH(-CH_3)-CH_2-SH$, and a combination thereof.

Aspect 15. The polythioether prepolymer of any one of aspects 1 to 14, wherein each moiety of Formula (5) is derived from a polythiol polyfunctionalizing agent of Formula (5a):

$$B(-R^3-SH)_z \qquad (5a)$$

wherein B, z, and $R^3$ are defined as for Formula (5).

Aspect 16. The polythioether prepolymer of aspect 15, wherein, z is an integer from 3 to 6; and each $R^3$ is independently selected from $C_{1-6}$ alkanediyl, $C_{1-6}$ heteroalkanediyl, substituted $C_{1-6}$ alkanediyl, and substituted $C_{1-6}$ heteroalkanediyl.

Aspect 17. The polythioether prepolymer of any one of aspects 15 to 16, wherein the polythiol polyfunctionalizing agent of Formula (5a) is selected from 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations of any of the foregoing.

Aspect 18. The polythioether prepolymer of any one of aspects 1 to 17, wherein each moiety of Formula (6) is derived from a dithiol adduct of Formula (6a):

$$H-[-S-R^1-S-R^{4a}-R^2-R^{4a}-]_c-S-R^1-SH \quad (6a)$$

wherein c, $R^1$, $R^2$, and $R^{4a}$ are defined as for Formula (6).

Aspect 19. The polythioether prepolymer of aspect 18, wherein, $R^1$ comprises at least one moiety having the structure of Formula (10):

$$-X-(CH_2)_{a1}-X- \quad (10)$$

$R^2$ comprises at least one moiety having the structure of Formula (10):

$$-X-(CH_2)_{a1}-X- \quad (10)$$

each of a1 and a2 is independently an integer from 1 to 6; and a1 is not the same as a2.

Aspect 20. The polythioether prepolymer of aspect 18, wherein, each $R^1$ is $-(CH_2)_2-O-(CH_2)_2-O-(CH_2)_2-$; each $R^2$ is $-O-(CH_2)_2-O-(CH_2)_2-O-$; and each $R^4$ is $-(CH_2)_2-$.

Aspect 21. The polythioether prepolymer of any one of aspects 18 to 20, wherein the dithiol adduct of Formula (6a) comprises the reaction product of reactants comprising:

(a) a dithiol monomer of Formula (4a):

$$HS-R^1-SH \quad (4a); \text{ and}$$

(b) a difunctional thiol-reactive monomer of Formula (7a):

$$R^4-R^2-R^4 \quad (7a)$$

wherein, $R^1$ and $R^2$ are defined as for Formula (4) and Formula (7); and each $R^4$ is independently a thiol-reactive group.

Aspect 22. The polythioether prepolymer of aspect 21, wherein the molar ratio of the dithiol monomer (a) to the difunctional thiol-reactive monomer (b) is from 2 to 1.1.

Aspect 23. The polythioether prepolymer of any one of aspects 21 to 22, wherein the difunctional thiol-reactive monomer comprises a dialkenyl compound.

Aspect 24. The polythioether prepolymer of any one of aspects 1 to 23, wherein each moiety of Formula (7) is derived from a difunctional thiol-reactive monomer of Formula (7a):

$$R^4-R^2-R^4 \quad (7a)$$

wherein $R^2$ is defined as for Formula (7); and each $R^4$ is independently a thiol-reactive group.

Aspect 25. The polythioether prepolymer of aspect 24, wherein the thiol-reactive group $R^4$ is an alkenyl ($-CH=CH_2$) group.

Aspect 26. The polythioether prepolymer of any one of aspects 24 to 25, wherein the thiol-reactive monomer of Formula (7a) comprises a divinyl ether having the structure of Formula (11):

$$CH_2=CH-O-(R^5-O-)_mCH=CH_2 \quad (11)$$

wherein, m is an integer from 1 to 50; and each $R^5$ is independently selected from $C_{1-10}$ alkanediyl, substituted $C_{1-10}$ alkanediyl, and $-[(CR_2)_p-X-]_q(CR_2)_r-$, wherein, p is an integer from 1 to 6;

q is an integer from 1 to 5;

r is an integer from 2 to 10;

each X is independently selected from O and S; and each R is independently selected from hydrogen, $C_{1-16}$ alkyl, $C_{1-16}$ heteroalkyl, substituted $C_{1-16}$ alkyl, and substituted $C_{1-16}$ heteroalkyl.

Aspect 27. The polythioether prepolymer of aspect 26, wherein each $R^5$ is independently selected from $C_{1-10}$ alkanediyl.

Aspect 28. The polythioether prepolymer of aspect 24, wherein the thiol-reactive monomer of Formula (7a) comprises a dialkenyl compound having the structure of Formula (13), a dialkenyl ether having the structure of Formula (14), or a combination thereof:

$$CH_2=CH-O-R^7-O-CH=CH_2 \quad (13)$$

$$CH_2=CH-CH_2-O-R^7-O-CH_2-CH=CH_2 \quad (14)$$

wherein, $R^7$ is selected from $C_{1-10}$ alkanediyl, $C_{1-10}$ heteroalkanediyl, substituted $C_{1-10}$ alkanediyl, and substituted $C_{1-10}$ heteroalkanediyl; and each of the one or more substituent groups is independently selected from $C_{1-6}$ alkyl, $C_{1-6}$ heteroalkyl, substituted $C_{1-6}$ alkyl, and substituted $C_{1-6}$ heteroalkyl.

Aspect 29. The polythioether prepolymer of aspect 24, wherein the thiol-reactive monomer of Formula (7a) comprises a dialkenyl compound of Formula (15):

$$CH_2=CH-R^8-CH=CH_2 \quad (15)$$

wherein $R^8$ is selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 30. The polythioether prepolymer of any one of aspects 24 to 27, wherein the thiol-reactive monomer of Formula (7a) comprises diethylene glycol divinyl ether.

Aspect 31. The polythioether prepolymer of aspect 24, wherein the thiol-reactive monomer is selected from $CH_2=CH-O-(CH_2)_2-O-(CH_2)_2O-CH=CH_2$, $CH_2=CH-CH_2-O-CH_2$-epoxy, $CH_2=CH-(-CH_2-O-(CH_2)_2-O-)_2-CH_2-CH=CH_2$, and a combination of any of the foregoing.

Aspect 32. The polythioether prepolymer of aspect 24, wherein the thiol-reactive monomer is selected from $CH_2=CH-Si(-CH_3)_2-O-Si(-CH_3)_2-CH=CH_2$, $CH_2=CH-O-CH_2-CH(-CH_3)-O-CH=CH_2$, $CH_2=CH-CH_2-O-CH_2-C(-CH_2-OH)(-CH_2-CH_3)-CH_2-O-CH_2-CH=CH_2$, (2-(2-ethyl-4-(vinyloxy)-3-((vinyloxy)methyl)butoxy)ethyl)(3,3,4,4,5,5,6,6,6-nonafluorohexyl)sulfane), and a combination of any of the foregoing.

Aspect 33. The polythioether prepolymer of any one of aspects 1 to 32, wherein each moiety of Formula (8) is derived from a thiol-reactive polyfunctionalizing agent of Formula (8a);

$$B(-R^3-R^4)_z \quad (8a)$$

wherein,

B, z, and $R^3$ are defined as in aspect 1; and each $R^4$ is independently a thiol-reactive group.

Aspect 34. The polythioether prepolymer of aspect 33, wherein $R^4$ is an alkenyl $-CH=CH_2$ group.

Aspect 35. The polythioether prepolymer of any one of aspects 33 to 34, wherein $R^3$ is selected from $C_{1-10}$ alkanediyl and $C_{1-10}$ heteroalkanediyl.

Aspect 36. The polythioether prepolymer of any one of aspects 33 to 35, wherein the thiol-reactive polyfunctionalizing agent is selected from triallyl cyanurate (TAC), triallyl isocyanurate (TAIC), trivinylcyclohexane, trimethylolpropane trivinyl ether, glycerol trivinylether, trimethylolpropane triallyl ether, glycerol triallyl ether, and combinations of any of the foregoing.

Aspect 37. The polythioether prepolymer of any one of aspects 1 to 36, wherein each moiety of Formula (9) is derived from a difunctional thiol-reactive adduct of Formula (9a);

$$R^4-[-R^2-R^{4a}-S-R^1-S-R^{4a}-]_c-R^2-R^4 \quad (9a)$$

wherein, c, $R^1$, $R^2$, and $R^{4a}$ are defined as for Formula (9); and
$R^4$ is a thiol-reactive group.

Aspect 38. The polythioether prepolymer of aspect 37, wherein $R^1$ is selected from $C_2{-}10$ heteroalkanediyl and $-[(CR_2)_p-X-]_q-(CR_2)_r-$, wherein p, X, q and r are as defined above for aspect 1 and each R is hydrogen.

Aspect 39. The polythioether prepolymer of aspect 37, wherein $R^1$ is selected from substituted $C_{2-10}$ heteroalkanediyl and $-[(CR_2)_p-X-]_q-(CR_2)_r-$, wherein p, X, q and r are as defined above for aspect 1 and at least one R is selected from $C_{1-16}$ alkyl, $C_{1-16}$ heteroalkyl, substituted $C_{1-16}$ alkyl, and substituted $C_{1-16}$ heteroalkyl.

Aspect 40. The polythioether prepolymer of any one of aspects 37 to 39, wherein $R^2$ is selected from $C_{2-10}$ heteroalkanediyl and $-[(CR_2)_p-X-]_q-(CR_2)_r-$, wherein p, X, q and r are as defined above for aspect 1 and each R is hydrogen.

Aspect 41. The polythioether prepolymer of any one of aspects 37 to 39, wherein $R^2$ is selected from substituted $C_{2-10}$ heteroalkanediyl and $-[(CR_2)_p-X-]_q-(CR_2)_r-$, wherein p, X, q and r are as defined above for aspect 1 and at least one R is selected from $C_{1-16}$ alkyl, $C_{1-16}$ heteroalkyl, substituted $C_{1-16}$ alkyl, and substituted $C_{1-16}$ heteroalkyl.

Aspect 42. The polythioether prepolymer of any one of aspects 37 to 41, wherein each $R^4$ is $-CH=CH_2$ and each $R^{4a}$ is $-CH_2-CH_2-$.

Aspect 43. The polythioether prepolymer of any one of aspects 37 to 42, wherein the difunctional thiol-reactive adduct of Formula (9a) comprises the reaction product of reactants comprising:

(a) a dithiol monomer of Formula (4a):

$$HS-R^1-SH \quad (4a); \text{ and}$$

(b) a difunctional thiol-reactive monomer of Formula (7a):

$$R^4-R^2-R^4 \quad (7a)$$

wherein, $R^1$ and $R^2$ are defined as for Formula (4) and Formula (7); and
each $R^4$ is independently a thiol-reactive group.

Aspect 44. The polythioether prepolymer of any one of aspects 1 to 43, wherein the polythioether prepolymer comprises a thiol-terminated polythioether prepolymer of Formula (3a):

$$H-[-A-D-]_n-A-H \quad (3a)$$

wherein, n, A, and D are defined as for Formula (1);
each branch, if present, of the thiol-terminated polythioether prepolymer is terminated in a moiety -[-D-A-]$_{n1}$-H; and
n1 is an integer from 0 to 10, wherein the branch is derived from polythiol polyfunctionalizing agent and/or a polyfunctional thiol-reactive polyfunctionalizing agent.

Aspect 45. The polythioether prepolymer of any one of aspects 1 to 44, wherein the polythioether prepolymer comprises a thiol-reactive polythioether prepolymer of Formula (3b):

$$D^1-[-A-D-]_n-A-D^1 \quad (3b)$$

wherein, n, A, and D are defined as for Formula (3); and
each $D^1$ is independently selected from a moiety of Formula (7b), a moiety of Formula (8b), and a moiety of Formula (9b):

$$-R^{4a}-R^2-R^4 \quad (7b)$$

$$B(-R^3-R^4)_z \quad (8b)$$

$$-[-R^{4a}-R^2-R^{4a}-S-R^1-S-]_c-R^{4a}-R^2-R^4 \quad (9b)$$

wherein c, z, $R^1$, $R^2$ $R^4$, and $R^{4a}$ are defined as for Formula (7), Formula (8), or Formula (9).

Aspect 46. The polythioether prepolymer of any one of aspects 1 to 45, wherein the polythioether prepolymer does not comprise pendent hydroxyl groups.

Aspect 47. The polythioether prepolymer of any one of aspects 1 to 45, wherein the polythioether prepolymer comprises pendent hydroxyl groups.

Aspect 48. The polythioether prepolymer of any one of aspects 1 to 47, wherein $R^4$ is not an epoxy group.

Aspect 49. The polythioether prepolymer of any one of aspects 1 to 48, wherein each of the dithiol monomer, the polythiol polyfunctionalizing agent, and the dithiol adduct independently has a molecular weight from 100 Da to 600 Da.

Aspect 50. The polythioether prepolymer of any one of aspects 1 to 49, wherein each of the difunctional thiol-reactive monomer, the polyfunctional thiol-reactive polyfunctionalizing agent, and the thiol-reactive adduct independently has a molecular weight from 100 Da to 600 Da.

Aspect 51. The polythioether prepolymer of any one of aspects 1 to 50, wherein the polythioether prepolymer has a reactive functionality from 2.1 to 2.9.

Aspect 52. The polythioether prepolymer of any one of aspects 1 to 51, wherein the polythioether prepolymer has a viscosity from 20 Poise to 500 Poise, at 25° C. as determined using CAP 2000 viscometer, with a No. 6 spindle, at a speed of 50-300 rpm.

Aspect 53. The polythioether prepolymer of any one of aspects 1 to 52, wherein the polythioether prepolymer has a thiol equivalent weight from 1,000 to 8,000, as determined by iodine titration.

Aspect 54. The polythioether prepolymer of any one of aspects 1 to 53, wherein the polythioether prepolymer has a sulfur content from 10 wt % to 35 wt %, where wt % is based on the total weight of the polythioether prepolymer.

Aspect 55. The polythioether prepolymer of any one of aspects 1 to 54, wherein the molar ratio of non-linear and/or symmetry-breaking monomers and/or adducts to linear dithiol and/or dialkenyl monomers in the polythioether prepolymer is from 0.05:1 to 1.2:1.

Aspect 56. The polythioether prepolymer of any one of aspects 1 to 55, wherein the molar ratio of non-linear and/or symmetry-breaking monomers and/or adducts to linear dithiol and/or dialkenyl monomers in the polythioether prepolymer is less than 1.2:1.

Aspect 57. The polythioether prepolymer of any one of aspects 1 to 56, wherein the molar ratio of non-linear and/or symmetry-breaking monomers and/or adducts to linear dithiol and/or dialkenyl monomers in the polythioether prepolymer is greater than 0.2:1.

Aspect 58. The polythioether prepolymer of any one of aspects 1 to 57, wherein the polythioether prepolymer is formed from a reaction mixture that comprises from 1 mol % to 5 mol % of a polyfunctionalizing agent, from 50 mol % to 85 mol % of linear dithiol and linear dialkenyl monomers and/or adducts, and from 10 mol % to 45 mol % of non-linear and/or symmetry-breaking monomers and/or adducts, where mol % is based on the total moles of the monomers and adducts used to form the polythioether prepolymer.

Aspect 59. The polythioether prepolymer of any one of aspects 1 to 57, wherein the polythioether prepolymer is formed from a reaction mixture that comprises less than 15 mol % of a polyfunctionalizing agent, less than 95 mol % of linear dithiol and linear dialkenyl monomers, and less than 60 mol % of non-linear and/or symmetry-breaking monomers and/or adducts, where mol % is based on the total moles of the monomers and adducts used to form the polythioether prepolymer.

Aspect 60. The polythioether prepolymer of any one of aspects 1 to 59, wherein the polythioether prepolymer is a liquid at a temperature of less than 5° C.

Aspect 61. The polythioether prepolymer of any one of aspects 1 to 60, wherein the polythioether prepolymer has a nucleation temperature of less than 5° C., wherein the nucleation temperature is determined by visual observation.

Aspect 62. A polythioether prepolymer, wherein the polythioether prepolymer comprises the reaction product of reactants comprising:

(a) a polythiol monomer, wherein the polythiol monomer comprises a dithiol monomer of Formula (4a), a polythiol polyfunctionalizing agent of Formula (5a), a dithiol adduct of Formula (6a), or a combination of any of the foregoing;

  (4a)

  (5a)

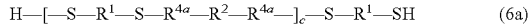  (6a)

wherein each $R^1$ is independently selected from $C_{2-10}$ heteroalkanediyl, substituted $C_{2-10}$ alkanediyl, substituted $C_{2-10}$ heteroalkanediyl, and $-[(CR_2)_p-X-]_q-(CR_2)_r-$,
wherein,
p is an integer from 1 to 6;
q is an integer from 1 to 5;
r is an integer from 2 to 10;
each X is independently selected from O and S; and
each R is independently selected from hydrogen, $C_{1-16}$ alkyl, $C_{1-16}$ heteroalkyl, substituted $C_{1-16}$ alkyl, and substituted $C_{1-16}$ heteroalkyl;
wherein each $R^2$ is independently selected from $C_{2-10}$ heteroalkanediyl, substituted $C_{2-10}$ alkanediyl, substituted $C_{2-10}$ heteroalkanediyl, and $-[(CR_2)_p-X-]_q-(CR_2)_r-$, wherein,
p is an integer from 1 to 6;
q is an integer from 1 to 5;
r is an integer from 2 to 10;
each X is independently selected from O and S; and
each R is independently selected from hydrogen, $C_{1-16}$ alkyl, $C_{1-16}$ heteroalkyl, substituted $C_{1-16}$ alkyl, and substituted $C_{1-16}$ heteroalkyl;
wherein each $R^{4a}$ independently comprises a group derived from a reaction of a thiol-reactive group $R^4$ with a thiol group;

B represents a core of a z-valent, polythiol polyfunctionalizing agent $B(-R^3-R^4)_z$,
each $R^3$ is independently selected from $C_{1-10}$ alkanediyl, $C_{1-10}$ heteroalkanediyl, substituted $C_{1-10}$ alkanediyl, and substituted $C_{1-10}$ heteroalkanediyl;
c is an integer from 1 to 3; and
z is an integer from 3 to 6; and (b) a polyfunctional thiol-reactive monomer, wherein the polyfunctional thiol-reactive monomer comprises a difunctional thiol-reactive monomer of Formula (7a), a polyfunctional thiol-reactive polyfunctionalizing agent of Formula (8a), a difunctional thiol-reactive adduct of Formula (9a), or a combination of any of the foregoing;

  (7a)

  (8a)

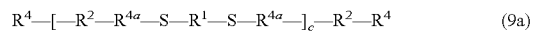  (9a)

wherein $R^1$, $R^2$, B, $R^3$, z, c, and $R^{4a}$ are as defined above and each $R^4$ is a thiol-reactive group;
wherein,
(i) at least one of $R^1$ and $R^2$ is selected from substituted $C_{2-10}$ alkanediyl, substituted $C_{2-10}$ heteroalkanediyl, and $-[(CR_2)_p-X-]_q-(CR_2)_r-$, wherein r, p, X, q and r are as defined above for aspect 1 and at least one R is selected from $C_{1-16}$ alkyl, $C_{1-16}$ heteroalkyl, substituted $C_{1-16}$ alkyl, and substituted $C_{1-16}$ heteroalkyl;
(ii) the polythioether prepolymer comprises two or more moieties having the structure of Formula (10):

  (10)

wherein,
a is an integer from 1 to 6;
each X is independently selected from O and S; and
the value of a in a first moiety of Formula (10) is different than the value of a in a second moiety of Formula (10); or
(iii) a combination thereof.

Aspect 63. The polythioether prepolymer of aspect 62, wherein, (a) the polythiol monomer comprises 1,8-dimercapto-3,6-dioxaoctane (DMDO), dimercaptodiethylsulfide (DMDS), methyl-substituted dimercaptodiethylsulfide (M-DMDS), a 1,8-dimercapto-3,6-dioxaoctane (DMDO)/diethylene glycol divinyl ether (DEG-DVE) adduct, a 1,8-dimercapto-3,6-dioxaoctane (DMDO)/2,2-bis((allyloxy)methyl)butan-1-ol (TMP-DAE) adduct, a methyl-substituted dimercaptodiethylsulfide (DMDS)/2,2-bis((allyloxy)methyl)butan-1-ol (TMP-DAE) adduct, or a combination of any of the foregoing; and (b) the polyfunctional thiol-reactive monomer comprises triallyl cyanurate (TAC), diethylene glycol divinyl ether (DEG-DVE), divinyltetramethyldisiloxane (DVTMDS), bis[2-(allyloxy)ethyl] formal (BAEF), 3,3,4,4,5,5,6,6,6-nonafluorohexane-1-thiol (NFHT), or a combination of any of the foregoing.

Aspect 64. A terminal-modified polythioether prepolymer, wherein the terminal-modified polythioether comprises a terminal-modified polythioether of Formula (3d):

  (3d)

wherein,
n, A, and D are defined as for Formula (3); and
each $R^{12}$ is independently a moiety comprising a terminal functional group.

Aspect 65. The terminal-modified polythioether prepolymer of aspect 64, wherein the terminal functional group is a thiol-reactive group.

Aspect 66. The terminal-modified polythioether prepolymer of any one of aspects 64 to 65, wherein the terminal functional group is an alkenyl group, an alkynyl group, a Michael acceptor group, an epoxy group, a polyalkoxysilyl group, a hydroxyl group, an amine group, or an isocyanate group.

Aspect 67. A terminal-modified polythioether prepolymer, wherein the terminal-modified polythioether prepolymer comprises the reaction product of reactants comprising (a) the polythioether prepolymer of any one of aspects 1 to 66; and (b) a compound comprising a terminal functional group and a terminal group reactive with the polythioether prepolymer of any one of aspects 1 to 68.

Aspect 68. The terminal-modified polythioether prepolymer of aspect 67, wherein, (a) the polythioether prepolymer of any one of aspects 1 to 68 comprises a thiol-terminated polythioether prepolymer of Formula (3a):

H—[-A-D-]$_n$-A-H  (3a); and (b) the compound comprises a terminal functional group and a terminal group reactive with a thiol group.

Aspect 69. The polythioether polymer of any one of aspects 62 to 68, wherein the polythioether polymer further is as defined in any one of aspects 1 to 61.

Aspect 70. A composition comprising the polythioether prepolymer of any one of aspects 1 to 69.

Aspect 71. The composition of aspect 70, further comprising a curing agent, wherein the curing agent is reactive with the polythioether prepolymer.

Aspect 72. The composition of aspect 71, wherein the curing agent comprises alkenyl groups, epoxy groups, or Michael acceptor groups or a combination thereof; and the polythioether prepolymer comprises terminal thiol groups.

Aspect 73. The composition of any one of aspects 70 to 72, wherein the composition comprises a filler.

Aspect 74. The composition of aspect 73, wherein the filler comprises an inorganic filler, an organic filler, a low-density filler, an electrically conductive filler, a magnetic filler, graphene, or a combination of any of the foregoing.

Aspect 75. The composition of any one of aspects 70 to 74, wherein the composition comprises a catalyst capable of catalyzing the reaction between the polythioether prepolymer and the curing agent.

Aspect 76. The composition of any one of aspects 70 to 75, wherein the composition comprises an adhesion promoter.

Aspect 77. The composition of aspect 76, wherein the adhesion promoter comprises an organofunctional alkoxysilane, a phenolic resin, or a combination thereof.

Aspect 78. The composition of any one of aspects 70 to 77, wherein the composition comprises a reactive diluent.

Aspect 79. The composition of aspect 78, wherein the reactive diluent comprises a hydroxyl-functional vinyl ether.

Aspect 80. The composition of any one of aspects 70 to 79, wherein the composition comprises a colorant.

Aspect 81. The composition of any one of aspects 70 to 80, wherein the composition comprises a photochromic agent.

Aspect 82. The composition of any one of aspects 70 to 81, wherein the composition comprises a sulfur-containing prepolymer that is different than the polythioether prepolymer of anyone of aspects 1 to 69.

Aspect 83. The composition of aspect 82, wherein the sulfur-containing prepolymer comprises a second polythioether prepolymer, a polysulfide prepolymer, a sulfur-containing polyformal prepolymer, a monosulfide prepolymer, or a combination of any of the foregoing.

Aspect 84. The composition of aspect 82, wherein the sulfur-containing prepolymer comprises a moiety having the structure of Formula (19):

—S—R$^{15}$—[S-G-S—R$^{15}$-]$_n$—S—  (19)

wherein, n is an integer from 1 to 60;

each R$^{15}$ is independently selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR$^3$)$_p$—X—]$_q$(CHR$^3$)$_r$—, where, p is an integer from 2 to 6;

q is an integer from 1 to 5;

r is an integer from 2 to 10;

each R$^3$ is independently selected from hydrogen and methyl; and each X is independently selected from O, S, S—S, and NR, wherein R is selected from hydrogen and methyl; and each G is independently a moiety derived from a polyvinyl ether of Formula (20) and a polyalkenyl polyfunctionalizing agent of Formula (21):

CH$_2$=CH—O—(R$^{16}$—O)$_m$—CH=CH$_2$  (20)

B(—R$^{17}$—CH=CH$_2$)$_z$  (21)

wherein, m is an integer from 0 to 50;

each R$^{16}$ is independently selected from C$_{1-10}$ alkanediyl, C$_{6-8}$ cycloalkanediyl, C$_{6-14}$ alkanecycloalkanediyl, and —[(CHR)$_p$—X—]$_q$(CHR)$_r$—, wherein p, q, r, R, and X are as defined as for R$^{15}$;

B represents a core of a z-valent, polyalkenyl polyfunctionalizing agent B(—R$^{17}$—CH=CH$_2$)$_z$ wherein, z is an integer from 3 to 6; and each R$^{17}$ is independently selected from C$_{1-10}$ alkanediyl, C$_{1-10}$ heteroalkanediyl, substituted C$_{1-10}$ alkanediyl, and substituted C$_{1-10}$ heteroalkanediyl.

Aspect 85. The composition of aspect 84, wherein each A is independently be selected from a moiety of Formula (20a) and a moiety of Formula (21a):

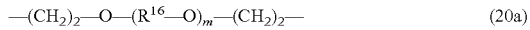

—(CH$_2$)$_2$—O—(R$^{16}$—O)$_m$—(CH$_2$)$_2$—  (20a)

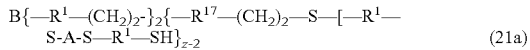

B{—R$^1$—(CH$_2$)$_2$-}$_2${—R$^{17}$—(CH$_2$)$_2$—S—[—R$^1$—S-A-S—R$^1$—SH}$_{z-2}$  (21a)

where m, R$^{15}$, R$^{16}$, R$^{17}$, g, and z are defined as in Formula (20) and Formula (21).

Aspect 86. The composition of any one of aspects 82 to 85, wherein the sulfur-containing prepolymer comprises a thiol-terminated sulfur-containing prepolymer.

Aspect 87. A cured composition prepared from the composition of any one of aspects 70 to 86.

Aspect 88. A part comprising the cured composition of aspect 87.

Aspect 89. A vehicle comprising the cured composition of aspect 87 or a part of aspect 88.

Aspect 90. The vehicle of aspect 89, wherein the vehicle comprises an aerospace vehicle.

Aspect 91. A method of sealing a surface, comprising applying the composition of any one of aspects 70 to 86 to a surface; and curing the applied composition to seal the surface.

Aspect 92. The method of aspect 91, wherein the surface comprises a surface of a vehicle.

Aspect 93. The method of aspect 92, wherein the vehicle comprises and aerospace vehicle.

Aspect 94. A sealant system comprising: a first part, wherein the first part comprises the polythioether prepolymer of any one of aspects 1 to 69; and a second part, wherein the second part comprises a curing agent, wherein the curing agent is reactive with the polythioether prepolymer.

Aspect 95. A sealant composition prepared by combining the first part of the sealant system of aspect 94 and the second part of the sealant system of aspect 94.

EXAMPLES

Embodiments provided by the present disclosure are further illustrated by reference to the following examples, which describe the prepolymers provided by the present disclosure, compositions provided by the present disclosure and uses of such compositions. It will be apparent to those skilled in the art that many modifications, both to materials, and methods, may be practiced without departing from the scope of the disclosure.

Example 1

Thiol-Terminated Polythioethers Including Moieties Derived from Allyl Glycidyl Ether (AGE); Functionality 2.21

DMDO (58.2 g, 0.3193 mol), triallyl cyanurate (TAC) (1.41 g, 0.0057 mol), and allyl glycidyl ether (AGE) (10.47 g, 0.0917 mole) were charged into a 250-mL, 3-necked round-bottomed flask. The flask was equipped with a mechanical stirrer, a temperature probe and a gas adapter. The mixture was stirred (RPM: 100) and flushed with nitrogen. The mixture was heated to from 60° C. to 71° C. for 1 h. The reaction mixture was then cooled to 37° C. 1,8-Diazabicyclo[5.4.0]undec-7-ene (DBU; 0.054 g, 0.035 mmol) was added and, after 10 min, the mixture was heated at 60° C. for 2 h. A mixture of diethylene glycol divinylether (DEG-DVE) (29.92 g, 0.1891 mol) and a solution of Vazo® 67 (0.05 g in 0.5 mL of toluene) was added over a period of 2 h. The temperature was then increased to 70° C., six additional portions of Vazo® 67 (0.028 g each) were added at an interval of 1 h and the mixture was heated for an additional 2 h. The reaction mixture was evacuated (vacuum: 12 mm Hg) for 1 h to give a liquid polythioether prepolymer (theoretical functionality: 2.21; mercaptan equivalent weight of 1,502; viscosity: 59 poise (5.9 Pa-sec)). An aliquot of the prepolymer was maintained at 39° F. (3.9° C.) and there was no evidence of solidification after 157 days.

Example 2

Thiol-Terminated Polythioether Prepolymer Including Moieties Derived from Allyl Glycidyl Ether; Functionality 2.8

DMDO (68.09 g, 0.3735 mol), TAC (5.11 g, 0.0205 mol), and AGE (12.81, 0.1122 mol) were charged into a 250-mL 3-necked round-bottomed flask. The flask was equipped with a mechanical stirrer, a temperature probe and a gas adapter. The mixture was stirred (RPM: 100) and flushed with nitrogen. The mixture was then heated at 60° C. for 1 h. The mixture was then cooled to 39° C. DBU (0.066 g, 0.043 mmol) was added and, after 7 min, heating was resumed. The mixture was heated at from 60° C. to 66° C. for 3 h. A mixture of DEG-DVE (30.8 g, 0.1947 mol) and a solution of Vazo®-67 (0.06 g in 0.5 mL of toluene) was added over a period of 1.5 h. The temperature was then increased to 70° C., four additional portions of Vazo® 67 (0.03 g each) were added at an interval of 1 h and the mixture was heated for an additional 2 h. The reaction mixture was evacuated (vacuum: 12 mm) for 0.5 h to give a liquid polythioether prepolymer (theoretical functionality: 2.8; thiol equivalent weight 1,522; viscosity: 380 poise (38.0 Pa-sec)). An aliquot of the prepolymer was maintained at 39° F. (3.9° C.) and there was no evidence of solidification after 143 days.

Example 3

Synthesis of Methyl-substituted Dimercaptodiethylsulfide (M-DMDS)

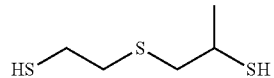

Concentrated hydrochloric acid (1.429 kg, 14.29 mol) was charged into a 5-L 4-necked round-bottomed flask. The flask was equipped with a stirrer, a temperature probe and a condenser. While stirring, powdered thiourea (0.924 g, 12.14 mol) was slowly added and the temperature was increased to 70° C. The reaction mixture became clear when the temperature reached 37° C. At 70° C., hydroxyethyl-2-hydroxypropyl sulfide (0.816 kg, 6 mol) was added over a period of 7.7 h. The mixture was heated at 100° C. for 8 h and then cooled to 44° C. Ammonia (28-30%; 750 g) was added over a period of 2.5 h at 39° C. to 44° C. and the mixture stirred at 32° C. to 39° C. for an additional 2 h. The reaction mixture had a pH of 8 at this stage. Formic acid (12 g; concentration: 95%) was added and the mixture was stirred for 2.5 h. The reaction mixture was stirred with toluene (300 mL). The organic layer was separated and the aqueous layer (pH ~5) was extracted in ~500 mL portions with toluene (200 mL). The organic extracts were combined, washed (in portions) with water (200 mL each) and concentrated. The concentrate was fractionated under vacuum to provide a clear colorless sample of methyl-substituted dimercaptodiethylsulfide (M-DMDS); weight: 645 g; purity: 99.8%; boiling point: 64-66° C./0.5-0.7 mm.

Example 4

Thiol-Terminated Polythioether Prepolymer Including Moieties Derived from M-DMDS; Functionality 2.21

M-DMDS from Example 3 (37.87 g; 0.2254 mol) was charged into a 100-mL 3-necked round-bottomed flask. The flask was equipped with a stirrer, a temperature probe, and a gas adapter. While stirring (RPM: 200) the mixture was flushed with nitrogen and heated to 60° C. A solution of TAC (1.08 g, 0.0043 mol), DEG-DVE (31.05 g, 0.1963 mol) and Vazo®-67 (0.038 g) was added at 54° C. to 60° C. over a period of 1.7 h. Four portions of Vazo® 67 (0.026 g each) were added at an interval of 1 h and the mixture heated for 1.5 h. The isolated liquid polythioether prepolymer had a theoretical functionality of 2.21, a mercaptan equivalent weight of 1,846 and a viscosity of 71 poise (7.1 Pa-sec). An aliquot of the prepolymer was maintained at 39° F. (3.9° C.) and there was no evidence of solidification after 85 days.

Example 5

Thiol-Terminated Polythioether Prepolymer Including Moieties Derived from M-DMDS; Functionality 2.21

TAC (1.04 g, 0.0042 mol) and M-DMDS from ICA (37.81 g, 0.2251 mol) were charged into a 100-mL 3-necked round-bottomed flask. The flask was equipped with a stirrer, a temperature probe, and a gas adapter. While stirring (RPM: 200), the mixture was flushed with nitrogen and heated to 70° C. A solution of radical initiator Vazo® 67 (0.042 g in 0.5 mL of toluene) in diethylene glycol divinyl ether (DEG-DVE) (31.16 g, 0.197 mol) was added over a period of 1.8 h. The mixture was then heated for 1.5 h. Seven portions of Vazo® 67 (0.026 g each) were added at an interval of 1 h and the mixture heated for 1.5 h. The reaction mixture was evacuated (vacuum: 10 mm Hg) for 1.75 h. The isolated liquid polythioether prepolymer had a theoretical functionality of 2.21, a mercaptan equivalent weight of 1,852 and a viscosity of 108 poise (108 Pa-sec).

Example 6

Synthesis of 3:2 Dithiol Adduct of DMDO and DEG-DVE

DMDO (2.461 kg, 13.50 mol) was charged into a 5-liter 4-necked round-bottomed flask. The flask was equipped with a stirrer, a temperature probe, and a gas adapter. While stirring, the mixture was evacuated at 25 mm for 20 min. The vacuum was released under nitrogen and the mixture was heated to 54° C. A solution of Vazo® 67 (1.06 g in 2 mL of toluene) and diethylene glycol divinyl ether (DEG-DVE) (1.423 kg, 8.995 mol) was added to the mixture. After 2.3 h, the temperature increased to 80° C. within 1 h, at which point the mixture was cooled to decrease the temperature to 73° C. and the addition of the catalyst and DEG-DVE was continued. The olefin-addition was complete in 6.5 h. The mixture was reacted at 73° C. for another 2.5 h. The reaction mixture was evacuated (vacuum: 22 mm Hg) for 2 h to provide a dithiol DMDO/DEG-DVE adduct having a thiol equivalent weight of 439.

Example 7

Thiol-Terminated Polythioether Prepolymer Including Moieties Derived from DVTMDS; Functionality 2.21

The dithiol DMDO/DEG-DVE adduct of Example 6 (87.05 g, 0.0991 mol) and TAC (1.42 g, 0.0057 mol) were charged into a 250-mL 3-necked round-bottomed flask. The flask was equipped with a stirrer, a temperature probe, and a gas adapter. While stirring (RPM: 200), the mixture was flushed with nitrogen and heated to 70° C. At 68° C., divinyltetramethyldisiloxane (DVTMDS) (11.53 g, 0.0619 mol) was added to the mixture. At this stage, the reaction mixture was cloudy. After 25 min the temperature increased, the reaction mixture became clear, and eventually the temperature increased to 75° C. The reaction mixture was reacted at 70° C. for 2 h. Five portions of Vazo® 67 (0.034 g each) were added at an interval of 2 h and the mixture was reacted at 70° C. for 2 h. The isolated liquid polythioether prepolymer had a theoretical functionality of 2.22, a mercaptan equivalent weight of 1,576 and a viscosity of 36 poise (3.6 Pa-sec). An aliquot of the prepolymer was maintained at 39° F. (3.9° C.) and there was no evidence of solidification after 215 days.

Example 8

Thiol-Terminated Polythioether Prepolymer Including Moieties Derived from DVTMDS; Functionality 2.8

The dithiol adduct Example 6 (87.30 g, 0.0994 mol) and TAC (4.08 g, 0.0164 mol) were charged into a 250-mL 3-necked round-bottomed flask. The flask was equipped with a stirrer, a temperature probe, and a gas adapter. While stirring (RPM: 200), the mixture was flushed with nitrogen and heated to 60° C. At 60° C., divinyltetramethyldisiloxane (DVTMDS) (8.62 g, 0.0462 mol) was added. At this stage the reaction mixture was cloudy. After 5 min the temperature increased, the reaction mixture became clear and the temperature increased to 70° C. The mixture was reacted at 70° C. for 2 h. Seven (7) portions of Vazo® 67 (0.031 g each) were added at an interval of 2 h and the mixture was then reacted for an additional 2 h. The reaction mixture was evacuated (vacuum: 19 mm Hg) for 0.5 h. The isolated liquid polythioether had a theoretical thiol functionality of 2.8, a mercaptan equivalent weight of 1,552 and a viscosity of 119 poise (11.9 Pa-sec). An aliquot of the prepolymer was maintained at 39° F. (3.9° C.) and there was no evidence of solidification after 213 days.

Example 9

Synthesis of 2:1 Dithiol Adduct of DMDO and TMP-DAE

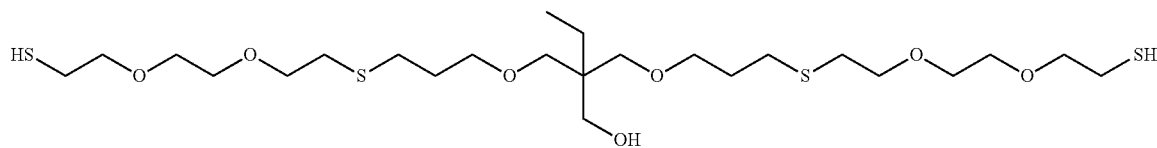 [SMILES: CCC(CO)(COCCCSCCOCCOCCS)COCCCSCCOCCOCCS]

Dimercaptodioxaoctane (DMDO) (94.80 g, 0.526 mol) was charged into a 250-mL 3-necked round-bottomed flask. The flask was equipped with a stirrer, a temperature probe, and a gas adapter. While stirring (RPM: 200), the mixture was flushed with nitrogen and heated to 60° C. A mixture of 2,2-bis((allyloxy)methyl)butan-1-ol (TMP-DAE) (55.28 g, 0.26 mol) and a solution of free radical initiator Vazo® 67 [2,2'-azobis(2-methylbutyronitrile)] (0.08 g in 0.5 mL of toluene) was added at 60° C. over a period of 1.7 h. The mixture was reacted at 60° C. for 1 h. The reaction temperature was increased to 70° C., one portion of Vazo® 67 (0.028 g) was added, and the mixture reacted for 3 h. The reaction mixture was evacuated (vacuum: 6 mm Hg) for 40 min to provide a dithiol DMDO/TMP-DAE adduct having a thiol equivalent weight of 282.

Example 10

Thiol-Terminated Polythioether Prepolymer Including Moieties Derived from 2:1 DMDO/TMP-DAE Dithiol Adduct; Functionality 2.21

TAC (1.48 g, 0.006 mol), the dithiol DMDO/TMP-DAE adduct of Example 9 (59.45 g, 0.105 mol) and DMDO (15.39 g, 0.0844 mol) were charged into a 250-mL 3-necked round-bottomed flask. The flask was equipped with a stirrer, a temperature probe, and a gas adapter. While stirring (RPM: 200), the mixture was flushed with nitrogen and heated to 70° C. At 70° C., two portions of radical initiator Vazo® 67 (0.026 g each) were added at an interval of 1 h and the mixture was reacted for an additional 1.5 h. A solution of Vazo® 67 (0.05 g in 0.5 mL of toluene) in diethylene glycol divinyl ether (DEG-DVE) (23.68 g, 0.15 mol) was added to the reaction mixture over a period of 1.4 h. The mixture was reacted for another hour. Another portion of Vazo® 67 (0.019 g) was added and the mixture reacted for 1 h. The reaction mixture was evacuated (vacuum: 12 mm Hg) for 30 min. The isolated liquid polythioether prepolymer had a theoretical thiol functionality of 2.21, a mercaptan equivalent weight of 1,628 and a viscosity of 82 poise (8.2 Pa-sec). An aliquot of the prepolymer was maintained at 39° F. (3.9° C.) and there was no evidence of solidification after 164 days.

Example 11

Thiol-Terminated Polythioether Prepolymer Including Moieties Derived from 2:1 DMDO/TMP-DAE Dithiol Adduct; Functionality 2.8

TAC (4.45 g, 0.0178 mol), dithiol DMDO/TMP-DAE adduct of Example 9 (55.11 g, 0.0944 mol) and DMDO (18.29 g, 0.1003 mol) were charged into a 250-mL 3-necked round-bottomed flask. The flask was equipped with a stirrer, a temperature probe, and a gas adapter. While stirring (RPM: 200), the mixture was flushed with nitrogen and heated to 70° C. At 70° C., two portions of radical initiator Vazo® 67 (0.028 g each) were added at an interval of 1 h and the mixture reacted for 1 h. A solution of Vazo® 67 (0.05 g in 0.5 mL of toluene) in diethylene glycol divinyl ether (DEG-DVE) (22.15 g, 0.14 mol) was added over a period of 1.2 h. The mixture was reacted for 3 h. The reaction mixture was evacuated (vacuum: 4 mm Hg) for 35 min. The isolated liquid polythioether prepolymer had a theoretical thiol functionality of 2.8, a mercaptan equivalent weight of 1,594 and a viscosity of 264 poise (26.4 Pa-sec). An aliquot of the prepolymer was maintained at 39° F. (3.9° C.) and there was no evidence of solidification after 164 days.

Example 12

Synthesis of 2:1 Dithiol Adduct of DMDS and TMP-DAE

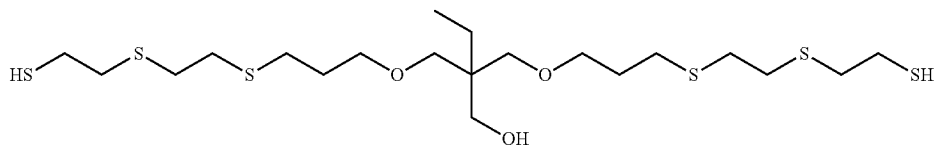 [SMILES: CCC(CO)(COCCCSCCSCCS)COCCCSCCSCCS]

Dimercaptodiethylsulfide (DMDS) (92.40 g, 0.6 mol) was charged into a 250-mL 3-necked round-bottomed flask. The flask was equipped with a stirrer, a temperature probe, and a gas adapter. The contents were flushed with nitrogen and the mixture was heated to 70° C. A mixture of trimethylolpropane diallyl ether (TMP-DAE) (63.79 g, 0.3 mol) and a solution of free radical catalyst Vazo® 67 (0.08 g in ½ mL of toluene) was added at 70° C. over a period of 2.2 h. Heating was continued for 1 h. Twelve portions of Vazo® 67 (0.03 g each) were added at an interval of 1 h and heating was continued for another hour. The reaction mixture was evacuated (vacuum: 8 mm Hg) for 1 h to give a dithiol DMDS/TMP-DAE adduct having a thiol equivalent weight of 268.

Example 13

Thiol-Terminated Polythioether Prepolymer Including Moieties Derived from 2:1 DMDS/TMP-DAE Dithiol Adduct; Functionality 2.21

TAC (1.48 g, 0.006 mol), the dithiol adduct of Example 12 (2:1 adduct of DMDS and TMP-DAE) (21.48 g, 0.04 mol) and DMDO (41.25 g, 0.2263 mol) were charged into a 250-mL 3-necked round-bottomed flask. The flask was equipped with a stirrer, a temperature probe, and a gas adapter. Stirring was started (RPM: 200), the contents were flushed with nitrogen and the mixture was heated to 70° C. At 70° C., two portions of Vazo® 67 (0.028 g each) were added at an interval of 1 h and the mixture was reacted for an additional hour. A solution of radical initiator Vazo® 67 (0.05 g in 0.5 mL of toluene) in diethylene glycol divinyl ether (DEG-DVE) (35.80 g, 0.2263 mol) was introduced to the reaction mixture over a period of 1.8 h. The mixture was reacted for 1 h. Ten (10) portions of Vazo® 67 (0.027 g each) were added at an interval of 1 h and the mixture reacted from 1 h. The reaction mixture was evacuated (vacuum: 5 mm Hg) for 45 min. The isolated liquid polythioether prepolymer had a theoretical thiol functionality of 2.21, a mercaptan equivalent weight of 1,516 and a viscosity of 82 poise (8.2 Pa-sec). An aliquot of the prepolymer was maintained at 39° F. (3.9° C.); and after 108 days there was no evidence of solidification.

Example 14

Thiol-Terminated Polythioether Prepolymer Including Moieties Derived from 2:1 DMDS/TMP-DAE Dithiol Adduct; Functionality 2.8

TAC (4.45 g, 0.0178 mol), the dithiol DMDS/TMP-DAE adduct of Example 12 (2:1 adduct of DMDS and TMP-DAE) (31.79 g, 0.0593 mol) and DMDO (34.52 g, 0.1894 mol) were charged into a 250-mL 3-necked round-bottomed flask. The flask was equipped with a stirrer, a temperature probe, and a gas adapter. Stirring was started (RPM: 200), the contents were flushed with nitrogen and the mixture was heated to 70° C. At 70° C., three portions of Vazo® 67 (0.03 g each) were added at an interval of 1 h and reacted for an additional hour. A solution of Vazo® 67 (0.05 g in 0.5 mL of toluene) in diethylene glycol divinyl ether (DEG-DVE) (29.95 g, 0.1893 mol) was added to the reaction mixture over a period of 1.5 h. The mixture was reacted for another hour. Three (3) portions of Vazo® 67 (0.03 g each) were added at an interval of 1 h and the mixture reacted for 1 h. The reaction mixture was evacuated (vacuum: 6 mm Hg) for 1.7 h. The isolated liquid polythioether had a theoretical thiol functionality of 2.8, a mercaptan equivalent weight of 1,468 and a viscosity of 360 poise (36.0 Pa-sec). An aliquot of the prepolymer was maintained at 39° F. (3.9° C.); and after 104 days there was no evidence of solidification.

Example 15

Synthesis of Fluorine-Containing Olefin from Trimethylolpropane Trivinyl Ether (TMP-TVE) and 3,3,4,4,5,5,6,6,6-Nonafluorohexane-1-Thiol (NFHT)

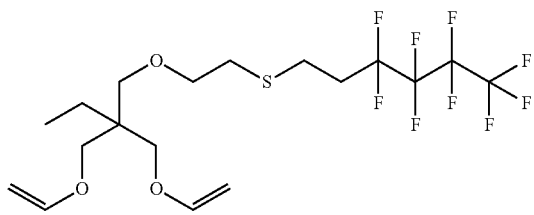 [SMILES: C=COCC(CC)(COC=C)COCCSCCC(F)(F)C(F)(F)C(F)(F)C(F)(F)F]

TMP-TVE (trimethylolpropane trivinyl ether) (29.55 g; 0.1392 mol) was charged into a 100-mL 3-necked round-bottomed flask. While stirring, NFHT (3,3,4,4,5,5,6,6,6-nonafluorohexane-1-thiol) (39 g, 0.1392 mol) was added and the mixture reacted for 1.5 h. The reaction mixture was heated to 70° C. and five (5) portions of Vazo® 67 (0.02 g each) were added at an interval of 1 h to provide the dialkenyl TMP-TVE/NFHT, having a thiol number (HS #) of 140,800 in high yield.

Example 16

Thiol-Terminated Polythioether Prepolymer Including Moieties Derived from a Fluorine-Containing Olefin (TMP-TVE/NFHT); Functionality 2.21

TAC (1.06 g, 0.0042 mol) and DMDO (39.18 g, 0.215 mol) were charged into a 250-mL 3-necked round-bottomed flask. The flask was equipped with a mechanical stirrer, a temperature probe, and a gas adapter. While stirring (RPM: 200), the reaction mixture was heated to 70° C., Vazo® 67 (0.025 g each) was added and heating the mixture reacted for 3 h. A mixture of DEG-DVE (17.44 g, 0.1102 mol), the fluorine-containing diolefin of Example 15 (TMP-TVE/NFHT) (37.31 g, 0.0758 mol) and a solution of Vazo®-67 (0.06 g in 0.5 mL of toluene) was added over a period of 2.2 h. Twelve (12) additional portions of Vazo® 67 (0.026 g each) were added at an interval of 1 h and the mixture reacted for 1.5 h. The reaction mixture was evacuated (vacuum: 5 mm Hg) for 1 h to give a liquid polythioether (theoretical thiol functionality: 2.21; mercaptan equivalent weight of 1,404; viscosity: 47 poise (4.7 Pa-sec)). An aliquot of the prepolymer was maintained at 39° F. (3.9° C.); and after 94 days there was no evidence of solidification.

Example 17

Thiol-Terminated Polythioether Prepolymer Including Moieties Derived from a Fluorine-Containing Olefin (TMP-TVE/NFHT); Functionality 2.8

TAC (3.2, 0.0128 mol) and DMDO (40.13 g, 0.2201 mol) were charged into a 250-mL 3-necked round-bottomed flask. The flask was equipped with a mechanical stirrer, a temperature probe, and a gas adapter. While stirring (RPM: 200), the reaction mixture was heated to 70° C., Vazo® 67 (0.027 g each) was added and the mixture reacted from 1 h. A mixture of DEG-DVE (17.12 g, 0.1082 mol), the fluorine-containing diolefin of Example 15 (34.55 g, 0.0702 mol) and a solution of Vazo® 67 (0.058 g in 0.5 mL of toluene) was added over a period of 2.2 h. Ten (10) additional portions of Vazo® 67 (0.027 g each) were added at an interval of 1 h and the mixture reacted for 1.5 h. The reaction mixture was evacuated (vacuum: 8 mm Hg) for 40 min to give a liquid polythioether (theoretical functionality: 2.8; mercaptan equivalent weight of 1,356; viscosity: 132 poise (13.2 Pa-sec)). An aliquot of the prepolymer was maintained at 39° F. (3.9° C.); and after 94 days there was no evidence of solidification.

Example 18

Synthesis of Bis[2-(allyloxy)ethyl] Formal (BAEF) from Paraformaldehyde and 1-Allyloxyethanol

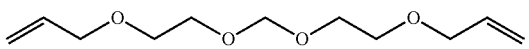

Paraformaldehyde (13.5 g, 0.45 mol), 2-allyloxyethanol (91.92 g, 0.9 mol) and p-TsOH.HOH (0.61 g, 0.0032 mol) were charged into a 250-mL 3-necked round-bottomed flask. The flask was equipped with a magnetic stir bar, a Dean-Stark adapter, and a temperature probe. While stirring, the reaction mixture was heated at 60° C./2.5 h, 70° C./2.5 h, 80° C./3 h, 90° C./3 h, 100° C./4.5 h, 110° C./4 h, 115° C./2 h, and 120° C./7 h. The reaction mixture was cooled to 80° C. and evacuated (8 h/8 mm Hg). The concentrate was passed through a column of silica gel using cyclohexane as the eluting solvent. The collected eluent was concentrated and the concentrate was fractionated under vacuum to give 57 g of a clear and colorless sample of bis[2-(allyloxy)ethyl] formal; boiling point: 98-99° C./6 mm.

Example 19

Thiol-Terminated Polythioether Prepolymer Including Moieties Derived from Bis[2-(allyloxy)ethyl] Formal (BAEF); Functionality 2.21

TAC (1.45 g, 0.0058 mol) and DMDO (52.88 g, 0.2901 mol) were charged into a 250-mL 3-necked round-bottomed flask. The flask was equipped with a mechanical stirrer, a temperature probe, and a gas adapter. While stirring (RPM: 100), BAEF of Example 18 (22.4 g, 0.1036 mol) was added. A mild exotherm developed; after 1.5 h, the temperature increased to 38° C. and then started to decrease. The reaction mixture was heated to 60° C., three portions of Vazo® 67 (0.02 g each) were added at an interval of 1 h and the mixture reacted for 1 h. A mixture of DEG-DVE (23.27 g, 0.1471 mol) and a solution of Vazo®-67 (0.05 g in 0.5 mL of toluene) was added over a period of 1.1 h. After 1 h, the temperature was increased to 70° C., nine (9) additional portions of Vazo® 67 (0.028 g each) were added at an interval of 1 h and the mixture reacted for 1 h. The reaction mixture was evacuated (vacuum: 8 mm Hg) for 1 h to give a liquid polythioether prepolymer (theoretical functionality: 2.21; mercaptan equivalent weight of 1,216; viscosity: 34 poise (3.4 Pa-sec)). An aliquot of the prepolymer was maintained at 39° F. (3.9° C.); and after 108 days there was no evidence of solidification.

Example 20

Thiol-Terminated Polythioether Prepolymer Including Moieties Derived from Bis[2-(allyloxy)ethyl] Formal (BAEF); Functionality 2.8

TAC (4.38 g, 0.0176 mol), DMDO (53.04 g, 0.2909 mol) and BAEF (20.79 g, 0.0961 mol) were charged into a 250-mL 3-necked round-bottomed flask. The flask was equipped with a mechanical stirrer, a temperature probe, and a gas adapter. Stirring was started (RPM: 100), the contents were flushed with nitrogen, and the mixture heated to 60° C. Three (3) portions of Vazo® 67 (0.02 g each) were added at an interval of 1 h and the mixture reacted for 1 h. A mixture of DEG-DVE (21.8 g, 0.1378 mol) and a solution of Vazo®-67 (0.05 g in 0.5 mL of toluene) was added over a period of 1.2 h. After 1 h, the temperature was increased to 70° C., nine (9) additional portions of Vazo® 67 (0.025 g each) were added at an interval of 1 h and the mixture reacted from 3 h. The reaction mixture was evacuated (vacuum: 8 mm Hg) for 1 h to give a liquid polythioether prepolymer (theoretical functionality: 2.8; mercaptan equivalent weight of 1,288; viscosity: 76 poise (7.6 Pa-sec)). An aliquot of the prepolymer was kept at 39° F. (3.9° C.); and after 108 days there was no evidence of solidification.

Example 21

Properties of Cured Sealants

The thiol-terminated prepolymers of Examples 1, 2, 4, 5, 7, 8, 11, 13, 14, 16, 17, 19, and 20 were cured with an epoxy formulation (filler: 60 phr of Winnofil® SPM; base catalyst: 0.8 phr of Dabco® 33-LV) to generate data on hardness, tensile strength, elongation and fuel swell in JRF Type I.

The thiol-terminated prepolymer and Winnofil® SPM (60 phr) were charged into a mixing cup (size: 100 g). The contents were mixed in a Hauschild mixer for 30 sec. The contents were handmixed and mixed further in the Hauschild mixer for 4 min. An equivalent amount of epoxy formulation was added; the contents were subjected to two rounds of handmixing and mixing further in Hauschild mixer for 30 sec. A base catalyst (Dabco® 33-LV; 0.8 phr) was added. The contents were handmixed and mixed further in the Hauschild mixer for 30 sec. In most cases, the amount of the mixed sealant was 60-65 g.

Sealant-flowouts were made by placing an uncured sealant composition between two polyethylene sheets separated by 0.125-inch (3.175 mm) spacers and pressing between two heavy aluminum plates. The flowouts were cured for 2 days at 25° C. and 1 day at 60° C. Tensile and elongation were determined on dumbbell-shaped specimens (gauge length: 0.5 inch (12.7 mm)) that were cut from cured sheets with an ISO 37 Type 2 die. Rex Durometer Model 1700 was used for the determination of hardness. An Instron® 3369 was used for the determination of tensile strength and elongation. Fuel swell of the cured specimens was determined after immersion for one week (7 days) at 140° F. (60° C.) and ambient pressure in JRF Type I according to methods similar to those described in ASTM D792 (American Society for Testing and Materials) or AMS 3269 (Aerospace Material Specification).

All mixed prepolymer combinations consisted of 81:19 equivalent portions of two prepolymers of functionality 2.21 and 2.8 to provide a polymer composition having a thiol functionality of 2.31. The hardness, tensile strength, elongation and fuel swell in JRF Type I of the cured sealants is provided in Table 1. The content of the sealants in terms of mol % of the monomers used to form the constituents is provided in Table 2.

TABLE 1

Properties of cured sealants.

| Sealant | Polythiol | Polyalkenyl | Hardness (Shore A) | Tensile (PSI) | Elongation (%) | Fuel Swell (%) |
|---|---|---|---|---|---|---|
| Example 1 | DMDO | TAC DEG-DVE AGE | 43 | 501 | 494 | 10.3 |
| Mix of Example 1 and Example 2 | DMDO | TAC DEG-DVE AGE | 47 | 397 | 394 | 10.6 |
| Example 4 | DMDS | TAC DEG-DVE | 57 | 403 | 423 | 16.1 |
| Example 5 | DMDS | TAC DEG-DVE | 53 | 585 | 690 | 8.1 |

TABLE 1-continued

Properties of cured sealants.

| Sealant | Polythiol | Polyalkenyl | Hardness (Shore A) | Tensile (PSI) | Elongation (%) | Fuel Swell (%) |
|---|---|---|---|---|---|---|
| Example 7 | M-DMDS DMDO/DEG-DVE Adduct | DVTMDS | 12 | 134 | 690 | —[1] |
| Mix of Example 7 and Example 8 | M-DMDS DMDO/DEG-DVE Adduct | DVTMDS | 20 | 227 | 719 | —[1] |
| Example 10 | DMDO DMDO/TMP-DAE Adduct | TAC DEG-DVE | 45 | 376 | 469 | 16.7 |
| Mix of Example 10 and Example 11 | DMDO DMDO/TMP-DAE Adduct | TAC DEG-DVE | 49 | 397 | 394 | 16.4 |
| Example 13 | DMDO DMDS/TMP-DAE Adduct | TAC DEG-DVE | 45 | 293 | 477 | 13.9 |
| Mix of Example 13 and Example 14 | DMDO DMDS/TMP-DAE Adduct | TAC DEG-DVE | 48 | 292 | 443 | 13.6 |
| Example 16 | DMDO | TAC DEG-DVE Fluoro-olefin | 37 | 183 | 192 | 19.5 |
| Mix of Example 16 and Example 17 | DMDO | TAC DEG-DVE Fluoro-olefin | 41 | 225 | 207 | 19.9 |
| Example 19 | DMDO | TAC DEG-DVE Formal-olefin | 41 | 365 | 557 | 17.4 |
| Mix of Example 19 and Example 20 | DMDO | TAC DEG-DVE Formal-olefin | 44 | 374 | 470 | 17.1 |

[1]Not measured.

TABLE 2

Sealant constituents in terms of mol % of the monomers.

| Sealant | TAC (mol %) | Dialkenyl DEG-DVE (mol %) | Dithiol (mol %) | Alkenyl Pendent or Adduct (mol %) | Thiol Pendent or Adduct (mol %) | Other (mol %) |
|---|---|---|---|---|---|---|
| Example 1 | 0.9 | 31.2 | 52.7 DMDO | 0 | 0 | 15.2 AGE |
| Example 2 | 2.9 | 27.8 | 53.3 DMDO | 0 | 0 | 16.0 AGE |
| Example 5 | 1.0 | 46.2 | 0 | 0 | 52.8 M-DMDS | 0 |
| Example 7 | 3.4 | | 59.5 DMDO/DEG-DVE Adduct | 37.1 DVTMDS | 0 | 0 |
| Example 8 | 10.1 | | 61.4 DMDO/DEG-DVE Adduct | 28.5 DVTMDS | 0 | 0 |
| Example 10 | 1.7 | 43.3 | 24.4 DMDO | 0 | 30.5 DMDO/TMP-DAE Adduct | 0 |
| Example 11 | 5.0 | 39.3 | 28.2 DMDO | 0 | 27.4 DMDO/TMP-DAE Adduct | 0 |
| Example 13 | 1.2 | 45.4 | 45.4 DMDO | 0 | 8.0 DMDS/TMP-DAE Adduct | 0 |
| Example 14 | 3.9 | 41.7 | 41.7 DMDO | 0 | 12.8 DMDS/TMP-DAE Adduct | 0 |

TABLE 2-continued

Sealant constituents in terms of mol % of the monomers.

| Sealant | TAC (mol %) | Dialkenyl DEG-DVE (mol %) | Dithiol (mol %) | Alkenyl Pendent or Adduct (mol %) | Thiol Pendent or Adduct (mol %) | Other (mol %) |
|---|---|---|---|---|---|---|
| Example 16 | 1.0 | 27.2 | 53.0 DMDO | 18.7 Fluoro-olefin | 0 | 0 |
| Example 17 | 3.1 | 26.3 | 53.5 DMDO | 17.1 Fluoro-olefin | 0 | 0 |
| Example 19 | 1.1 | 26.9 | 53.1 DMDO | 18.9 Formal-olefin | 0 | 0 |
| Example 20 | 3.2 | 25.4 | 53.6 DMDO | 17.7 Formal-olefin | 0 | 0 |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A polythioether prepolymer comprising a moiety having the structure of Formula (3):

$$-[-A-D-]_n-A- \qquad (3)$$

wherein,
(a) n is an integer from 1 to 60;
(b) each A is independently selected from a moiety of Formula (4), a moiety of Formula (5), and a moiety of Formula (6):

$$-S-R^1-S- \qquad (4)$$

$$B(-R^3-S-)_z \qquad (5)$$

$$-S-[-R^1-S-R^{4a}-R^2-R^{4a}-S-]_c-R^1-S- \qquad (6)$$

(c) each D is independently selected from a moiety of Formula (7), a moiety of Formula (8), and a moiety of Formula (9):

$$-R^{4a}-R^2-R^{4a}- \qquad (7)$$

$$B(-R^3-R^{4a}-)_z \qquad (8)$$

$$-R^{4a}-[-R^2-R^{4a}-S-R^1-S-R^{4a}-]_c-R^2-R^{4a}- \qquad (9)$$

(d) wherein,
(i) c is an integer from 1 to 3;
(ii) each $R^1$ is independently selected from substituted $C_{2-10}$ alkanediyl, $C_{2-10}$ heteroalkanediyl, substituted $C_{2-10}$ heteroalkanediyl, and $-[(CR_2)_p-X-]_q-(CR_2)_r-$, wherein,
p is an integer from 1 to 6;
q is an integer from 1 to 5;
r is an integer from 2 to 10;
each X is independently selected from O and S; and
each R is independently selected from hydrogen, $C_{1-16}$ alkyl, $C_{1-16}$ heteroalkyl, substituted $C_{1-16}$ alkyl, and substituted $C_{1-16}$ heteroalkyl;
(iii) each $R^2$ is independently selected from substituted $C_{2-10}$ alkanediyl, $C_{2-10}$ heteroalkanediyl, substituted $C_{2-10}$ heteroalkanediyl, and $-[(CR_2)_p-X-]_q-(CR_2)_r-$, wherein,
p is an integer from 1 to 6;
q is an integer from 1 to 5;
r is an integer from 2 to 10;
each X is independently selected from O and S; and
each R is independently selected from hydrogen, $C_{1-16}$ alkyl, $C_{1-16}$ heteroalkyl, substituted $C_{1-16}$ alkyl, and substituted $C_{1-16}$ heteroalkyl;
(iv) B represents a core of a z-valent, polythiol polyfunctionalizing agent $B(-R^3-SH)_z$ or a polyfunctional thiol-reactive polyfunctionalizing agent $B(-R^3-R^4)_z$, wherein,
z is an integer from 3 to 6; and
each $R^3$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
each $R^4$ is a thiol-reactive group; and
(v) each $R^{4a}$ is independently a divalent moiety comprising a group derived from a reaction of a thiol-reactive group $R^4$ with a thiol group; and
(e) wherein,
the polythioether prepolymer comprises linear segments of Formula (4) and Formula (7) and non-linear segments of Formula (4) and Formula (7);
the non-linear segments of Formula (4) and Formula (7) comprise pendent groups; and
greater than 10 mol % of the segments of the polythioether prepolymer are non-linear segments.

2. The polythioether prepolymer of claim 1, wherein the thiol-reactive group $R^4$ is selected from an alkenyl group, an alkynyl group, an epoxy group, an isocyanate group, or a Michael acceptor group.

3. The polythioether prepolymer of claim 1, wherein $R^{4a}$ is selected from $-CH_2-CH_2-$, $-CH=CH-$, $-C(=O)-NH-$, $-CH_2-CH(-OH)-$, and $-(CH_2)_2-EW-$, where EW is an electron withdrawing group.

4. The polythioether prepolymer of claim 1, wherein the thiol-reactive group $R^4$ is an alkenyl group; and $R^{4a}$ is $-CH_2-CH_2-$.

5. The polythioether prepolymer of claim 1, wherein the polythioether prepolymer comprises a thiol-terminated polythioether prepolymer of Formula (3a):

$$H-[-A-D-]_n-A-H \qquad (3a)$$

wherein,
n, A, and D are defined as for Formula (1);
each branch, if present, of the thiol-terminated polythioether prepolymer is terminated in a moiety -[-D-A-]$_{n1}$-H; and
n1 is an integer from 0 to 10.

6. The polythioether prepolymer of claim 1, wherein the polythioether prepolymer comprises a thiol-reactive polythioether prepolymer of Formula (3b):

$$D^1\text{-}[\text{-}A\text{-}D\text{-}]_n\text{-}A\text{-}D^1 \quad (3b)$$

wherein,
n, A, and D are defined as for Formula (3); and
each D$^1$ is independently selected from a moiety of Formula (7b), a moiety of Formula (8b), and a moiety of Formula (9b):

$$—R^{4a}—R^2—R^4 \quad (7b)$$

$$B(—R^3—R^4)_z \quad (8b)$$

$$-[—R^{4a}—R^2—R^{4a}—S—R^1—S—]_c—R^{4a}—R^2—R^4 \quad (9b)$$

wherein c, z, R$^2$ R$^4$, and R$^{4a}$ are defined as for Formula (7), Formula (8), or Formula (9).

7. The polythioether prepolymer of claim 1, wherein the polythioether prepolymer has a reactive functionality from 2.1 to 2.9.

8. The polythioether prepolymer of claim 1, wherein the polythioether prepolymer has a sulfur content from 10 wt % to 35 wt %, where wt % is based on the total weight of the polythioether prepolymer.

9. The polythioether prepolymer of claim 1, wherein a molar ratio of the non-linear segments of Formula (4) and Formula (7) to the linear segments of Formula (4) and Formula (7) derived from is from wherein the molar ratio of residues from non linear monomers and/or adducts to residues from 0.05:1 to 1.2:1.

10. A polythioether prepolymer, wherein the polythioether prepolymer comprises the reaction product of reactants comprising:
(a) a polythiol monomer, wherein the polythiol monomer comprises a dithiol monomer of Formula (4a), a polythiol polyfunctionalizing agent of Formula (5a), a dithiol adduct of Formula (6a), or a combination of any of the foregoing;

$$HS—R^1—SH \quad (4a)$$

$$B(—R^3—SH)_z \quad (5a)$$

$$H—[—S—R^1—S—R^{4a}—R^2—R^{4a}—]_c—S—R^1—SH \quad (6a)$$

wherein each R$^1$ and each R$^2$ is independently selected from C$_{2-10}$ heteroalkanediyl, substituted C$_{2-10}$ alkanediyl, substituted C$_{2-10}$ heteroalkanediyl, and [(CR$_2$)$_p$—X—]$_q$—(CR$_2$)$_r$—,
wherein,
p is an integer from 1 to 6;
q is an integer from 1 to 5;
r is an integer from 2 to 10;
each X is independently selected from O and S; and
each R is independently selected from hydrogen, C$_{1-16}$ alkyl, C$_{1-16}$ heteroalkyl, substituted C$_{1-16}$ alkyl, and substituted C$_{1-16}$ heteroalkyl;
each R$^{4a}$ independently comprises a group derived from a reaction of a thiol-reactive group R$^4$ with a thiol group;
B represents a core of a z-valent, polythiol polyfunctionalizing agent B(—R$^3$—SH)$_z$ each R$^3$ is independently selected from C$_{1-10}$ alkanediyl, C$_{1-10}$ heteroalkanediyl, substituted C$_{1-10}$ alkanediyl, and substituted C$_{1-10}$ heteroalkanediyl;
c is an integer from 1 to 3; and
z is an integer from 3 to 6; and
(b) a polyfunctional thiol-reactive monomer, wherein the polyfunctional thiol-reactive monomer comprises a difunctional thiol-reactive monomer of Formula (7a), a polyfunctional thiol-reactive polyfunctionalizing agent of Formula (8a), a difunctional thiol-reactive adduct of Formula (9a), or a combination of any of the foregoing;

$$R^4—R^2—R^4 \quad (7a)$$

$$B(—R^3—R^4)_z \quad (8a)$$

$$R^4—[—R^2—R^{4a}—S—R^1—S—R^{4a}—]_c—R^2—R^4 \quad (9a)$$

wherein,
R$^1$, R$^2$, B, R$^3$, z, c, and R$^{4a}$ are as defined above and each R$^4$ is a thiol-reactive group;
the polythioether prepolymer comprises linear segments of Formula (4) and Formula (7) and non-linear segments of Formula (4) and Formula (7);
the non-linear segments of Formula (4) and Formula (7) comprise pendent groups; and
greater than 10 mol % of the segments of the polythioether prepolymer are non-linear segments.

11. The polythioether prepolymer of claim 10, wherein,
(a) the polythiol monomer comprises DMDO (2,2-(ethane-1,2-diylbis(sulfanyl))bis(ethan-1-thiol)), DMDS (2,2'-thiobis(ethan-1-thiol)), M-DMDS (methyl-substituted dimercaptodiethylsulfide), a DMDO/DEG-DVE (2,2-(ethane-1,2-diylbis(sulfanyl))bis(ethan-1-thiol)/diethylene glycol divinyl ether) adduct, a DMDO/TMP-DAE (2,2-(ethane-1,2-diylbis(sulfanyl))bis(ethan-1-thiol)/2,2-bis(allyloxy)methyl)butan-1-ol) adduct, a DMDS/TMP-DAE (2,2'-thiobis(ethan-1-thiol)/2,2-bis(allyloxy)methyl)butan-1-ol) adduct, or a combination of any of the foregoing; and
(b) the polyfunctional thiol-reactive monomer comprises TAC (triallyl cyanurate), DEG-DVE (diethylene glycol divinyl ether), DVTMDS (divinyltetramethyldisiloxane), BAEF (bis([2-allyloxy)ethyl]formal), NFHT (3,3,4,4,5,5,6,6-nonafluorohexane-1-thiol), or a combination of any of the foregoing.

12. A terminal-modified polythioether prepolymer, wherein the terminal-modified polythioether prepolymer comprises the reaction product of reactants comprising:
(a) the polythioether prepolymer of claim 1; and
(b) a compound comprising a terminal functional group and a terminal group reactive with the polythioether prepolymer of claim 1.

13. A composition comprising the polythioether prepolymer of claim 1.

14. A cured composition prepared from the composition of claim 13.

15. A vehicle comprising the cured composition of claim 14.

16. The vehicle of claim 15, wherein the vehicle comprises an aerospace vehicle.

17. A method of sealing a surface, comprising:
applying the composition of claim 13 to a surface; and
curing the applied composition to seal the surface.

18. The method of claim 17, wherein the method comprises a surface of a vehicle.

19. The method of claim 18, wherein the vehicle comprises an aerospace vehicle.

20. A sealant system comprising:
a first part, wherein the first part comprises the polythioether prepolymer of claim 1; and
a second part, wherein the second part comprises a curing agent, wherein the curing agent is reactive with the polythioether prepolymer.

21. The polythioether prepolymer of claim 1, wherein the polythioether prepolymer does not comprise pendent hydroxyl groups.

22. The polythioether prepolymer of claim 1, wherein a molar ratio of the non-linear segments of Formula (4) and Formula (7) to the linear segments of Formula (4) and Formula (7) derived from is from 0.05 to 1.2.

23. The polythioether prepolymer of claim 1, wherein a molar ratio of the non-linear segments of Formula (4) and Formula (7) to the linear segments of Formula (4) and Formula (7) derived from is from 0.2 to 0.5.

24. The polythioether prepolymer of claim 10, wherein a molar ratio of the non-linear segments of Formula (4) and Formula (7) to the linear segments of Formula (4) and Formula (7) derived from is from 0.05 to 1.2.

25. The polythioether prepolymer of claim 10, wherein a molar ratio of the non-linear segments of Formula (4) and Formula (7) to the linear segments of Formula (4) and Formula (7) derived from is from 0.2 to 0.5.

26. The polythioether prepolymer of claim 10, wherein the reactants can comprise:
from 1 mol % to 5 mol % of a polyfunctionalizing agent;
from 50 mol % to 85 mol % of linear dithiol and linear dialkenyl monomers; and
from 10 mol % to 45 mol % of a non-linear dithiol of Formula (4a) and a non-linear dialkenyl of Formula (7a),
wherein mol % is based on the total moles of the reactants.

27. The polythioether prepolymer of claim 10, wherein,
the reactants comprise from 10 mol % to 45 mol % of a non-linear dithiol of Formula (4a) and a non-linear dialkenyl of Formula (7a); and
mol % is based on the total moles of the reactants.

* * * * *